United States Patent
Hakoshima et al.

(10) Patent No.: US 9,856,407 B2
(45) Date of Patent: Jan. 2, 2018

(54) WATER-REPELLANT TRANSPARENT COATING-SUBSTRATE ASSEMBLY AND PROCESS FOR PRODUCING THE SAME

(71) Applicant: JGC Catalysts and Chemicals Ltd., Kawasaki-shi (JP)

(72) Inventors: Yuhko Hakoshima, Kitakyushu (JP); Masayuki Matsuda, Kitakyushu (JP); Ryo Muraguchi, Kitakyushu (JP); Kazutaka Egami, Kitakyushu (JP); Tsuguo Koyanagi, Kitakyushu (JP); Mitsuaki Kumazawa, Kitakyushu (JP); Satoshi Yoshida, Kitakyushu (JP); Yuji Tawarasako, Kitakyushu (JP)

(73) Assignee: JGC Catalysts and Chemicals Ltd., Kawasaki-shi, Kanagawa (JP)

( * ) Notice: Subject to any disclaimer, the term of this patent is extended or adjusted under 35 U.S.C. 154(b) by 254 days.

(21) Appl. No.: 14/758,354

(22) PCT Filed: Dec. 24, 2013

(86) PCT No.: PCT/JP2013/084469
§ 371 (c)(1),
(2) Date: Jun. 29, 2015

(87) PCT Pub. No.: WO2014/104008
PCT Pub. Date: Jul. 3, 2014

(65) Prior Publication Data
US 2015/0329755 A1   Nov. 19, 2015

(30) Foreign Application Priority Data

Dec. 27, 2012   (JP) .................................. 2012-285398

(51) Int. Cl.
| | |
|---|---|
| D06N 7/00 | (2006.01) |
| C09K 3/18 | (2006.01) |
| B05D 7/00 | (2006.01) |
| B32B 9/00 | (2006.01) |
| B32B 3/30 | (2006.01) |
| C03C 17/34 | (2006.01) |

(52) U.S. Cl.
CPC .................. *C09K 3/18* (2013.01); *B05D 7/50* (2013.01); *B32B 3/30* (2013.01); *B32B 9/00* (2013.01); *C03C 17/3411* (2013.01); *B32B 2307/412* (2013.01); *B32B 2307/73* (2013.01); *B32B 2605/00* (2013.01); *C03C 2217/42* (2013.01); *C03C 2217/76* (2013.01); *Y10T 428/24364* (2015.01)

(58) Field of Classification Search
CPC .................................... C09K 3/18; B05D 7/50
USPC .................................................... 428/142
See application file for complete search history.

(56) References Cited

U.S. PATENT DOCUMENTS

| | | | |
|---|---|---|---|
| 2004/0170844 A1 | 9/2004 | Teranishi | |
| 2005/0008876 A1* | 1/2005 | Teranishi | ............ B32B 17/1033 428/428 |

FOREIGN PATENT DOCUMENTS

| | | | |
|---|---|---|---|
| JP | H0840748 A | | 2/1996 |
| JP | 09100141 A | * | 4/1997 |
| JP | H09100141 A | | 4/1997 |
| JP | 2000256040 A | | 9/2000 |
| JP | 2004-137137 A | | 5/2004 |
| JP | 2005343016 A | | 12/2005 |
| JP | 2009078935 A | | 4/2009 |
| JP | 2009108123 A | | 5/2009 |
| WO | 03/039856 A1 | | 5/2003 |
| WO | 2004/037721 A1 | | 5/2004 |

OTHER PUBLICATIONS

Translation of JP09-100141, Apr. 15, 1997.*

* cited by examiner

*Primary Examiner* — Hui Chin
(74) *Attorney, Agent, or Firm* — The Webb Law Firm

(57) ABSTRACT

A water-repellent transparent coating-substrate assembly includes a substrate and a water-repellent transparent coating disposed on a surface of the substrate, the transparent coating including an inorganic oxide fine particle layer containing inorganic oxide fine particles, and an overcoating layer disposed on the inorganic oxide fine particle layer, the surface of the water-repellent transparent coating having irregularities including depressions and protrusions in which the protrusions have an average height ($T_F$) in the range of 30 to 500 nm and an average protrusion interval (pitch width) ($W_F$) in the range of 50 to 1000 nm, the water-repellent transparent coating having a water contact angle in the range of 130 to 180°.

24 Claims, 1 Drawing Sheet

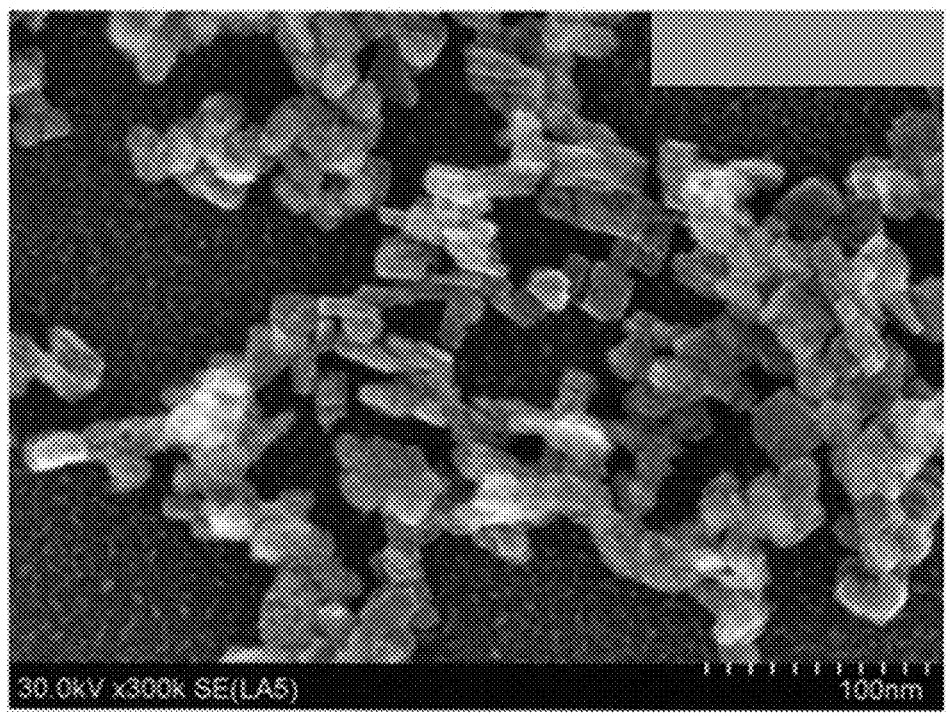

WATER-REPELLANT TRANSPARENT COATING-SUBSTRATE ASSEMBLY AND PROCESS FOR PRODUCING THE SAME

CROSS-REFERENCE TO RELATED APPLICATIONS

This application is the United States national phase of International Application No. PCT/JP2/013/084469 filed Dec. 24, 2013, and claims priority to Japanese Patent Application No. 2012-285398 filed Dec. 27, 2012, the disclosures of which are hereby incorporated in their entirety by reference.

TECHNICAL FIELD

The present invention relates to a water-repellent transparent coating-substrate assembly and a process for producing the same. In particular, the invention relates to a water-repellent transparent coating-substrate assembly having high water repellency and excellent properties such as transparency, haze, hardness, strength, scratch resistance, abrasion resistance and adhesion, and to a process for producing such assemblies.

BACKGROUND ART

It is generally known that a fractal structure enhances the hydrophilicity of a hydrophilic solid surface to change the solid surface to superhydrophilic, and, on the other hand, renders a hydrophobic solid surface superhydrophobic by increasing water repellency.

Patent Literature 1 (JP-A-2005-343016) discloses a superhydrophobic coated article having a superhydrophobic coating on the surface of a substrate wherein the superhydrophobic coating includes projections formed of masses of fine particles and a water-repellent film and wherein the projections are present in dispersed regions of the coating and the surface of the regions of the coating in which the projections are present has irregularities formed by the projections.

Specifically, a three dimensionally bonded colloidal silica, an alkylalkoxysilane and a fluorine-containing alkylalkoxysilane are mixed together to form a cohydrolyzate polycondensate of the water-repellent materials and the silicon oxide fine particles, and this product is applied as a water-repellent dispersion to glass by a flow coating method and is dried naturally to produce a superhydrophobic plate.

Patent Literature 2 (WO 2003/039856) discloses a superhydrophobic substrate including a base, an undercoating film with minute irregularities disposed on the surface of the base, and a water-repellent coating disposed on the minute irregularities of the undercoating film, wherein the surface profile of the water-repellent coating is defined by particulate projections and columnar projections having a greater height than the particulate projections as measured from the surface of the base.

Specifically, the substrate is produced as follows. A decamethylcyclopentasiloxane solution of tetrachlorosilane is prepared which serves as a coating liquid for the formation of a silica-based irregular undercoating film. Separately, a decamethylcyclopentasiloxane solution of a fluorine-containing alkylalkoxysilane is prepared as a water-repellent agent. First, the coating liquid for the formation of an irregular undercoating film is applied to the surface of an automobile window shield glass and is allowed to stand, and subsequently the water-repellent agent is applied and is allowed to stand. Thereafter, the water-repellent agent on the surface is completely washed away with ethyl alcohol, and the surface is naturally dried (without firing), thereby producing a water-repellent window shield glass.

Patent Literature 3 (JP-A-2004-137137) discloses an article coated with a silicon oxide-based coating having minute irregularities on the surface wherein the minute irregularities are composed of minute projections and columnar projections. It is disclosed that the coating having such a structure may be formed by the application of a coating solution of a chlorosilyl group-containing compound in a solvent based on a silicon oil.

Patent Literature 4 (JP-A-H08-40748) discloses a water-repellent glass that includes a glass substrate and, on the surface of the substrate, an underlayer and a water-repellent layer disposed on the underlayer wherein the underlayer is an oxide thin film or a mixed oxide thin film which exhibits at least one or more surface configurations selected from a micropitted surface, an irregular surface and a convex or protruded surface as formed without any surface treatment, and wherein the water-repellent layer is a thin film formed by the application of a water-repellent and oil-repellent liquid obtained by adding an acid to a mixture solution including at least a fluoroalkylsilane, antimony oxide-doped tin oxide particles, a silicone compound, water and an organic solvent, the acid being added in an amount of $5 \times 10^{-4}$ mol to $2 \times 10^{-2}$ mol per 1 mol of the fluoroalkylsilane.

Specifically, water-repellent glass is produced by steps in which the underlayer is formed from an underlayer-forming coating solution that is an isopropyl alcohol dispersion of a mixture including a silica sol (molecular weight: about 3,000) and a silica sol (molecular weight: about 100,000) in a specific molar ratio; and separately a mixture as the water-repellent and oil-repellent liquid that includes an ethanol solution of a silica sol (molecular weight: about 3,000), antimony oxide-doped tin oxide particles (particle diameter: 20 nm), isopropyl alcohol, a heptadecatridecyl-fluoroalkylsilane and an aqueous nitric acid solution is applied and is dried at 250° C.

CITATION LIST

Patent Literature

Patent Literature 1: JP-A-2005-343016
Patent Literature 2: WO 2003/039856
Patent Literature 3: JP-A-2004-137137
Patent Literature 4: JP-A-H08-40748

SUMMARY OF INVENTION

Technical Problem

The coating formed by the method of Patent Literature 1 is such that silicon oxide fine particles are deposited non-uniformly and the irregularities formed on the surface are relatively large. Consequently, it is often the case that the coating exhibits insufficient adhesion with respect to the substrate and poor strength, and sufficient reproducibility of water repellency is not obtained.

The coating formed by the method of Patent Literature 2 sometimes fails to exhibit sufficient strength and hardness probably due to insufficient hydrolysis and polycondensation of the undercoating components and the water-repellent agent. Further, water repellency is high at first but is often dramatically decreased for reasons such as abrasion.

The coating of Patent Literature 3 exhibits a superhydrophobic contact angle at first, but the contact angle is significantly decreased after an abrasion resistance test using a dry cloth.

The coating of Patent Literature 4 has a small decrease in water contact angle after being subjected to an abrasion resistance test with an automobile wiper. However, the initial contact angle, the contact angle after the abrasion resistance test and the contact angle after a weather resistance test are all approximately 110 to 100°. That is, the disclosed technique cannot produce super water repellent coatings having a contact angle of 150° or greater.

As discussed above, there have been demands that water-repellent films be further enhanced in water repellency and other properties such as adhesion with respect to substrates, abrasion resistance and scratch resistance depending on the applications in which they are used, and in addition that these properties be maintained over a long term.

Solution to Problem

The present inventors have carried out extensive studies in light of the problems discussed above. As a result, the present inventors have found that a coating which includes an inorganic oxide fine particle layer containing inorganic oxide fine particles with a specific shape and an overcoating layer disposed on the inorganic oxide fine particle layer and which has specific irregularities not only exhibits high water repellency and achieves enhancements in properties such as adhesion with a substrate, abrasion resistance and scratch resistance, but also maintains these properties over a long term.

The present inventors have then found that such a transparent coating may be obtained by applying a dispersion of prescribed inorganic oxide fine particles onto, for example, a glass substrate and drying the coat, then applying a dispersion of ethyl orthosilicate hydrolyzate and drying the coat, thereafter performing heat treatment, applying a dispersion of a hydrolyzate obtained by adding water and nitric acid to an alcohol solution of tridecafluorooctyltrimethoxysilane, and drying and heat treating the coat to form an overcoating layer. The resultant thin coating-substrate assembly is superhydrophobic and the coating exhibits excellent properties such as adhesion with respect to the substrate, transparency, hardness, scratch resistance, abrasion resistance and haze. The present inventors have made further improvements to the above assembly, thereby completing the present invention.

A water-repellent transparent coating-substrate assembly according to the present invention includes:

a substrate and a water-repellent transparent coating disposed on a surface of the substrate, the water-repellent transparent coating including an inorganic oxide fine particle layer containing inorganic oxide fine particles with a specific shape, and an overcoating layer disposed on the inorganic oxide fine particle layer, the surface of the water-repellent transparent coating having irregularities including depressions and protrusions in which the protrusions have an average height ($T_F$) in the range of 30 to 500 nm and an average protrusion interval (pitch width) ($W_F$) in the range of 50 to 1000 nm, the water-repellent transparent coating having a water contact angle in the range of 130 to 180°.

The ratio of the average height ($T_F$) to the average protrusion interval ($W_F$), ($T_F$)/($W_F$), is preferably in the range of 0.1 to 10.

Preferably, the surface of the protrusions in the irregularities has finer depressions and protrusions in which the finer protrusions have an average height ($T_{FF}$) in the range of 3 to 50 nm and an average protrusion interval ($W_{FF}$) that is in the range of 3 to 50 nm and is smaller than the average protrusion interval ($W_F$) of the protrusions.

The water-repellent transparent coating-substrate assembly may be produced by:

a step (b) of applying an inorganic oxide fine particle dispersion onto a substrate to form an inorganic oxide fine particle layer, and a step (d) of applying an overcoating layer-forming liquid onto the inorganic oxide fine particle layer to form an overcoating layer.

Advantageous Effects of Invention

By virtue of the use of inorganic oxide fine particles having a specific shape, the water-repellent transparent coating formed according to the present invention has depressions and protrusions with a specific size on the surface, the protrusions having finer depressions and protrusions. This water-repellent transparent coating is distinguished from the heretofore-proposed fractal structures in that regularity is low and the protrusions have finer depressions and protrusions.

As a result of such differences, the transparent coating-substrate assemblies provided according to the present invention are superhydrophobic and the coating exhibits excellent properties such as adhesion with respect to the substrate, transparency, hardness, scratch resistance, abrasion resistance and haze. The water-repellent transparent coating-substrate assemblies may be suitably used in such applications as automobiles and various electronic devices requiring properties such as waterproofness and chemical resistance.

BRIEF DESCRIPTION OF DRAWING

The drawing is a scanning electron micrograph (SEM) of alumina hydrate fine particles prepared in Example 1.

DESCRIPTION OF EMBODIMENTS

First, water-repellent transparent coating-substrate assemblies of the present invention will be described below.

[Water-repellent transparent coating-substrate assemblies]

A water-repellent transparent coating-substrate assembly according to the present invention includes a substrate and a water-repellent transparent coating disposed on the substrate.

Substrates

The substrates used in the invention are not particularly limited. Examples include glasses, and plastic sheets, plastic films and plastic panels such as polycarbonates, acrylic resins, PET and TAC.

Water-repellent transparent coatings

The water-repellent transparent coating includes an inorganic oxide fine particle layer containing inorganic oxide fine particles, and an overcoating layer disposed on the inorganic oxide fine particle layer.

(i) Inorganic Oxide Fine Particle Layers

The inorganic oxide fine particles used in the invention preferably have one or more kinds of shapes selected from plate shapes, fiber shapes, chain shapes, warty shapes, cluster shapes and sunflower shapes.

Examples of the plate-shaped inorganic oxide fine particles include plate-shaped alumina fine particles, plate-shaped alumina hydrate fine particles and plate-shaped alumina•silica fine particles.

Plate-shaped alumina hydrate fine particles that are frequently used are pseudo boehmite alumina hydrate fine particles ($Al_2O_3 \cdot nH_2O$, n=0.5 to 2.5) that are a type of crystalline alumina hydrate fine particles usually having a structure in which primary particles are arranged in the form of plates as secondary particles.

When the inorganic oxide fine particles have a plate shape, the inorganic oxide fine particle layer is formed on the substrate in such a manner that the plate-shaped inorganic oxide fine particles are stacked in contact with one another via their faces and the resultant masses of the particles form irregularities.

Preferably, the plate-shaped inorganic oxide fine particles have an average particle diameter ($D_P$) in the range of 10 to 300 nm, an average thickness ($T_P$) in the range of 1 to 60 nm.

The average particle diameter ($D_P$) of the plate-shaped alumina fine particles is preferably in the range of 10 to 300 nm, and more preferably 30 to 250 nm. Particles having an average particle diameter ($D_P$) below the lower limit of the above range are difficult to obtain. Even if such particles are obtained, the particles will not have a plate shape and fail to form the desired irregularities, and consequently the obtainable final water-repellent transparent coating may exhibit insufficient water repellency.

Any excessively large average particle diameter ($D_P$) may lead to insufficient strength, hardness and adhesion with the substrate of the final water-repellent transparent coating, and may further result in insufficient haze and transparency (optical transmittance) due to the Mie scattering.

The average thickness ($T_P$) of the plate-shaped alumina fine particles is preferably in the range of 1 to 60 nm, and more preferably 3 to 50 nm.

Particles having an excessively small average thickness ($T_P$) are difficult to obtain. Even if such particles are obtained, the particles fail to form the desired irregularities, and consequently the obtainable final water-repellent transparent coating may exhibit insufficient water repellency. If the average thickness ($T_P$) is excessively large, it is difficult for the particles to take a plate structure. Specifically, the particles become close to cubic and fail to form sufficient irregularities, and consequently the obtainable final water-repellent transparent coating may exhibit insufficient properties such as water repellency, strength and adhesion with the substrate.

The ratio of the average particle diameter ($D_P$) to the average thickness ($T_P$), ($D_P$)/($T_P$), is preferably in the range of 1.5 to 50, and more preferably 4 to 40.

When the ratio of the average particle diameter ($D_P$) to the average thickness ($T_P$), ($D_P$)/($T_P$), is in the above range, the desired irregularities may be formed and the obtainable final water-repellent transparent coating exhibits excellent properties such as water repellency, strength and adhesion with the substrate.

Examples of the fiber-shaped inorganic oxide fine particles include fiber-shaped alumina fine particles, fiber-shaped alumina hydrate fine particles, fiber-shaped alumina•silica fine particles, fiber-shaped silica fine particles and fiber-shaped titanium oxide fine particles.

In the case of the fiber-shaped alumina hydrate fine particles, it is preferable to use pseudo boehmite alumina hydrate fine particles ($Al_2O_3 \cdot nH_2O$, n=0.5 to 2.5).

When the inorganic oxide fine particles have a fiber shape, the inorganic oxide fine particle layer is formed on the substrate in such a manner that the fiber-shaped inorganic oxide fine particles are entangled and the resultant masses of the particles form irregularities. The layer of such fine particles gives rise to the desired irregularities on the surface of the obtainable final water-repellent transparent coating.

When the inorganic oxide fine particles have a fiber shape, it is preferable that the fiber-shaped inorganic oxide fine particles have an average length ($L_F$) in the range of 10 to 500 nm, an average particle width ($W_F$) in the range of 1 to 100 nm, and a ratio of the average length ($L_F$) to the average particle width ($W_F$), ($L_F$)/($W_F$), in the range of 1.5 to 50.

The average length ($L_F$) of the fiber-shaped inorganic oxide fine particles is preferably in the range of 10 to 500 nm, and more preferably 30 to 400 nm.

Particles having a small average length ($L_F$) are not prepared stably and with good reproducibility at times. Even if such particles are obtained, the particles will not have a fiber shape and fail to form the irregularities, and consequently the obtainable final water-repellent transparent coating may exhibit insufficient water repellency. If the average length ($L_F$) is excessively large, it is sometimes impossible to prepare such particles stably and with good reproducibility. Even if such particles are obtained, the particles will not have a fiber shape with the prescribed size and fail to form the irregularities, and consequently the obtainable final water-repellent transparent coating may exhibit insufficient water repellency and may have high haze.

The average particle width ($W_F$) is preferably in the range of 1 to 100 nm, and more preferably 3 to 80 nm.

Particles having a small average particle width ($W_F$) are hardly prepared stably and with good reproducibility. Even if such particles are obtained, the particles will not have the fiber shape described above and fail to form the irregularities, and consequently the obtainable final water-repellent transparent coating may exhibit insufficient water repellency. If the average particle width ($W_F$) is excessively large, it is difficult to prepare such particles stably and with good reproducibility. Even if such particles are obtained, the particles will not have the fiber shape described above and fail to form the irregularities, and consequently the obtainable final water-repellent transparent coating may exhibit insufficient water repellency and high haze.

The ratio of the average length ($L_F$) to the average particle width ($W_F$), ($L_F$)/($W_F$), is preferably in the range of 1.5 to 50, and more preferably 4 to 40.

When the ratio of the average length ($L_F$) to the average particle width ($W_F$), ($L_F$)/($W_F$), is in the above range, the particles have the prescribed fiber shape and can form the desired irregularities and consequently the obtainable final water-repellent transparent coating exhibits excellent properties such as water repellency, strength and adhesion with the substrate.

Examples of the chain-shaped inorganic oxide fine particles include chain-shaped silica fine particles, chain-shaped zirconia fine particles and chain-shaped antimony pentoxide fine particles.

When the inorganic oxide fine particles have a chain shape, the inorganic oxide fine particle layer is formed on the substrate in the same manner as the fiber-shaped inorganic oxide fine particles described above, namely, in such a manner that the chain-shaped inorganic oxide fine particles are entangled and the resultant masses of the particles form irregularities. The layer of such fine particles gives rise to the desired irregularities on the surface of the obtainable final water-repellent transparent coating.

When the inorganic oxide fine particles have a chain shape, it is preferable that the chain-shaped inorganic oxide fine particles be chains each composed of 2 to 100 primary fine particles having an average particle diameter ($D_C$) in the range of 3 to 50 nm, and have an average length ($L_C$) in the range of 6 to 500 nm, and a ratio of the average length ($L_C$) to the average particle diameter ($D_C$), ($L_C$)/($D_C$), in the range of 2 to 50.

The average particle diameter ($D_C$) of the primary particles constituting the chain-shaped inorganic oxide fine particles is preferably in the range of 3 to 100 nm, and more preferably 5 to 80 nm.

Primary particles having an average particle diameter ($D_C$) of less than 3 nm are easily aggregated and often fail to form chain-shaped particles. If the average particle diameter exceeds 50 nm, such primary particles are less prone to be connected together and may fail to form chain-shaped particles.

The average length ($L_C$) of the chain-shaped inorganic oxide fine particles is preferably in the range of 10 to 500 nm, and more preferably 30 to 400 nm.

If the average length ($L_C$) is small, the entanglement of such chain-shaped inorganic oxide fine particles results in small masses of particles which cannot form the desired irregularities, and consequently the obtainable final water-repellent transparent coating may exhibit insufficient water repellency.

If the average length ($L_C$) is excessively large, the formation of the desired irregularities fails and consequently the obtainable final water-repellent transparent coating may exhibit insufficient water repellency and may have high haze.

The ratio of the average length ($L_C$) to the average primary particle diameter ($D_C$), ($L_C$)/($D_C$), is preferably in the range of 2 to 50, and more preferably 4 to 40.

When the ratio of the average length ($L_C$) to the average primary particle diameter ($D_C$), ($L_C$)/($D_C$), is in the above range, the particles have the prescribed chain shape and can form the desired irregularities and the obtainable final water-repellent transparent coating exhibits excellent properties such as water repellency, strength and adhesion with the substrate.

In the invention, the average particle diameter ($D_P$) and the average thickness ($T_P$) of the plate-shaped inorganic oxide fine particles, the average length ($L_F$) and the average particle width ($W_F$) of the fiber-shaped inorganic oxide fine particles, and the average length ($L_C$) and the average primary particle diameter ($D_C$) of the chain-shaped inorganic oxide fine particles correspond to respective values of plate-shaped, fiber-shaped or chain-shaped inorganic oxide fine particles used as raw materials.

The warty particles are inorganic oxide particles having wart-like projections on the surface of the inorganic oxide particles, and have an average particle diameter ($D_A$) measured by an image analysis method in the range of 10 to 150 nm.

Warty metal oxide particles (A) are particles in the form of konpeito candy and have a large number of wart-like projections on the surface of the particles.

Average Particle Diameter ($D_A$)

The average particle diameter ($D_A$) of the warty metal oxide particles (A) is preferably in the range of 10 to 150 nm, and more preferably 10 to 130 nm.

If the average particle diameter ($D_A$) is small, it is difficult to obtain the particles with wart-like projections. Even if such particles are obtained, the projections will be so small that the desired irregularities and finer irregularities including depressions and protrusions described later cannot be formed. As a result, the obtainable final water-repellent transparent coating may exhibit insufficient water repellency.

Any excessively large average particle diameter ($D_A$) may lead to insufficient strength, hardness and adhesion with the substrate of the final water-repellent transparent coating, and may further result in insufficient haze and transparency (optical transmittance) due to the Mie scattering.

The average particle diameter ($D_A$) of the warty metal oxide particles (A) is measured by the image analysis of a scanning electron micrograph (SEM).

Specifically, a projected image of a scanning electron micrograph was analyzed to measure the maximum diameters of randomly selected fifty particles, and the results were averaged to give the average particle diameter ($D_A$).

Average Height (H) of Wart-Like Projections

The average height (H) of the wart-like projections is preferably in the range of 0.3 to 45 nm, and more preferably 0.5 to 40 nm.

If the average height (H) of the wart-like projections is small, the obtainable final water-repellent transparent coating may exhibit insufficient water repellency. If the average height (H) of the wart-like projections exceeds 45 nm, it is difficult to obtain the particles with such wart-like projections. Even if such particles are obtained, the number of the wart-like projections per particle will be so small that the obtainable final water-repellent transparent coating will not have a sufficient number of finer depressions and protrusions and consequently may exhibit insufficient water repellency.

The average height (H) of the wart-like projections was determined in the following manner. A micrograph of the warty metal oxide particles was obtained with a scanning electron microscope (H-800 manufactured by Hitachi, Ltd.) at a magnification of 250000 times. A projected image of the micrograph was analyzed to measure the distance from the tip of a randomly selected wart-like projection to the root thereof in contact with the spherical particle with respect to three projections for each of randomly selected fifty warty metal oxide particles. The average of the results was calculated as the average height (H) of the wart-like projections.

In the warty metal oxide particles (A), the ratio of the average height (H) of the wart-like projections to the average particle diameter ($D_A$) of the warty metal oxide particles (A), (H)/($D_A$), is preferably in the range of 0.03 to 0.30, and more preferably 0.05 to 0.27.

If the ratio (H)/($D_A$) is small, the obtainable final water-repellent transparent coating may exhibit insufficient water repellency.

If the ratio (H)/($D_A$) is excessively large, it is difficult to obtain the particles with wart-like projections. Even if such particles are obtained, the number of the wart-like projections per particle will be so small that the obtainable final water-repellent transparent coating will not have a sufficient number of finer depressions and protrusions and consequently may exhibit insufficient water repellency.

The shape of the wart-like projections is not particularly limited, but is usually conical or semi-spherical. The average diameter of the cross sectional circles of such wart-like projections is preferably in the range of 3 to 50 nm, and more preferably 3 to 40 nm.

The wart-like projections having a small average diameter are prone to breakage, although variable depending on the average particle diameter. The projections with a large average diameter are difficult to produce.

In the warty metal oxide particles (A), the ratio of the average diameter (M) of the cross sectional circles of the wart-like projections to the average particle diameter ($D_A$) of the warty metal oxide particles (A), (M)/($D_A$), is preferably in the range of 0.02 to 0.5, and more preferably 0.05 to 0.4.

When the ratio (M)/($D_A$) is in this range, the warty particles exhibit the functions according to the invention. If the ratio (M)/($D_A$) is small, the wart-like projections are so thin that they tend to be broken easily. If the ratio (M)/($D_A$) is excessively large, the number of the wart-like projections is so small that the particles may fail to achieve the desired characteristics.

The warty metal oxide particles (A) are spherical fine particles having a large number of wart-like projections on the surface. The structure thereof is substantially similar to a konpeito candy. The surface roughness of the surface having a large number of such wart-like projections is defined as follows.

Surface roughness of warty metal oxide particles
($A$)=($SA_1$)/($SA_2$)

(Here, ($SA_1$) is the specific surface area measured by a BET method and ($SA_2$) is the specific surface area calculated with an equivalent sphere conversion equation represented by Equation (1) below where d is the density of the warty metal oxide particles (A) and 6000 is the conversion factor.)

$$(SA_2)=6000/(D_A) \times d \quad (1)$$

Since the specific surface area indicates the surface area per unit mass, the value of the surface roughness ($SA_1$)/($SA_2$) is increased when the particles are spherical and have a larger number of the wart-like projections on the particle surface, and is decreased and approaches to 1 with decreasing number of the wart-like projections on the particle surface, namely, with increasing smoothness.

The surface roughness ($SA_1$)/($SA_2$) of the warty metal oxide particles (A) used in the invention is preferably in the range of 1.7 to 5.0. A low surface roughness indicates that the particles are close to spherical fine particles due to a low proportion of the wart-like projections or a significantly smaller size of the wart-like projections themselves as compared to the particle diameter of the warty metal oxide particles (A).

Difficulties are encountered to produce particles with a surface roughness exceeding the above range. The surface roughness is more preferably in the range of 1.8 to 4.5.

Cluster-shaped metal oxide particles (B) are secondary particles composed of a large number of metal oxide primary particles. Thus, the surface of the cluster-shaped metal oxide particles (B) has spherical protrusions similar to the wart-like projections of the warty metal oxide particles (A).

The average particle diameter ($D_{B1}$) of the primary particles constituting the cluster-shaped metal oxide particles (B) is preferably in the range of 10 to 150 nm, and more preferably 10 to 130 nm.

If the average particle diameter ($D_{B1}$) of the primary particles is small, the secondary particles will have small protrusions and will be close to spherical particles with a smooth surface. Consequently, the particles fail to form the desired irregularities and finer irregularities described later, and the obtainable final water-repellent transparent coating may exhibit insufficient water repellency.

If the average particle diameter ($D_{B1}$) of the primary particles is excessively large, the secondary particles will have large protrusions. Consequently, the size of the finer irregularities described later may exceed the prescribed range, possibly resulting in a failure to obtain sufficient water repellency.

The average particle diameter ($D_{B2}$) of the secondary particles is preferably in the range of 20 to 500 nm, and more preferably 20 to 400 nm.

If the average particle diameter ($D_{B2}$) of the secondary particles is small, the particles fail to form the desired irregularities and finer irregularities described later, and consequently the obtainable final water-repellent transparent coating may exhibit insufficient water repellency.

If the average particle diameter ($D_{B2}$) of the cluster-shaped metal oxide particles (B) is excessively large, the obtainable water-repellent transparent coating cannot have the desired protrusion height and the desired protrusion interval (pitch width) described later and consequently may exhibit insufficient water repellency.

The cluster-shaped metal oxide particles (B) may be particles composed of a large number of the warty metal oxide particles (A) as primary particles with the proviso that such cluster-shaped metal oxide particles (B) satisfy the requirements in terms of the average particle diameter ($D_{B1}$) and the average particle diameter ($D_{B2}$).

Similarly to the warty metal oxide particles (A), the average particle diameter ($D_{B2}$) of the cluster-shaped metal oxide particles (B) is measured by the image analysis of a scanning electron micrograph.

Specifically, a projected image of a scanning electron micrograph was analyzed to measure the maximum diameters of randomly selected fifty particles, and the results were averaged to give the average particle diameter ($D_{B2}$).

The average primary particle diameter ($D_{B1}$) of the primary particles constituting the cluster-shaped metal oxide particles (B) was measured by micrographic observation in the following manner. With respect to a single cluster-shaped metal oxide particle (B), a plurality of protrusions seen in a central area of the micrograph were regarded as primary particles, and their diameters were measured and averaged. This operation was performed on randomly selected nine cluster-shaped metal oxide particles (B), and the results were averaged.

The odd-form inorganic oxide particles, namely, the warty inorganic oxide particles (A) and the cluster-shaped inorganic oxide particles (B) are preferably at least one selected from $SiO_2$, $ZrO_2$, $CeO_2$, $WO_3$, $TiO_2$, and composite oxides and mixtures of these oxides.

In particular, $SiO_2$ may be suitably used because the odd-form inorganic oxide particles having the desired shape may be obtained easily and also because of good dispersibility and excellent economic efficiency.

The sunflower-shaped particles are inorganic oxide particles that include inorganic oxide base particles (A') and inorganic oxide top fine particles (B') covering the surface of the base particles.

By the use of such sunflower-shaped particles, the obtainable water-repellent coating has protrusions on its surface which have finer depressions and protrusions described later. This water-repellent film exhibits high water repellency. In addition, the film is prevented from fouling when used in water treatment and is further prevented from degradation. Consequently, the coating can maintain high water treatment performance over a long term and also can be used repeatedly.

Preferably, the metal oxide base particles (A') are spherical particles and have an average particle diameter ($D_A$) in the range of 40 to 600 nm, and more preferably 50 to 500 nm.

When the metal oxide base particles (A') are spherical, the metal oxide particles may be uniformly applied onto the substrate and the surface of the obtainable water-repellent coating can attain the desired protrusion height and the desired protrusion interval (pitch width) described later.

If the average particle diameter ($D_A$) of the metal oxide base particles (A') is small, the application of such particles onto the substrate cannot form a water-repellent coating having the desired protrusion height and the desired protrusion interval (pitch width). That is, the heights of the protrusions and the intervals (pitch widths) between the protrusions may be excessively small, and the obtainable water-repellent film may exhibit insufficient water treatment performance when used in water treatment.

If the average particle diameter ($D_A$) of the metal oxide base particles (A') is excessively large, the protrusions will have excessively large heights and excessively large protrusion intervals (pitch widths), and the desired water-repellent coating described later may not be obtained. Further, in this case too, the water-repellent film may exhibit insufficient water treatment performance when used in water treatment.

The average particle diameter ($D_A$) of the metal oxide base particles (A'), and the average particle diameter of the metal oxide top fine particles (B') described later are average particle diameters determined using an equivalent sphere conversion equation represented below.

$$D = 6000/SA_M * d$$

(Here, D is the average particle diameter (nm), $SA_M$ is the specific surface area (m$^2$/g) measured by a BET method, d is the density (g/cm$^3$) of the particles, and 6000 is the conversion factor.)

The average particle diameter of the metal oxide particles is measured by a dynamic light scattering method (Microtrack UPA: manufactured by NIKKISO CO., LTD.). An actually measured value of the specific surface area is usually obtained by a BET method.

The average particle diameter ($D_B$) of the metal oxide top fine particles (B') is preferably in the range of 4 to 60 nm, and more preferably 5 to 40 nm.

If the average particle diameter ($D_B$) of the metal oxide top fine particles (B') is small, difficulties are encountered in obtaining the metal oxide fine particles in a monodispersed state stably.

If the average particle diameter ($D_B$) of the metal oxide top fine particles (B') is excessively large, the size of the finer irregularities described later will exceed the prescribed range and further the specific surface area of the metal oxide particles will be decreased. Consequently, the coating cannot attain sufficient water repellency and may exhibit insufficient water treatment performance.

The ratio of the average particle diameter ($D_B$) of the metal oxide top fine particles (B') to the average particle diameter ($D_A$) of the metal oxide base particles (A'), ($D_B$)/($D_A$), is preferably in the range of 0.007 to 0.5, and more preferably 0.008 to 0.4.

If the ratio ($D_B$)/($D_A$) is below the lower limit of the above range, the size of the finer irregularities described later may be smaller than the prescribed range and consequently the coating cannot attain sufficient water repellency and may exhibit insufficient water treatment performance.

If the ratio ($D_B$)/($D_A$) exceeds the upper limit of the above range, the size of the finer irregularities described later may be larger than the prescribed range and consequently the coating cannot attain sufficient water repellency and may exhibit insufficient water treatment performance.

In the sunflower-shaped particles, the ratio of the coverage of the metal oxide base particles (A') with the metal oxide top particles (B') represented by Equation (1) below is preferably in the range of 30 to 100%, and more preferably 50 to 100%.

Coverage ratio (%)=[[Actually measured specific surface area($S_A$) of metal oxide particles−Actually measured specific surface area($S_M$) of metal oxide base particles]/[Calculated specific surface area($S_C$) of metal oxide particles with 100% coverage−Actually measured specific surface area($S_M$) of metal oxide base particles]]× 100 (1)

Here, ($S_C$)=Surface area per one metal oxide particle× Number of particles per unit weight (1 g), Surface area per one metal oxide particle=$4\pi \cdot [(D_A)/2 + (D_B)/2]^2$, Number of metal oxide base particles (A') per unit weight (1 g)=$1/[4/3 \cdot \pi[(D_A)/2]^3 \cdot d]$, and d is the particle density (g/ml) of the metal oxide base particles (A').

In the case of silica, the particle density is 2.2 g/ml.

If the coverage ratio is small, the finer irregularities described later cannot be formed sufficiently and consequently the coating cannot attain sufficient water repellency and may exhibit poor water treatment performance. The coverage ratio does not exceed 100%.

The metal oxide base particles (A') and the metal oxide top fine particles (B') may be the same as or different from each other and are preferably at least one selected from $SiO_2$, $Al_2O_3$, $Sb_2O_5$, $ZrO_2$, $TiO_2$, $Fe_2O_3$, $CeO_2$, and composite oxides or mixtures of these oxides.

The particles of such components may be suitably used because the sunflower-shaped particles having a particle diameter in the aforementioned range may be obtained easily and also because the particles are chemically stable.

In the invention, in particular, the metal oxide base particles (A') and the metal oxide top fine particles (B') are preferably both $SiO_2$ particles.

The sunflower-shaped particles composed of $SiO_2$ may achieve a uniform particle diameter regardless of the magnitude of the particle diameter. The average particle diameter of the metal oxide base particles (A') whose surface is covered with the metal oxide top fine particles (B'), namely, the sunflower-shaped particles is usually in the range of 48 to 720 nm, although variable depending on the coverage ratio.

The production of the plate-shaped, fiber-shaped or chain-shaped inorganic oxide fine particles used in the invention will be described. As an example, methods will be described for the production of fiber-shaped or plate-shaped alumina hydrate fine particles.

Methods for Preparing Alumina Hydrate Fine Particles

The methods for producing alumina hydrate fine particles for use in the invention are not particularly limited as long as the aforementioned alumina hydrate fine particles may be obtained. Some exemplary methods will be described below.

First, examples of the basic methods for producing fiber-shaped alumina hydrate fine particles will be described.

(1) An aqueous aluminum salt solution is neutralized by the addition of an aqueous alkali solution to form an aluminum hydrogel slurry, which is aged as required.

(2) After the above aging, an aqueous alkali solution is added and the mixture is aged as required. Subsequently, an aqueous aluminum salt solution is added and the mixture is aged as required.

(3) The procedures described in the method (2) are repeated.

Other similar methods are also usable, for example:

(4) An aqueous sodium aluminate solution is neutralized by the addition of an aqueous acid solution to form an aluminum hydrogel slurry, which is aged as required.

(5) After the above aging, an aqueous acid solution is added and the mixture is aged as required. Subsequently, an aqueous sodium aluminate solution is added and the mixture is aged as required.

(6) The procedures described in the method (5) are repeated.

Further, options include:

(7) An aqueous aluminum salt solution and an aqueous sodium aluminate solution are mixed with each other to give an aluminum hydrogel slurry, which is aged as required. In this case, the method may be such that:

(8) The procedures described in the method (2) or (5) are performed and are repeated as required.

In the invention, the aluminum hydrogel slurry obtained by any of the aforementioned methods is washed before use. The fine particles obtained by washing are the alumina hydrate fine particles for use in the invention.

Examples of the washing methods include filtration followed by water rinsing, ultrafiltration, the removal of cations and anions with cation exchange resins, anion exchange resins, amphoteric ion exchange resins or the like, combinations of these methods, and repeating of these methods.

Examples of the aqueous aluminum salt solutions in the above methods include aqueous solutions of aluminum chloride, aluminum nitrate, aluminum sulfate and organic acid aluminum salts such as aluminum acetate.

Examples of the aqueous alkali solutions include aqueous solutions of alkali metal hydroxides such as sodium hydroxide and potassium hydroxide, and ammonia. Known particle growth regulators may be added, with examples including citric acid, malic acid, lactic acid, fumaric acid, maleic acid, adipic acid, oxalic acid, malonic acid, succinic acid, tartaric acid and phthalic acid.

The fiber-shaped alumina hydrate fine particles for use in the invention may be prepared by the methods described above. The average length ($L_F$) and the average particle width ($W_F$) of the fiber-shaped alumina fine particles (secondary particles) may be controlled by known methods such as by selecting the raw materials used, by controlling the neutralization conditions, the aging conditions, the concentrations during these treatments, and the washing conditions, or by using particle growth regulators such as organic carboxylic acids.

Next, examples of the basic methods for producing plate-shaped alumina hydrate fine particles will be described.

In the first example, an alumina hydrogel slurry is prepared similarly to the preparation of the fiber-shaped alumina hydrate fine particles. In this case, an acidic alumina hydrogel slurry is prepared, then rendered alkaline by the addition of a basic compound while performing heating as required, thereafter rendered acidic by the addition of an acidic compound while performing heating as required, and further combined with a basic compound while performing heating as required to give an alkaline alumina hydrogel slurry.

In the case where the alumina hydrogel slurry prepared is alkaline, it is rendered acidic by the addition of an acidic compound while performing heating as required, then rendered alkaline by the addition of a basic compound while performing heating as required, and further combined with an acidic compound while performing heating as required to give an acidic alumina hydrogel slurry.

The alumina hydrogel slurry is then washed by a known method, thereby preparing plate-shaped alumina hydrate fine particles.

In the second example, an acidic compound is added to an aqueous sodium aluminate solution while performing heating as required to prepare an alumina hydrogel slurry in an alkaline range. Aging the slurry while performing heating results in plate-shaped alumina hydrate fine particles having a substantially square primary particle shape. After the particles are sufficiently washed by a known method, an organic base such as tetramethylammonium hydroxide (TMAOH) is added and the mixture is subjected to hydrothermal treatment at high temperature using a device such as an autoclave. Next, washing is performed to remove the organic base. In this manner, plate-shaped alumina hydrate fine particles suited for use in the invention may be prepared.

Methods for Producing Warty Inorganic Oxide Particles (A)

The methods for producing warty inorganic oxide particles (A) for use in the invention are not particularly limited as long as the particles that are obtained have wart-like projections and the aforementioned properties such as the average particle diameter ($D_A$) and the surface roughness. Suitable use may be made of a method for producing warty composite silica fine particles that is disclosed in JP-A-2009-78935 filed by the present applicant, and other production methods in accordance therewith.

For example, a first method for producing warty inorganic oxide particles (A) is such that a seed particle dispersion (silica sol) which includes seed particles (for example, silica fine particles) with a particle diameter of 3 to 140 nm dispersed in a solvent is brought to a pH of 8 to 12 and a temperature of about 60 to 200° C., and a prescribed amount(s) of 1) an inorganic oxide (except silica) precursor or 2) such an inorganic oxide precursor and a silicic acid solution is added continuously or intermittently.

A second method for producing warty inorganic oxide particles (A) is such that a seed silica sol which includes silica fine particles dispersed in a solvent is brought to a prescribed pH and a prescribed temperature, and the whole of a prescribed amount(s) of 1) an inorganic peroxide or 2) an inorganic peroxide and a silicic acid solution is added at once.

Methods for Producing Cluster-shaped inorganic oxide particles (B)

The methods for producing cluster-shaped inorganic oxide particles (B) for use in the invention are not particularly limited as long as the cluster-shaped inorganic oxide particles (B) that are obtained are such that primary particles having a prescribed average particle diameter are aggregated or bonded together to such an extent that the clusters are not easily broken. Specific examples include the following method.

For example, an aqueous dispersion of inorganic oxide particles having an average particle diameter in the aforementioned range of the average primary particle diameter ($D_{B1}$) may be subjected to hydrothermal treatment in the presence of a salt.

Preferred examples of the salts used herein include magnesium sulfate, magnesium chloride, magnesium nitrate, calcium chloride and calcium nitrate. The concentration of the aqueous dispersion of inorganic oxide particles is preferably in the range of about 2 to 20 wt %, and the hydrothermal treatment temperature is preferably in the range of about 80 to 120° C.

Methods for Producing Sunflower-shaped inorganic oxide particles

The sunflower-shaped inorganic oxide particles may be produced by a method described below, specifically, by a method including the following steps (m) and (n).

(m) A mixed dispersion is prepared which includes inorganic oxide base particles (A) having a positive or negative surface potential ($V_A$) and an average particle diameter ($D_A$) in the range of 40 to 600 nm, and inorganic oxide top particles (B) having a surface potential opposite to the above positive or negative potential and an average particle diameter ($D_B$) in the range of 4 to 60 nm.

(n) The pH of the mixed dispersion is controlled to 6 to 10.

Step (m)

A mixed dispersion is prepared which includes inorganic oxide base particles (A) having a positive or negative surface potential ($V_A$) and an average particle diameter ($D_A$) in the range of 40 to 600 nm, and inorganic oxide top particles (B) having a surface potential opposite to the above positive or negative potential and an average particle diameter ($D_B$) in the range of 4 to 60 nm.

The inorganic oxide base particles (A) and the inorganic oxide top particles (B) are combined so that their surface potentials are opposite to each other. When the inorganic oxide base particles (A) have a positive surface potential, the surface potential ($V_A$) is preferably in the range of 10 to 60 mv, and more preferably 15 to 50 mv.

If the surface potential ($V_A$) of the inorganic oxide base particles (A) is less than 10 mv, the particles may not be covered uniformly with the inorganic oxide top particles (B) due to a small potential difference depending on the surface potential ($V_B$) of the inorganic oxide top particles (B) described later.

Difficulties are encountered in obtaining the inorganic oxide base particles (A) having a surface potential ($V_A$) exceeding 60 mv. Even if such particles are obtained, there remain large amounts of reagents such as electrolytes that have been used as required to adjust the charge, and such reagents may cause aggregation.

When the inorganic oxide base particles (A) have a negative surface potential, the surface potential ($V_A$) is preferably in the range of −60 to 0 mv, and more preferably −55 to −10 mv.

Difficulties are encountered in obtaining the particles having a surface potential ($V_A$) more negative than −60 mv.

If the surface potential ($V_A$) is positive (above 0 mv), the particles will not be covered with the inorganic oxide top particles (B) because of both the surface potentials being positive, although variable depending on the surface potential ($V_B$) of the inorganic oxide top particles (B) described later.

Of the aforementioned materials, $Al_2O_3$ and $ZrO_2$ usually have a positive surface potential, while $SiO_2$, $Sb_2O_5$, $TiO_2$, $Fe_2O_3$ and $CeO_2$ usually have a negative potential, although variable depending on the pH of the aqueous dispersion of the inorganic oxide base particles (A).

Here, a positive or negative surface potential of the particles may be converted to the opposite surface potential appropriately.

The particles having a negative surface potential may be converted to particles with a positive surface potential by methods such as, for example, (1) treatment with an aqueous polyaluminum chloride (PAC) solution, (2) treatment with an aqueous quaternary amine solution and (3) treatment with an aminosilane solution.

Specifically, the method (1) may be performed by adding a polynuclear metal cation such as polyaluminum chloride to a dispersion of the inorganic oxide particles cleaned of impurities such as cations and anions with an ion exchange resin or the like.

The method (2) may be performed by adding an amine such as a quaternary amine (KHE-100: manufactured by SENKA CORPORATION) to a dispersion of the inorganic oxide particles cleaned of impurities such as cations and anions with an ion exchange resin or the like.

The method (3) may be performed by adding an amine-based silane-coupling agent to a dispersion of the inorganic oxide particles cleaned of impurities such as cations and anions with an ion exchange resin or the like.

Here, the amount of surface charges may be adjusted by controlling the amount of the reagent such as the polynuclear metal cation, the amine or the amine-based silane-coupling agent, and by controlling the pH of the dispersion of the inorganic oxide particles. Examples of the pH adjusters include ammonia, sodium hydroxide, potassium hydroxide, hydrochloric acid, nitric acid, sulfuric acid and organic acids such as acetic acid.

Next, there will be described methods for converting the particles having a positive surface potential to particles with a negative surface potential. Examples of such methods include (4) to cover the surface with a silica material having a negative surface potential, and (5) to treat the surface with an agent such as an anionic surfactant.

Specifically, the method (4) may be performed by treating a dispersion of the inorganic oxide particles cleaned of impurities such as cations and anions with an ion exchange resin or the like, by the addition of ethanol followed by the addition of an alkyl orthosilicate and further followed by heating and stirring aging.

The method (5) may be performed by adding an anionic surfactant, preferably an anionic surfactant having a carboxyl group to a dispersion of the inorganic oxide particles cleaned of impurities such as cations and anions with an ion exchange resin or the like.

Here, the amount of surface charges may be adjusted by controlling the amount of the reagent such as the alkyl orthosilicate or the anionic surfactant, and by controlling the pH of the dispersion of the inorganic oxide particles. Examples of the pH adjusters include ammonia, sodium hydroxide, potassium hydroxide, hydrochloric acid, nitric acid, sulfuric acid and organic acids such as acetic acid.

The surface potential is measured with respect to a 0.1 wt % dispersion of the inorganic oxide base particles (A) or the inorganic oxide top particles (B) described later, using Zetasizer Nano ZS90 manufactured by Malvern.

The inorganic oxide top particles (B) have a surface potential opposite to that of the inorganic oxide base particles (A).

The ranges of the surface potentials and the methods for converting the types of the surface potentials are the same as those described for the inorganic oxide base particles (A).

An aqueous dispersion of the inorganic oxide base particles (A) and an aqueous dispersion of the inorganic oxide top particles (B) are mixed with each other.

The solid concentration of the mixed dispersion is preferably in the range of 1 to 30 wt %, and more preferably 2 to 20 wt %.

Although no problems are encountered even when the concentration of the mixed dispersion is low, an excessively dilute concentration causes poor productivity and an increase in cost.

If the concentration of the mixed dispersion is high, the inorganic oxide top particles (B) may be aggregated to fail to uniformly cover the surface of the inorganic oxide base particles (A).

The pH of the mixed dispersion is preferably in the range of 2 to 6, and more preferably 3 to 5.

The pH of the mixed dispersion should not be less than 2, otherwise it becomes difficult to obtain sunflower-shaped inorganic oxide fine particles in which the inorganic oxide base particles (A) are covered with a single layer of the inorganic oxide top particles (B).

If the pH of the mixed dispersion exceeds 6, the inorganic oxide base particles (A) and the inorganic oxide top particles (B) may have a small difference in surface potential or may have an identical surface potential. Consequently, it becomes difficult to obtain sunflower-shaped inorganic oxide fine particles in which the inorganic oxide base particles (A) are covered with a single layer of the inorganic oxide top particles (B).

The temperature of the dispersion in the step (m) is preferably in the range of about 5 to 200° C.

Step (n)

The mixed dispersion is treated with an anion exchange resin to remove anions. In this step, the treatment with an anion exchange resin is preferably continued until the pH of the mixed dispersion becomes 6 to 10, and more preferably 7 to 9.5.

If the pH of the mixed dispersion after the anion exchange resin treatment is less than 6, a large amount of anions still remain to possibly cause the generation of gas during calcination in the later step or to possibly inhibit the crystallization of the coating layer.

The pH of the mixed dispersion after the anion exchange resin treatment does not exceed 10, and the amount of residual anions is no longer decreased. Where necessary, the dispersion may be subjected to filtration separation and drying before use.

In the invention, it is preferable that the step (o) described below be performed after the step (n).

Step (o)

The dispersion obtained in the step (n) is aged at 60 to 98° C., preferably at 70 to 95° C.

Aging at this temperature provides stronger bonding of the inorganic oxide top particles (B) to the inorganic oxide base particles (A).

Even if the aging temperature is further increased, the bond strength of the inorganic oxide top particles (B) to the inorganic oxide base particles (A) is not correspondingly increased, and the sunflower-shaped inorganic oxide particles may be aggregated.

Where necessary, the dispersion may be subjected to filtration separation, drying and calcination before use.

After the step (n) or the step (o), the following steps (p) to (t) may be performed.

Step (p)

The pH of the dispersion prepared in the step (n) or the step (o) is adjusted to the range of 3 to 7, and desirably 4 to 6. Adjusting the pH of the dispersion to this range ensures that the sunflower-shaped inorganic oxide particles will not be aggregated after the step (q) described later, in particular, after the step (r) described later, and that even if such aggregation occurs, the aggregates may be easily crushed.

If the pH of the dispersion is outside the above range, the surface of the particles undergoes dehydration condensation, and drying results in hard particles and subsequent calcination results in sintering. Consequently, the resultant sunflower-shaped inorganic oxide particles may be less prone to breakage.

This step (p) is not necessarily carried out in the case where the mixed dispersion after the anion exchange resin treatment in the step (n) has a pH in the range of 6 to 7.

The pH of the dispersion is preferably adjusted by the addition of an acid.

Examples of the acids include mineral acids (inorganic acids) such as hydrochloric acid, sulfuric acid and nitric acid, organic acids such as acetic acid, tartaric acid, gluconic acid and glycolic acid, and mixtures of these acids.

In the invention, organic acids such as acetic acid, gluconic acid and glycolic acid may be suitably used. These organic acids, even when they remain in the form of anions, can be removed in the calcination step (r) described later. Further, the use of the organic acids is advantageous in that even when the sunflower-shaped inorganic oxide particles are partly aggregated or fused in the calcination step (r), the aggregated or fused particles may be easily crushed in the step (s) described later.

Where necessary, the dispersion may be subjected to filtration separation before use.

Further, the following steps may be performed.

Step (q)

The particle dispersion is dried. The drying methods are not particularly limited, and any conventional and known methods may be adopted. The drying may be air drying at room temperature, but the drying temperature is preferably in the range of 80 to 300° C., and more preferably 100 to 200° C.

Step (r)

After the drying, heat treatment is performed at 300 to 1200° C., and preferably 700 to 1100° C.

The heat treatment ensures that the inorganic oxide top fine particles (B) are not detached during the preparation of an inorganic oxide particle dispersion for the formation of the inorganic oxide particle layer or during the preparation and treatment of a dispersion of the sunflower-shaped inorganic oxide particles for surface modification. As a result, hydrophilicity is enhanced and an improvement in water treatment performance is obtained. After the drying and the heat treatment, crushing may be performed.

Step (s)

Crushing may be performed to disassemble the particles that have been strongly aggregated. The crushing may be carried out when the step (r) has resulted in strong aggregation of the particles. The crushing methods are not particularly limited, and any conventional and known methods may be adopted. Exemplary methods include sand mills, impact pulverization methods, ultrasonic homogenizers and Nano Jetmizer methods.

In the invention, a separation operation may be performed after any of the step (n) and the subsequent steps.

Step (t)

In the case where the particles include particles that do not meet the desired particle diameter or the desired shape, such particles are removed by separation. The presence of such particles may lead to a failure to form the desired surface irregularities depending on the amount of such residual particles, possibly resulting in insufficient hydrophilicity and water treatment performance.

The separation methods are not particularly limited and any conventional and known methods may be adopted as long as the methods can remove particles that do not meet the desired particle diameter or the desired shape. Exemplary techniques include various filters and centrifugal machines.

In the invention, use is made of any of the aforementioned plate-shaped, fiber-shaped, chain-shaped, warty-shaped, cluster-shaped and sunflower-shaped particles. The size and the shape of the particles are important. Such particles can form a water-repellent transparent coating with excellent water repellency probably because of their capability to form the irregularities described later and also because finer irregularities are disposed on the surface of the irregularities.

Preferably, the inorganic oxide fine particles are surface-treated with a hydrolyzable organosilicon compound represented by Formula (1) below.

$$SiX_4 \quad (1)$$

(In the formula, X: an alkoxy group having 1 to 4 carbon atoms, a hydroxyl group, a halogen or hydrogen.)

Examples of the hydrolyzable organosilicon compounds include tetramethoxysilane, tetraethoxysilane, tetrapropoxysilane and tetrabutoxysilane.

The amount of the surface treatment for the inorganic oxide fine particles with the hydrolyzable organosilicon compound is preferably such that the amount of the hydrolyzable organosilicon compound in terms of $SiO_2$ is in the range of 1 to 200 parts by weight, and more preferably 5 to 100 parts by weight with respect to 100 parts by weight of the inorganic oxide fine particles as oxide (1).

The surface treatment of the inorganic oxide fine particles with the hydrolyzable organosilicon compound in the above amount enhances dispersibility and promotes the formation of bonds with a binder. Consequently, the obtainable final water-repellent transparent coating-substrate assembly achieves excellent properties such as strength, hardness and haze.

(ii) Binders

The water-repellent transparent coating preferably contains a binder in order to bind the inorganic oxide fine particles and to enhance the adhesion with respect to the substrate and also to enhance the strength and the hardness of the water-repellent transparent coating.

A preferred binder is a silica, and a further preferred binder is a silica prepared from a silica sol, an acidic silicic acid solution or a hydrolyzable organosilicon compound.

In particular, a preferred binder is a silica binder that is a hydrolyzate polycondensate of a hydrolyzable organosilicon compound represented by Formula (2) below.

$$R_n\text{—}SiX_{4-n} \quad (2)$$

(In the formula, R is a non-substituted or substituted hydrocarbon group having 1 to 10 carbon atoms; X is an alkoxy group having 1 to 4 carbon atoms, a hydroxyl group, a halogen or hydrogen; and n is an integer of 0 to 1.)

Here, the term hydrolyzate polycondensate means a product that results from the polycondensation of the hydrolyzable organosilicon compound, a partial hydrolyzate or a hydrolyzate thereof by heat treatment in production steps described later.

Examples of the hydrolyzable organosilicon compounds include tetramethoxysilane, tetraethoxysilane, tetrapropoxysilane, tetrabutoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(β-methoxyethoxy)silane, 3,3,3-trifluoropropyltrimethoxysilane, methyl-3,3,3-trifluoropropyldimethoxysilane, β-(3,4-epoxycyclohexyl) ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltriethoxysilane, butyltrimethoxysilane, butyltriethoxysilane, isobutyltriethoxysilane, hexyltriethoxysilane, octyltriethoxysilane, decyltriethoxysilane, 3-ureidoisopropylpropyltriethoxysilane, perfluorooctylethyltrimethoxysilane, perfluorooctylethyltriethoxysilane, perfluorooctylethyltriisopropoxysilane, trifluoropropyltrimethoxysilane, N-β(aminoethyl)γ-aminopropylmethyldimethoxysilane, N-β(aminoethyl)γ-aminopropyltrimethoxysilane, N-phenyl-γ-aminopropyltrimethoxysilane, γ-mercaptopropyltrimethoxysilane, trimethylsilanol, methyltrichlorosilane, and mixtures of these compounds.

In particular, excellent properties such as adhesion with the substrate, strength and hardness may be obtained and the adhesion with respect to the overcoating layer including a fluorine-containing silica layer may be increased by the use of a hydrolyzable organosilicon compound in which n=0 (tetrafunctional) or a mixture of a hydrolyzable organosilicon compound in which n=0 (tetrafunctional) and a hydrolyzable organosilicon compound in which n=1 (trifunctional). Consequently, the obtainable final water-repellent transparent coating-substrate assembly achieves excellent strength, hardness and water repellency.

The content of the binder in terms of an oxide of the binder is preferably in the range of 1 to 200 parts by weight, and more preferably 10 to 190 parts by weight with respect to 100 parts by weight of the inorganic oxide fine particles in the inorganic oxide fine particle layer, the amount being in terms of oxide.

If the content of the binder is small, the inorganic oxide fine particle layer may exhibit insufficient properties such as adhesion with the substrate, strength and hardness. If the content of the silica binder is excessively large, the size of the irregularities on the surface of the inorganic oxide fine particle layer may be decreased and the obtainable final water-repellent transparent coating may exhibit insufficient water repellency.

(iii) Overcoating Layers

An overcoating layer is disposed on the inorganic oxide fine particle layer.

The overcoating layer is not particularly limited as long as the layer may be bonded to the inorganic oxide fine particle layer and enhance water repellency. In the invention, a fluorine-containing silica layer is preferable which includes a hydrolyzate polycondensate of a hydrolyzable organosilicon compound represented by Formula (3) below.

$$R_n\text{—}SiX_{4-n} \quad (3)$$

(In the formula, R is a fluorine-substituted hydrocarbon group having 1 to 10 carbon atoms, and may be the same or different; X is an alkoxy group having 1 to 4 carbon atoms, a hydroxyl group, a halogen or hydrogen; and n is an integer of 1 to 3.)

Here, the hydrolyzate polycondensate of the hydrolyzable organosilicon compound is a product that results from the polycondensation of the hydrolyzable organosilicon compound, a partial hydrolyzate or a hydrolyzate thereof by heat treatment in production steps described later.

Examples of the hydrolyzable organosilicon compounds include:

perfluorooctylethyltrimethoxysilane, perfluorooctylethyltriethoxysilane, perfluorooctylethyltriisopropoxysilane, trifluoropropyltrimethoxysilane, tridecafluorooctyltrimethoxysilane, heptadecatrifluorodecyltrimethoxysilane, dimethoxymethyltrifluoropropylsilane, pentadecatrifluorodecyltrimethoxysilane and heptadecatrifluorodecyltripropoxysilane.

The fluorine-containing silica layer may further include a hydrolyzate polycondensate of a hydrolyzable organosilicon compound represented by Formula (4) below.

$$SiX_4 \qquad (4)$$

(In the formula, X is an alkoxy group having 1 to 4 carbon atoms, a hydroxyl group, a halogen or hydrogen.)

Here, the term hydrolyzate polycondensate means a product that results from the polycondensation of the hydrolyzable organosilicon compound, a partial hydrolyzate or a hydrolyzate thereof by heat treatment in production steps described later.

Examples of the hydrolyzable organosilicon compounds represented by Formula (4) include tetramethoxysilane, tetraethoxysilane, tetrapropoxysilane, tetrabutoxysilane and mixtures of these compounds.

Further, a hydrolyzable organosilicon compound in which X is an alkoxy group having 5 or more carbon atoms may be used in combination with the above components.

When the overcoating layer includes a mixture including a hydrolyzate polycondensate of a hydrolyzable organosilicon compound represented by Formula (4), the content of the hydrolyzate polycondensate of a hydrolyzable organosilicon compound represented by Formula (4) is preferably in the range of 200 parts by weight and below, and more preferably 1 to 100 parts by weight in terms of $SiO_2$ with respect to 100 parts by weight of the hydrolyzate polycondensate of a hydrolyzable organosilicon compound represented by Formula (3), the amount being in terms of $R_n$—$SiO_{(4-n)/2}$. When the content of the hydrolyzate polycondensate of a hydrolyzable organosilicon compound represented by Formula (4) is in this range, the obtainable water-repellent transparent coating-substrate assembly achieves excellent properties such as strength, hardness, transparency and haze without incurring a decrease in the water repellency of the water-repellent transparent coating.

The content of the overcoating layer is preferably in the range of 1 to 100 parts by weight, and more preferably 2 to 80 parts by weight in terms of the oxide ($R_n$—$SiO_{(4-n/2)}$, with respect to 100 parts by weight of the inorganic oxide fine particles in the inorganic oxide fine particle layer.

If the content of the overcoating layer is small, the overcoating layer may fail to cover the entire surface and the presence of such uncovered areas may lead to insufficient water repellency, strength, hardness and scratch resistance. If the content of the overcoating layer is excessively large, such heavy application decreases the intervals ($W_F$) between the protrusions in the irregularities on the surface of the water-repellent transparent coating described later and thus may cause a decrease in water repellency. Further, such excessive application may result in insufficient strength and hardness of the water-repellent transparent coating.

Primer Layers

In the invention, a primer layer is desirably disposed between the substrate and the inorganic oxide fine particle layer described hereinabove. In this manner, the adhesion of the inorganic oxide fine particle layer may be further enhanced.

The primer layers are not particularly limited as long as they can enhance the adhesion of the inorganic oxide fine particle layer or further the transparent coating. In the case of ceramic substrates such as glass, inorganic oxide primer layers are preferable, and silica primer layers are particularly preferable. In the case of organic resin substrates, organic resin primer layers or inorganic primer layers may be formed.

Specific examples of the inorganic oxide primer layers include inorganic oxide layers formed from sols such as silica sol, silica alumina sol, antimony tin oxide (ATO) sol and indium tin oxide (ITO) sol, acidic silicic acid solutions obtained by the dealkalization of aqueous alkali silicate solutions with ion exchange resins or the like, organosilicon compounds, and hydrolyzates of these compounds.

The organic resin primer layers are not particularly limited as long as they can enhance the adhesion between the substrate and the inorganic oxide fine particle layer or further the transparent coating. Conventionally known organic resin primers may be used, with examples including thermoplastic resins such as polyester resins, polycarbonate resins, polyamide resins, polyphenyleneoxide resins, thermoplastic acrylic resins, vinyl chloride resins, fluororesins, vinyl acetate resins and silicone rubbers, urethane resins, melamine resins, silicon resins, butyral resins, reactive silicone resins, phenolic resins, epoxy resins, unsaturated polyester resins, thermosetting acrylic resins and UV-curable acrylic resins.

The primer layer is preferably formed so that the thickness of the primer layer is in the range of 10 to 300 nm, and more preferably 25 to 200 nm.

A thin primer layer may exhibit an insufficient effect in enhancing the adhesion. An excessively thick primer layer does not provide correspondingly high adhesion and may be cracked, and consequently the hardness may be decreased or insufficient.

Irregularities

The water-repellent transparent coating-substrate assembly according to the invention has irregularities including depressions and protrusions on the surface.

The irregularities are defined in terms of average protrusion height ($T_F$), average protrusion interval (pitch width) ($W_F$) and water contact angle.

The average protrusion height ($T_F$) in the irregularities is preferably in the range of 30 to 500 nm, and more preferably 50 to 400 nm. If the average protrusion height ($T_F$) is small, the water-repellent transparent coating may exhibit insufficient water repellency. If the average protrusion height ($T_F$) is excessively large, haze may be increased due to external scattering by the water-repellent transparent coating.

The average protrusion interval (or pitch width) ($W_F$) is preferably in the range of 50 to 1000 nm, and more preferably 70 to 800 nm. If the average protrusion interval ($W_F$) is small, the water-repellent transparent coating may exhibit insufficient water repellency. If the average protrusion interval ($W_F$) is excessively large, haze may be increased due to external scattering.

The ratio of the average height ($T_F$) to the average protrusion interval ($W_F$), ($T_F$)/($W_F$) (also written as the aspect ratio), is preferably in the range of 0.1 to 10, and more preferably 0.2 to 5. If the ratio ($T_F$)/($W_F$) is small, the protrusions in the irregularities on the surface are so short in height that insufficient water repellency may be caused. Difficulties are encountered in arranging the inorganic oxide fine particles so that the ratio $(T_F)/(W_F)$ becomes excessively large; even if the inorganic oxide fine particles may be arranged, the resultant water-repellent transparent coating may have insufficient hardness probably due to the impossibility to apply the binder coating liquid uniformly.

In the invention, the average protrusion height $(T_F)$ and the average protrusion interval $(W_F)$ were determined by obtaining a transmission electron micrograph (TEM) of a cross section of the water-repellent transparent coating, and measuring the heights of and the pitches or intervals between fifty protrusions, the results being averaged.

The average protrusion height $(T_F)$ and the average protrusion interval $(W_F)$ may be controlled by selecting the size and the shape of the inorganic oxide fine particles, namely, by selecting the average particle diameter $(D_P)$ and the average thickness $(T_P)$ of the plate-shaped inorganic oxide fine particles, by selecting the average length $(L_F)$ and the average particle width $(W_F)$ of the fiber-shaped inorganic oxide fine particles, or by selecting the average length $(L_C)$ and the average primary particle diameter $(D_C)$ of the chain-shaped inorganic oxide fine particles, as well as by adjusting other conditions such as the concentration and the method for the application of the inorganic oxide fine particle dispersion in a process for producing the transparent coating-substrate assembly described later. Specifically, the average height $(T_F)$ and the average protrusion interval $(W_F)$ tend to be increased by selecting a large average particle diameter $(D_P)$, average length $(L_F)$ or average length $(L_C)$. The average height $(T_F)$ tends to be increased by selecting a high concentration of the inorganic oxide fine particle dispersion, and the average protrusion interval $(W_F)$ tends to be large when the concentration is low.

The protrusions on the surface of the transparent coating in the invention have, on their surface, finer irregularities including depressions and protrusions.

The average height $(T_{FF})$ of the protrusions in the finer irregularities is preferably in the range of 3 to 50 nm, and more preferably 3 to 45 nm.

In the invention, the average height $(T_F)$ and the average protrusion interval $(W_F)$ of the protrusions were measured with an atomic force microscope (AFM) (Dimension 3100: manufactured by Bruker).

The above range of the average height $(T_{FF})$ of the protrusions in the finer irregularities ensures that the obtainable transparent coating exhibits excellent water repellency without incurring a decrease in the transparency of the transparent coating.

The average protrusion interval $(W_{FF})$ of the protrusions in the finer irregularities is preferably in the range of 3 to 50 nm, and more preferably 3 to 45 nm.

Similarly to when the average height $(T_{FF})$ is in the prescribed range, the above range of the average protrusion interval $(W_{FF})$ of the protrusions in the finer irregularities ensures that the obtainable transparent coating exhibits excellent water repellency without incurring a decrease in the transparency of the transparent coating.

The average height $(T_{FF})$ and the average protrusion interval $(W_{FF})$ of the finer irregularities may be measured during the measurement of the average height $(T_F)$ and the average protrusion interval $(W_F)$. Specifically, the average height $(T_{FF})$ and the average protrusion interval $(W_{FF})$ of the finer irregularities may be measured by enlarging randomly selected five protrusions.

Next, the water-repellent transparent coating preferably has a water contact angle in the range of 130 to 180°, and more preferably 145 to 180°.

When the water-repellent transparent coating has a water contact angle in this range, the water-repellent transparent coating repels water without allowing water droplets to become attached to the coating. As a result, the assembly may stay free from marks of water droplets or a decrease in transparency.

These advantages are characteristics obtained by virtue of the irregularities. The contact angle may be controlled within the aforementioned range by adjusting the average protrusion height $(T_F)$ and the average protrusion interval $(W_F)$ to the prescribed ranges in the manner described above. Preferably, this control further involves adjusting the aspect ratio $(T_F)/(W_F)$ to the prescribed range of 0.1 to 10, in particular 1 to 5. That is, the contact angle may be controlled by forming the protrusions in a high density.

Next, there will be described processes for producing the water-repellent transparent coating-substrate assemblies according to the present invention.

[Processes for Producing Water-repellent transparent coating-substrate assemblies]

The water-repellent transparent coating-substrate assembly of the invention may be produced by a process including the following steps (b) and (d):

the step (b) of applying an inorganic oxide fine particle dispersion onto the substrate to form an inorganic oxide fine particle layer, and the step (d) of applying an overcoating layer-forming liquid to form an overcoating layer.

In the invention, it is preferable that the following step (a) be performed before the step (b).

Step (a)

In the step (a), a primer layer-forming liquid is applied onto the substrate to form a primer layer.

To form an inorganic oxide primer layer, the primer layer-forming liquid may be a sol or a gel dispersion of an inorganic oxide precursor. Examples include sols such as silica sol, silica alumina sol, antimony tin oxide (ATO) sol and indium tin oxide (ITO) sol, acidic silicic acid solutions obtained by the dealkalization of aqueous alkali silicate solutions with ion exchange resins or the like, organosilicon compounds, and hydrolyzates of these compounds.

As the organosilicon compound, suitable use may be made of a hydrolyzable organosilicon compound used in a binder coating liquid in the step (d) described later.

To form an organic resin primer layer, any primer liquid may be used without limitation as long as the primer can enhance the adhesion between the substrate and the inorganic oxide fine particle layer or further the transparent coating. Coating liquids of conventionally known organic resins may be used, with examples including thermoplastic resins such as polyester resins, polycarbonate resins, polyamide resins, polyphenyleneoxide resins, thermoplastic acrylic resins, vinyl chloride resins, fluororesins, vinyl acetate resins and silicone rubbers, urethane resins, melamine resins, silicon resins, butyral resins, reactive silicone resins, phenolic resins, epoxy resins, unsaturated polyester resins, thermosetting acrylic resins and UV-curable acrylic resins.

The amount in which the primer layer-forming liquid is applied may be variable depending on the concentration of the liquid. However, as described hereinabove, the liquid is preferably applied in such an amount that the thickness of the primer layer will be 10 to 300 nm, and more preferably 25 to 200 nm.

If the thickness is less than 10 nm, the primer layer may exhibit an insufficient effect in enhancing the adhesion between the substrate and the inorganic oxide fine particle layer or further the transparent coating.

Even if the thickness exceeds 300 nm, the primer layer does not provide correspondingly high adhesion and may be cracked, and consequently the hardness may be decreased or insufficient.

Examples of the application methods include bar coater methods, dipping methods, spraying methods, spinner methods, roll coating methods, gravure coating methods and slit coating methods. These application methods are also usable for the application of an alumina hydrate fine particle dispersion in a step (c) described later.

After the application of the primer layer-forming liquid, the wet film is preferably dried. The drying method may be conventional. For example, the drying temperature is not particularly limited as long as the dispersion medium of the primer layer-forming liquid can be substantially removed, but is usually 50 to 120° C., and preferably 60 to 100° C.

Step (b)

(b) An inorganic oxide fine particle dispersion is applied onto the substrate or the primer layer formed in the step (a), thereby forming an inorganic oxide fine particle layer.

(i) Preparation of Inorganic Oxide Fine Particle Dispersion

The inorganic oxide fine particles used in the invention are one or more kinds of the plate-shaped, fiber-shaped, chain-shaped, warty-shaped, cluster-shaped and sunflower-shaped inorganic oxide fine particles described hereinabove.

As mentioned hereinabove, the inorganic oxide fine particles used in the invention are preferably surface-treated with a hydrolyzable organosilicon compound represented by Formula (5) below.

$$SiX_4 \quad (5)$$

(In the formula, X: an alkoxy group having 1 to 4 carbon atoms, a hydroxyl group, a halogen or hydrogen.)

Examples of the hydrolyzable organosilicon compounds include tetramethoxysilane, tetraethoxysilane, tetrapropoxysilane and tetrabutoxysilane.

The amount of the surface treatment is preferably such that the amount of the hydrolyzable organosilicon compound in terms of $SiO_2$ is in the range of 1 to 200 parts by weight, and more preferably 5 to 100 parts by weight with respect to 100 parts by weight of the inorganic oxide fine particles.

The surface treatment of the inorganic oxide fine particles with the hydrolyzable organosilicon compound in the above amount allows the inorganic oxide fine particles to be dispersed in the dispersion homogeneously. As a result, application properties are enhanced to make it possible to form a uniform inorganic oxide fine particle layer, and a binder in a binder coating liquid applied in the step (c) described later may form bonds with the particles in a facilitated manner. Consequently, the obtainable final water-repellent transparent coating-substrate assembly achieves excellent properties such as strength, hardness and haze.

For example, the surface treatment may be performed in such a manner that the solvent of the aqueous inorganic oxide fine particle dispersion is replaced by an alcohol such as methanol by an ultrafiltration membrane method, the dispersion is mixed with a prescribed amount of the hydrolyzable organosilicon compound, optionally water for hydrolysis is added, and the mixture is aged as required.

Dispersion Media

Examples of the dispersion media of the inorganic oxide fine particle dispersions include hydrophilic solvents, for example, alcohols such as methanol, ethanol, propanol, 2-propanol (IPA), butanol, diacetone alcohol, furfuryl alcohol and tetrahydrofurfuryl alcohol, esters such as methyl acetate, ethyl acetate, isopropyl acetate, propyl acetate, isobutyl acetate, butyl acetate, isopentyl acetate, pentyl acetate, 3-methoxybutyl acetate, 2-ethylbutyl acetate, cyclohexyl acetate and ethylene glycol monoacetate, glycols such as ethylene glycol and hexylene glycol, and ethers such as diethyl ether, ethylene glycol monomethyl ether, ethylene glycol monoethyl ether, ethylene glycol monobutyl ether, ethylene glycol isopropyl ether, diethylene glycol monomethyl ether, diethylene glycol monoethyl ether, propylene glycol monomethyl ether, propylene glycol monoethyl ether and propylene glycol monopropyl ether; and polar solvents, for example, esters such as propyl acetate, isobutyl acetate, butyl acetate, isopentyl acetate, pentyl acetate, 3-methoxybutyl acetate, 2-ethylbutyl acetate, cyclohexyl acetate and ethylene glycol monoacetate, ketones such as acetone, methyl ethyl ketone, methyl isobutyl ketone, butyl methyl ketone, cyclohexanone, methylcyclohexanone, dipropyl ketone, methyl pentyl ketone and diisobutyl ketone, and toluene. Further, other polar solvents such as N-methylpyrrolidone may be used. The dispersion media may be used singly, or two or more may be used in combination.

The solid concentration of the inorganic oxide fine particle dispersion is preferably in the range of 0.1 to 20 wt %, and more preferably 0.5 to 10 wt %. If the concentration of the inorganic oxide fine particle dispersion is low, the inorganic oxide fine particle layer has so small a thickness that the inorganic oxide fine particle layer may fail to form the desired irregularities or may fail to cover the entire surface. Consequently, sufficient water repellency, strength, hardness and scratch resistance may not be obtained.

With a high concentration, the inorganic oxide fine particle dispersion exhibits poor application properties and may fail to form the desired irregularities, although variable depending on the application methods. Further, the thickness of the inorganic oxide fine particle layer is so increased that transparency may be lowered or haze may be increased.

The inorganic oxide fine particle dispersion may be applied by any application method without limitation as long as the method can form an inorganic oxide fine particle layer substantially having the desired irregularities including depressions and protrusions. Examples include bar coater methods, dipping methods, spraying methods, spinner methods, roll coating methods, gravure coating methods and slit coating methods.

After the application of the inorganic oxide fine particle dispersion, the wet film is preferably dried. The drying method may be conventional. For example, the drying temperature is not particularly limited as long as the dispersion medium of the inorganic oxide fine particle dispersion can be substantially removed, but is usually 50 to 120° C., and preferably 60 to 100° C.

In the invention, it is preferable that the following step (c) be performed before the step (d) described later.

Step (c)

(c) A binder coating liquid is applied to form an inorganic oxide fine particle layer containing a binder.

The binder is not particularly limited as long as it can bind the inorganic oxide fine particles and enhance the adhesion with the substrate, and the strength and the hardness of the water-repellent transparent coating. A preferred binder is a silica prepared from a silica sol, an acidic silicic acid solution or a hydrolyzable organosilicon compound.

In particular, a preferred binder is a silica binder that is a hydrolyzate polycondensate of a hydrolyzable organosilicon compound represented by Formula (6) below.

$$R_n\text{—}SiX_{4-n} \quad (6)$$

(In the formula, R is a non-substituted or substituted hydrocarbon group having 1 to 10 carbon atoms; X is an alkoxy group having 1 to 4 carbon atoms, a hydroxyl group, a halogen or hydrogen; and n is an integer of 0 to 1.)

Examples of the hydrolyzable organosilicon compounds include those hydrolyzable organosilicon compounds mentioned with respect to Formula (2).

Examples of the dispersion media of the binder coating liquids include those dispersion media mentioned with respect to the inorganic oxide fine particle dispersions.

The concentration of the binder coating liquid is preferably in the range of 0.05 to 20 wt %, and more preferably 0.1 to 10 wt % in terms of oxide or $R_n\text{—}SiO_{(4-n)/2}$.

This concentration ensures that the binder coating liquid may be applied uniformly to the inorganic oxide fine particle layer, although variable depending on the application method, and that the binder binds the inorganic oxide fine particles to form an inorganic oxide fine particle layer having excellent strength and hardness and excellent adhesion with the substrate.

The binder coating liquid is used so that the amount of the binder in terms of oxide ($R_n\text{—}SiO_{(4-n)/2}$) will be in the range of 1 to 200 parts by weight, and further 10 to 190 parts by weight in said layer.

If the amount of the binder coating liquid applied is small, the inorganic oxide fine particle layer may exhibit insufficient properties such as adhesion with the substrate, strength and hardness.

If the amount of the binder coating liquid applied is excessively large, the surface irregularities and the surface roughness are decreased and consequently the obtainable final water-repellent transparent coating may exhibit insufficient water repellency.

The binder coating liquid may be applied by any method without limitation as long as the liquid may be applied uniformly to the fine particle layer. Examples include bar coater methods, dipping methods, spraying methods, spinner methods, roll coating methods, gravure coating methods and slit coating methods.

After the application of the binder coating liquid, the wet film is preferably dried. The drying method may be conventional. For example, the drying temperature is not particularly limited as long as the dispersion medium of the binder coating liquid can be substantially removed, but is usually 50 to 120° C., and preferably 60 to 100° C.

Further, heat treatment may be performed as required.

The heat treatment temperature may be variable depending on the type of the substrate, but is preferably in the range of 130 to 700° C., and more preferably 150 to 500° C.

Step (d)

Next, an overcoating layer-forming liquid is applied to form an overcoating layer.

The overcoating layer-forming liquid is not particularly limited as long as it can bond to the inorganic oxide fine particle layer and enhance water repellency. In the invention, it is preferable to use a hydrolyzate of a fluorine-containing hydrolyzable organosilicon compound represented by Formula (7) below.

$$R_n\text{—}SiX_{4-n} \quad (7)$$

(In the formula, R is a fluorine-substituted hydrocarbon group having 1 to 10 carbon atoms, and may be the same or different; X is an alkoxy group having 1 to 4 carbon atoms, a hydroxyl group, a halogen or hydrogen; and n is an integer of 1 to 3.)

Examples of the hydrolyzable organosilicon compounds include those hydrolyzable organosilicon compounds represented by Formula (3).

Preferably, the overcoating layer-forming liquid further includes a hydrolyzable organosilicon compound represented by Formula (8) below and/or a hydrolyzate thereof.

$$SiX_4 \quad (8)$$

(In the formula, X: an alkoxy group having 1 to 4 carbon atoms, a hydroxyl group, a halogen or hydrogen.)

Examples of the hydrolyzable organosilicon compounds include tetramethoxysilane, tetraethoxysilane, tetrapropoxysilane and tetrabutoxysilane.

In the overcoating layer-forming liquid, the amount of the hydrolyzable organosilicon compound represented by Formula (8) and/or the hydrolyzate thereof is preferably in the range of 0 to 100 parts by weight, and more preferably 0 to 50 parts by weight in terms of $SiO_2$ with respect to 100 parts by weight of the hydrolyzable organosilicon compound represented by Formula (7) and/or the hydrolyzate of the hydrolyzable organosilicon compound in terms of $R_n\text{—}SiO_{(4-n)/2}$.

This amount of the hydrolyzable organosilicon compound represented by Formula (8) and/or the hydrolyzate thereof ensures that the obtainable water-repellent transparent coating-substrate assembly achieves enhancements in properties such as strength and hardness without causing decreases in water repellency, transparency and haze.

Examples of the dispersion media of the overcoating layer-forming liquids include those dispersion media mentioned with respect to the inorganic oxide fine particle dispersions.

The concentration of the overcoating layer-forming liquid is preferably in the range of 0.05 to 20 wt %, and more preferably 0.1 to 10 wt % in terms of $[R_n\text{—}SiO_{(4-n)/2}+SiO_2]$.

If the concentration of the overcoating layer-forming liquid is low, the overcoating layer may fail to cover the entire surface and the presence of such uncovered areas may lead to insufficient water repellency, strength, hardness and scratch resistance. If the concentration of the overcoating layer-forming liquid is excessively high, the desired irregularities may not be obtained. Further, such heavy application does not correspondingly increase water repellency and may result in insufficient strength and hardness of the water-repellent transparent coating.

The amount of the overcoating layer-forming liquid applied is preferably in the range of 1 to 100 parts by weight, and more preferably 1 to 80 parts by weight in terms of $[R_n\text{—}SiO_{(4-n)/2}+SiO_2]$ with respect to 100 parts by weight of the inorganic oxide fine particles as oxide (1) in the inorganic oxide fine particle dispersion applied in the step (b).

If the amount of the overcoating layer-forming liquid applied is small, the overcoating layer may fail to cover the entire surface and the presence of such uncovered areas may lead to insufficient water repellency, strength, hardness and scratch resistance. If the amount of the overcoating layer-forming liquid applied is excessively large, the desired irregularities may not be obtained. Further, such heavy application does not correspondingly increase water repellency and may result in insufficient strength and hardness of the water-repellent transparent coating.

The overcoating layer-forming liquid may be applied by any method without limitation as long as the liquid may be applied uniformly to the fine particle layer. Examples include bar coater methods, dipping methods, spraying methods, spinner methods, roll coating methods, gravure coating methods and slit coating methods.

After the application of the overcoating layer-forming liquid, the wet film is preferably dried. The drying method may be conventional. For example, the drying temperature is not particularly limited as long as the dispersion medium of the coating liquid can be substantially removed, but is usually 50 to 120° C., and preferably 60 to 100° C.

Step (e)

Next, heat treatment is performed.

The heat treatment temperature may be variable depending on the type of the substrate, but is preferably in the range of 80 to 300° C., and more preferably 130 to 250° C.

In the case where the overcoating layer has been dried at 80 to 120° C., the heat treatment in the step (e) may be omitted at times.

The drying and the heat treatment enhance the bonding between the inorganic oxide fine particle layer or the binder-containing inorganic oxide fine particle layer and the overcoating layer on the inorganic oxide fine particle layer, thus increasing strength, hardness and adhesion with the substrate.

If the drying temperature is low, the drying will result in insufficient bonding between the fine particle layer composed of the inorganic oxide fine particles and the binder, and the overcoating layer on the fine particle layer. As a result, the coating may exhibit insufficient strength, hardness and adhesion with the substrate.

If the drying temperature is excessively high, the fluorine-substituted hydrocarbon groups present in the fluorine-containing silica layer will be decomposed and the coating may exhibit insufficient water repellency, strength, hardness and adhesion.

EXAMPLES

The present invention will be described in further detail by presenting Examples hereinbelow without limiting the scope of the invention to such Examples.

Example A1

Preparation of Alumina Hydrate Fine Particle (1) Dispersion

A 100 L titanium tank fitted with a steam jacket heater was loaded with 55.987 kg of pure water, and 3.532 kg of aluminum chloride hexahydrate (manufactured by KANTO CHEMICAL CO., INC.: Cica Special Grade, $AlCl_3.6H_2O$ concentration 98 wt %) was dissolved therein. To the solution, 2.710 kg of sodium hydroxide (manufactured by KANTO CHEMICAL CO., INC.: Cica Special Grade, NaOH concentration 48 wt %) was admixed. While performing stirring, the mixture was heated to 80° C. and was held for 1 hour. Thus, 62.229 kg of an alumina hydrogel slurry (1-1) having a pH of 4.0 was obtained.

While keeping the alumina hydrogel slurry (1-1) at 80° C. and performing stirring, there was admixed 0.620 kg of sodium hydroxide (manufactured by KANTO CHEMICAL CO., INC.: Cica Special Grade, 48 wt % NaOH). While performing stirring, the mixture was held at 80° C. for 1 hour to give 62.849 kg of an alumina hydrogel slurry (1-2) having a pH of 8.5. While keeping the alumina hydrogel slurry (1-2) at 80° C. and performing stirring, there was admixed 2.777 kg of an aqueous aluminum chloride solution of 1.314 kg of aluminum chloride hexahydrate (manufactured by KANTO CHEMICAL CO., INC.: Cica Special Grade, 98 wt % $AlCl_3.6H_2O$) in 1.463 kg of pure water. While performing stirring, the mixture was held at 80° C. for 1 hour to give 65.626 kg of an alumina hydrogel slurry (1-3) having a pH of 4.5.

While keeping the alumina hydrogel slurry (1-3) at 80° C. and performing stirring, there was admixed 1.241 kg of sodium hydroxide (manufactured by KANTO CHEMICAL CO., INC.: Cica Special Grade, 48 wt % NaOH). While performing stirring, the mixture was held at 80° C. for 1 hour to give 66.867 kg of an alumina hydrogel slurry (1-4) having a pH of 9.5. The alumina hydrogel slurry (1-4) was packed into an ultrafiltration machine and was concentrated to 4.5 wt % in terms of $Al_2O_3$.

The alumina hydrogel slurry (1-4) having a concentration in terms of $Al_2O_3$ of 4.5 wt % was washed with hot pure water at 60° C. until the concentration of residual sodium and chlorine was decreased to 10 ppm or below. Thus, an alumina hydrogel slurry (1-5) having a concentration in terms of $Al_2O_3$ of 5 wt % was obtained.

Next, 33 g of a cation exchange resin (SK-1BH: manufactured by Mitsubishi Chemical Corporation) was added to 1000 g of the alumina hydrogel slurry (1-5). Dealkalization treatment was performed by stirring the mixture for 1 hour.

After the cation exchange resin was separated, 33 g of an anion exchange resin (SANUPC: manufactured by Mitsubishi Chemical Corporation) was added, and anion removal treatment was performed by stirring the mixture for 1 hour. Next, 33 g of a cation exchange resin (SK-1BH: manufactured by Mitsubishi Chemical Corporation) was added again, and the mixture was stirred for 1 hour to perform dealkalization treatment. In this manner, an alumina hydrate fine particle (1) dispersion having a concentration in terms of $Al_2O_3$ of 4.8 wt % was obtained.

The solvent of the dispersion was replaced by methanol with use of an ultrafiltration membrane, and thereby an alumina hydrate fine particle (1) methanol dispersion having a solid concentration of 8 wt % was obtained.

A portion of the alumina hydrate fine particle (1) methanol dispersion was dried and was micrographed with a scanning electron microscope (SEM), the result being shown in FIG. 1.

The average particle length ($L_F$) and the average particle width ($W_F$) were measured, the results being described in the table.

Next, 1.88 g of tetraethoxysilane (ethyl orthosilicate-A: manufactured by Tama Chemicals Co., Ltd., $SiO_2$ concentration 28.8 wt %) was admixed to 100 g of the alumina hydrate fine particle (1) methanol dispersion having a solid concentration of 8 wt %. Subsequently, 3.1 g of ultrapure water was added. The mixture was stirred at 50° C. for 6 hours to give a surface-treated alumina hydrate fine particle (1) methanol dispersion having a solid concentration of 8 wt %.

To 100 g of the surface-treated alumina hydrate fine particle (1) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated alumina hydrate fine particle (1) dispersion with a solid concentration of 2 wt % for the formation of an inorganic oxide fine particle layer.

Preparation of Binder Coating Liquid (1)

10.0 g of water and 0.1 g of 61 wt % nitric acid were added to 72.5 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 10 minutes. Next, 17.4 g of tetraethoxysilane (ethyl orthosilicate-A: manufactured by Tama Chemicals Co., Ltd., $SiO_2$ concentration 28.8 wt %) was added. The mixture was stirred at 30° C. for 30 minutes to form a tetraethoxysilane hydrolyzate (solid concentration 5.0 wt %, molecular weight: 1000). Next, there were added 333.3 g of diacetone alcohol (DAA), 666.6 g of ethylene glycol monoisopropyl ether (I-PG) and 566.67 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a silica binder coating liquid (1) having a solid concentration of 0.3 wt %.

Preparation of Overcoating Layer-Forming Liquid (1)

159.0 g of water and 3.3 g of 61 wt % nitric acid were added to 2252.5 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 5 minutes. Next, 46.4 g of tridecafluorooctyltrimethoxysilane (TSL8257: manufactured by MOMENTIVE, solid concentration 98%) was added. The mixture was stirred at 25° C. for 5 minutes and was thereafter treated in an autoclave at 100° C. for 3 hours. Thereafter, 356.39 g of PGME and 213.91 g of DAA were added, and the mixture was treated at 25° C. for 30 minutes to give a fluorine-containing silica-based layer-forming liquid having a solid concentration of 1.50 wt %.

Next, 10 g of PGME and 40 g of a mixed alcohol (SOLMIX A-11: manufactured by Japan Alcohol Trading Co., Ltd., a mixed alcohol including methanol, ethanol and isopropyl alcohol) were added to 100 g of the fluorine-containing silica-based layer-forming liquid having a solid concentration of 1.50 wt %. In this manner, an overcoating layer-forming liquid (1) having a solid concentration of 1.0% was prepared.

Production of Water-repellent transparent coating-substrate assembly (1)

First, a glass substrate (FL glass: manufactured by Hamashin Glass Inc., thickness: 3 mm, refractive index: 1.51) was coated with the surface-treated alumina hydrate fine particle (1) dispersion having a solid concentration of 2 wt % by a bar coater method (#3) so that the dry thickness would be as described in the table. The wet film was dried at 80° C. for 30 seconds. Next, the binder coating liquid (1) having a solid concentration of 0.3 wt % was applied onto the surface-treated alumina hydrate fine particle (1) layer with a spin coater so that the content described in the table would be obtained. The wet film was dried at 80° C. for 120 seconds and was cured at 150° C. for 30 minutes.

The overcoating layer-forming liquid (1) having a solid concentration of 1.0 wt % was applied by a bar coater method (#4) so that the content described in the table would be obtained. The wet film was dried at 80° C. for 120 seconds and was dried and cured at 150° C. for 10 minutes. In this manner, a water-repellent transparent coating-substrate assembly (1) was produced.

The water-repellent transparent coating-substrate assembly (1) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table. The total transmittance and the haze were measured with a haze meter (manufactured by Suga Test Instruments Co., Ltd.). The uncoated glass had a total transmittance of 99.0% and a haze of 0.1%.

The pencil hardness, the scratch resistance, the water repellency and the adhesion were measured by the following methods.

Pencil Hardness

The pencil hardness was measured with a pencil hardness tester in accordance with JIS-K-5600.
Evaluation Criteria:
2H or harder: ⊙
H: ○
HB: Δ
B or less: X Scratch Resistance The surface of the coating was rubbed with steel wool #0000 ten times under a load of 200 g/cm². The surface was visually inspected and evaluated based on the following criteria. The results are described in Table 1.
Evaluation Criteria:
No streak flaws: ⊙
Slight streak flaws: ○
Many streak flaws: Δ
Worn surface: X Water Repellency The water contact angle was measured with an automated contact angle meter (DM 700: manufactured by Kyowa Interface Science Co., Ltd.).

Adhesion

The surface of the water-repellent transparent coating-substrate assembly (1) was cut with a knife to create one hundred squares defined by parallel eleven flaws both in longitudinal and lateral directions with 1 mm intervals. Cellophane tape was applied to the square pattern and was peeled therefrom. The number of squares remaining without separation was counted, and the adhesion was evaluated based on the following criteria.
100 Squares remained.: ⊙
95-99 Squares remained.: ○
90-94 Squares remained.: Δ
89 Or less squares remained.: X Example A2

Preparation of Alumina Hydrate Fine Particle (2) Dispersion

A 100 L tank fitted with a steam jacket was loaded with 38.743 kg of pure water. While performing stirring, 0.815 kg of a 48 wt % sodium hydroxide solution (manufactured by KANTO CHEMICAL CO., INC.: Special Grade) was added. While performing stirring, 2.740 kg of sodium aluminate (manufactured by KANTO CHEMICAL CO., INC.: Cica First Grade, 39 wt % in terms of alumina) was dissolved in the solution.

While performing stirring, the solution was heated to 80° C. and was held for 1 hour. Consequently, 42.298 kg of a complete aqueous sodium aluminate solution was obtained. Separately, a 10 L tank fitted with a steam jacket was loaded with 6.269 kg of pure water. While performing stirring, 0.453 kg of a 35 wt % aqueous hydrochloric acid solution (manufactured by KANTO CHEMICAL CO., INC.: Special Grade) was mixed with the water. The mixture was heated. Thus, 6.722 kg of a diluted aqueous hydrochloric acid solution having a temperature of 80° C. was obtained.

While keeping the aqueous sodium aluminate solution at 80° C., the diluted aqueous hydrochloric acid solution was added. While performing stirring, the mixture was held at 80° C. for 1 hour. In this manner, 49.020 kg of a square alumina hydrate fine particle (2-a) dispersion having a pH of 11.5 was obtained.
<Step (a)>

The alumina fine particle (2-a) dispersion was separated by filtration, and a sufficient amount of 80° C. pure water was poured onto the residue. Thus, 6.667 kg of a washed alumina hydrate fine particle (2-b) cake was obtained. <Step (b)>

12.983 kg of pure water was added to 6.667 kg of the alumina fine particle (2-b) cake, and the cake was dispersed by sufficient stirring, thereby preparing 19.650 kg of an alumina hydrate fine particle dispersion. There was added 0.35 kg of an aqueous tetramethylammonium hydroxide (TMAOH) solution (manufactured by KANTO CHEMICAL CO., INC.: concentration 27 wt %) as an organic basic compound. In this manner, 20.0 kg of an organic basic compound-alumina hydrate fine particle (2-c) dispersion was obtained. <Step (c)>

The basic compound-alumina fine particle (2-c) dispersion was added to an autoclave reactor and was heated to 150° C. while performing stirring. The dispersion was subjected to hydrothermal treatment at its vapor pressure for 24 hours. An alumina hydrate fine particle (2-d) dispersion was thus obtained. <Step (d)>

The alumina hydrate fine particle (2-d) dispersion was added to an ultrafiltration machine and was washed sufficiently until the concentration of residual nitrogen in terms of tetramethylammonium was decreased to 10 ppm or below. In this manner, 20.000 kg of an alumina hydrate fine particle (2) dispersion having a solid concentration of 5 wt % was obtained.
<Step (e)>

The average particle diameter ($D_P$) and the average particle thickness ($T_P$) of the alumina hydrate fine particles (2) were measured, the results being described in the table. The alumina hydrate fine particles (2) were secondary particles having sizes of 100 to 200 nm in which five to ten primary crystal particles in the form of squares 30 to 50 nm on a side and 3 to 5 nm in thickness were aggregated in such a manner that at least two sides were stacked without overlapping one another.

The solvent of the dispersion was replaced by methanol with use of an ultrafiltration membrane, and an alumina hydrate fine particle (2) methanol dispersion having a solid concentration of 8 wt % was obtained. 1.88 g of tetraethoxysilane (ethyl orthosilicate-A: manufactured by Tama Chemicals Co., Ltd., $SiO_2$ concentration 28.8 wt %) was admixed to 100 g of the alumina hydrate fine particle (2) methanol dispersion having a solid concentration of 8 wt %. Subsequently, 3.1 g of ultrapure water was added. The mixture was stirred at 50° C. for 6 hours to give a surface-treated alumina hydrate fine particle (2) methanol dispersion having a solid concentration of 8 wt %.

To 100 g of the surface-treated alumina hydrate fine particle (2) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated alumina hydrate fine particle (2) dispersion with a solid concentration of 2 wt % for the formation of an alumina hydrate fine particle layer.

Production of Water-repellent transparent coating-substrate assembly (2)

A glass substrate (FL glass: manufactured by Hamashin Glass Inc., thickness: 3 mm, refractive index: 1.51) was coated with the surface-treated alumina hydrate fine particle (2) dispersion having a solid concentration of 2 wt % by a bar coater method (#3). The wet film was dried at 80° C. for 120 seconds and at 150° C. for 10 minutes.

Next, similarly to Example A1, the binder coating liquid (1) having a solid concentration of 0.3 wt % was applied with a spin coater so that the dry thickness described in the table would be obtained. The wet film was dried at 80° C. for 30 seconds and was cured at 150° C. for 30 minutes. Similarly to Example A1, the overcoating layer-forming liquid (1) having a solid concentration of 1.0% was applied by a bar coater method (#4). The wet film was dried at 80° C. for 120 seconds and was dried and cured at 150° C. for 10 minutes. In this manner, a water-repellent transparent coating-substrate assembly (2) was produced.

The water-repellent transparent coating-substrate assembly (2) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A3

Preparation of Alumina Hydrate Fine Particle (3) Dispersion

An alumina hydrate fine particle (3) dispersion was prepared in the same manner as in Example A2, except that the dispersion was heated at 110° C. in the step (d).

The average particle diameter ($D_P$) and the average particle thickness ($T_P$) of the alumina hydrate fine particles (3) were measured, the results being described in the table.

Next, 1.88 g of tetraethoxysilane (ethyl orthosilicate-A: manufactured by Tama Chemicals Co., Ltd., $SiO_2$ concentration 28.8 wt %) was admixed to 100 g of the alumina hydrate fine particle (3) methanol dispersion having a solid concentration of 8 wt %. Subsequently, 3.1 g of ultrapure water was added. The mixture was stirred at 50° C. for 6 hours to give a surface-treated alumina hydrate fine particle (3) methanol dispersion having a solid concentration of 8 wt %.

To 100 g of the surface-treated alumina hydrate fine particle (3) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated alumina hydrate fine particle (3) dispersion with a solid concentration of 2 wt % for the formation of an alumina hydrate fine particle layer.

Production of Water-repellent transparent coating-substrate assembly (3)

A glass substrate (FL glass: manufactured by Hamashin Glass Inc., thickness: 3 mm, refractive index: 1.51) was coated with the surface-treated alumina hydrate fine particle (3) dispersion having a solid concentration of 2 wt % by a bar coater method (#3) so that the thickness described in the table would be obtained. The wet film was dried at 80° C. for 30 seconds. Similarly to Example A1, the binder coating liquid (1) having a solid concentration of 0.3 wt % was applied with a spin coater. The wet film was dried at 80° C. for 120 seconds and was cured at 150° C. for 30 minutes.

Next, similarly to Example A1, the overcoating layer-forming liquid (1) having a solid concentration of 1.0% was applied by a bar coater method (#4). The wet film was dried at 80° C. for 120 seconds and was dried and cured at 150° C. for 10 minutes. In this manner, a water-repellent transparent coating-substrate assembly (3) was produced. The water-repellent transparent coating-substrate assembly (3) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A4

Preparation of Alumina Hydrate Fine Particle (4) Dispersion

An alumina hydrate fine particle (4) dispersion was prepared in the same manner as in Example A2, except that the dispersion was heated at 180° C. in the step (d).

The average particle diameter ($D_P$) and the average particle thickness ($T_P$) of the alumina hydrate fine particles (4) were measured, the results being described in the table.

Next, 1.88 g of tetraethoxysilane (ethyl orthosilicate-A: manufactured by Tama Chemicals Co., Ltd., $SiO_2$ concentration 28.8 wt %) was admixed to 100 g of the alumina hydrate fine particle (4) methanol dispersion having a solid concentration of 8 wt %. Subsequently, 3.1 g of ultrapure water was added. The mixture was stirred at 50° C. for 6 hours to give a surface-treated alumina hydrate fine particle (4) methanol dispersion having a solid concentration of 8 wt %.

To 100 g of the surface-treated alumina hydrate fine particle (4) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated alumina hydrate fine particle (4) dispersion with a solid concentration of 2 wt % for the formation of an alumina hydrate fine particle layer.

Production of Water-Repellent Transparent Coating-Substrate Assembly (4)

A glass substrate (FL glass: manufactured by Hamashin Glass Inc., thickness: 3 mm, refractive index: 1.51) was coated with the surface-treated alumina hydrate fine particle (4) dispersion having a solid concentration of 2 wt % by a bar coater method (#3). The wet film was dried at 80° C. for 30 seconds. Similarly to Example A1, the binder coating liquid (1) having a solid concentration of 0.3 wt % was applied with a spin coater. The wet film was dried at 80° C. for 120 seconds and was cured at 150° C. for 30 minutes.

Next, similarly to Example A1, the overcoating layer-forming liquid (1) having a solid concentration of 1.0% was applied by a bar coater method (#4). The wet film was dried at 80° C. for 120 seconds and was dried and cured at 150° C. for 10 minutes. In this manner, a water-repellent transparent coating-substrate assembly (4) was produced. The water-repellent transparent coating-substrate assembly (4) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A5

Production of Water-repellent transparent coating-substrate assembly (5)

A glass substrate (FL glass: manufactured by Hamashin Glass Inc., thickness: 3 mm, refractive index: 1.51) was coated with a surface-treated alumina hydrate fine particle (2) dispersion with a solid concentration of 2 wt % that had been prepared in the same manner as in Example A2, by a bar coater method (#3) so that the thickness described in the table would be obtained. The wet film was dried at 80° C. for 30 seconds.

Next, a binder coating liquid (2) which had been prepared in the same manner as in Example A1 except that the solid concentration was 0.1 wt % was applied with a spin coater so that the content described in the table would be obtained. The wet film was dried at 80° C. for 120 seconds and was cured at 150° C. for 30 minutes. Similarly to Example A1, the overcoating layer-forming liquid (1) having a solid concentration of 1.0 wt % was applied by a bar coater method (#4). The wet film was dried at 80° C. for 120 seconds and was dried and cured at 150° C. for 10 minutes. In this manner, a water-repellent transparent coating-substrate assembly (5) was produced.

The water-repellent transparent coating-substrate assembly (5) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A6

Production of Water-repellent transparent coating-substrate assembly (6)

A glass substrate (FL glass: manufactured by Hamashin Glass Inc., thickness: 3 mm, refractive index: 1.51) was coated with a surface-treated alumina hydrate fine particle (2) dispersion with a solid concentration of 2 wt % that had been prepared in the same manner as in Example A2, by a bar coater method (#3). The wet film was dried at 80° C. for 30 seconds. Next, a binder coating liquid (3) which had been prepared in the same manner as in Example A1 except that the solid concentration was 3 wt % was applied with a spin coater so that the content described in the table would be obtained. The wet film was dried at 80° C. for 120 seconds and was cured at 150° C. for 30 minutes.

Similarly to Example A1, the overcoating layer-forming liquid (1) having a solid concentration of 1.0 wt % was applied by a bar coater method (#4). The wet film was dried at 80° C. for 120 seconds and was dried and cured at 150° C. for 10 minutes. In this manner, a water-repellent transparent coating-substrate assembly (6) was produced.

The water-repellent transparent coating-substrate assembly (6) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A7

Production of Water-repellent transparent coating-substrate assembly (9)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds.

Similarly to Example A1, the binder coating liquid (1) having a solid concentration of 0.3 wt % was applied with a spin coater. The wet film was dried at 80° C. for 120 seconds and was cured at 150° C. for 30 minutes.

Next, an overcoating layer-forming liquid (2) which had been prepared in the same manner as in Example A1 except that the solid concentration was 0.5 wt % was applied by a bar coater method (#4) so that the content described in the table would be obtained. The wet film was dried at 80° C. for 120 seconds and was dried and cured at 150° C. for 10 minutes. In this manner, a water-repellent transparent coating-substrate assembly (7) was produced.

The water-repellent transparent coating-substrate assembly (7) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A8

Production of Water-repellent transparent coating-substrate assembly (8)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds.

Next, similarly to Example A1, the binder coating liquid (1) having a solid concentration of 0.3 wt % was applied with a spin coater. The wet film was dried at 80° C. for 120 seconds and was cured at 150° C. for 30 minutes. An overcoating layer-forming liquid (3) which had been prepared in the same manner as in Example A1 except that the solid concentration was 1.5 wt % was applied by a bar coater method (#4) so that the content described in the table would be obtained. The wet film was dried at 80° C. for 120 seconds and was dried and cured at 150° C. for 10 minutes. In this manner, a water-repellent transparent coating-substrate assembly (8) was produced.

The water-repellent transparent coating-substrate assembly (8) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A9

Preparation of Overcoating Layer-Forming Liquid (4)

159.0 g of water and 3.3 g of 61 wt % nitric acid were added to 5126 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 5 minutes. There were added 46.4 g of tridecafluorooctyltrimethoxysilane (TSL8257: manufactured by MOMENTIVE, solid concentration 98%) and 157.9 g of tetraethoxysilane (ethyl orthosilicate-A: manufactured by Tama Chemicals Co., Ltd., $SiO_2$ concentration 28.8 wt %). The mixture was stirred at 25° C. for 5 minutes and was thereafter treated in an autoclave at 100° C. for 3 hours. Thereafter, 356.39 g of PGME and 213.91 g of DAA were added, and the mixture was treated at 25° C. for 30 minutes to give an overcoating layer-forming liquid having a solid concentration of 1.50 wt %.

Next, 10 g of PGME and 40 g of a mixed alcohol (SOLMIX A-11: manufactured by Japan Alcohol Trading Co., Ltd., a mixed alcohol including methanol, ethanol and isopropyl alcohol) were added to 100 g of the fluorine-containing silica-based layer-forming liquid having a solid concentration of 1.50 wt %. In this manner, an overcoating layer-forming liquid (4) having a solid concentration of 1.0% was prepared.

Production of Water-repellent transparent coating-substrate assembly (9)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds. Similarly to Example A1, the binder coating liquid (1) having a solid concentration of 0.3 wt % was applied with a spin coater. The wet film was dried at 80° C. for 120 seconds and was cured at 150° C. for 30 minutes.

Next, the overcoating layer-forming liquid (4) having a solid concentration of 1.0 wt % was applied by a bar coater method (#3) so that the content described in the table would be obtained. The wet film was dried at 80° C. for 120 seconds and was dried and cured at 150° C. for 10 minutes. In this manner, a water-repellent transparent coating-substrate assembly (9) was produced.

The water-repellent transparent coating-substrate assembly (9) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A10

Preparation of Overcoating Layer-Forming Liquid (5)

159.0 g of water and 3.3 g of 61 wt % nitric acid were added to 1771.0 g of a mixed alcohol (SOLMIX A-11: manufactured by Japan Alcohol Trading Co., Ltd., a mixed alcohol including methanol, ethanol and isopropyl alcohol).

The mixture was stirred at 25° C. for 5 minutes. There was added 47.3 g of 3,3,3-trifluoropropyltrimethoxysilane (KBM-7103: manufactured by Shin-Etsu Chemical Co., Ltd., concentration 100 wt %). The mixture was stirred at 25° C. for 5 minutes and was thereafter treated in an autoclave at 100° C. for 3 hours. Thereafter, 356.39 g of PGME and 213.91 g of DAA were added, and the mixture was treated at 25° C. for 30 minutes to give an overcoating layer-forming liquid having a solid concentration of 1.50 wt %.

Next, 10 g of PGME and 40 g of a mixed alcohol (SOLMIX A-11: manufactured by Japan Alcohol Trading Co., Ltd., a mixed alcohol including methanol, ethanol and isopropyl alcohol) were added to 100 g of the overcoating layer-forming liquid having a solid concentration of 1.50 wt %. In this manner, an overcoating layer-forming liquid (5) having a solid concentration of 1.0% was prepared.

Production of Water-repellent transparent coating-substrate assembly (10)

By a bar coater method (#3), a glass substrate (FL glass: manufactured by Hamashin Glass Inc., thickness: 3 mm, refractive index: 1.51) was coated with a surface-treated alumina hydrate fine particle (2) dispersion with a solid concentration of 2 wt % that had been prepared in the same manner as in Example A2. The wet film was dried at 80° C. for 30 seconds. Next, a silica binder coating liquid (1) having a solid concentration of 0.3 wt % that had been prepared in the same manner as in Example A1, was applied with a spin coater. The wet film was dried at 80° C. for 120 seconds and was cured at 150° C. for 30 minutes.

The overcoating layer-forming liquid (5) having a solid concentration of 1.0 wt % was applied by a bar coater method (#4). The wet film was dried at 80° C. for 120 seconds and was dried and cured at 150° C. for 10 minutes. In this manner, a water-repellent transparent coating-substrate assembly (10) was produced.

The water-repellent transparent coating-substrate assembly (10) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A11

Production of Water-repellent transparent coating-substrate assembly (11)

Similarly to Example A2, the surface-treated alumina hydrate fine particle (2) dispersion having a solid concentration of 2 wt % was applied to a PET film (A4300: manufactured by TOYOBO CO., LTD., thickness: 188 μm) by a bar coater method (#3) so that the thickness described in the table would be obtained. The wet film was dried at 80° C. for 30 seconds.

Next, similarly to Example A1, the binder coating liquid (1) having a solid concentration of 0.3 wt % was applied with a spin coater. The wet film was dried at 80° C. for 120 seconds and was cured at 150° C. for 30 minutes.

Similarly to Example A1, the overcoating layer-forming liquid (1) was applied by a bar coater method (#4). The wet film was dried at 80° C. for 120 seconds and was dried and cured at 150° C. for 10 minutes. In this manner, a water-repellent transparent coating-substrate assembly (11) was produced.

The water-repellent transparent coating-substrate assembly (11) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A12

Preparation of Primer Layer-Forming Liquid (1)

10.0 g of water and 0.1 g of 61 wt % nitric acid were added to 72.5 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 10 minutes. Next, 17.4 g of tetraethoxysilane (ethyl orthosilicate-A: manufactured by Tama Chemicals Co., Ltd., $SiO_2$ concentration 28.8 wt %) was added. The mixture was stirred at 30° C. for 30 minutes to form a tetraethoxysilane hydrolyzate (solid concentration 5.0 wt %, molecular weight: 1000). Next, there were added 66.7 g of diacetone alcohol (DAA), 133.3 g of ethylene glycol monoisopropyl ether (I-PG) and 33.3 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a primer layer-forming liquid (1) having a solid concentration of 1.5 wt %.

Production of Water-repellent transparent coating-substrate assembly (12)

The primer layer-forming liquid (1) having a solid concentration of 1.5 wt % was applied with a spin coater so that the thickness described in the table would be obtained. The wet film was dried at 80° C. for 120 seconds and was cured at 150° C. for 30 minutes. By a bar coater method (#3), the above-coated glass substrate (FL glass: manufactured by Hamashin Glass Inc., thickness: 3 mm, refractive index: 1.51) was coated with a surface-treated alumina hydrate fine particle (2) dispersion with a solid concentration of 2 wt % that had been prepared in the same manner as in Example A2. The wet film was dried at 80° C. for 30 seconds.

Next, similarly to Example A1, the binder coating liquid (1) having a solid concentration of 0.3 wt % was applied with a spin coater. The wet film was dried at 80° C. for 120 seconds and was cured at 150° C. for 30 minutes. Similarly to Example A1, the overcoating layer-forming liquid (1) was applied by a bar coater method (#4). The wet film was dried at 80° C. for 120 seconds and was dried and cured at 150° C. for 10 minutes. In this manner, a water-repellent transparent coating-substrate assembly (12) was produced.

The water-repellent transparent coating-substrate assembly (12) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A13

Preparation of Chain-Shaped Silica Fine Particle (5) Dispersion 334 g of an aqueous sodium silicate solution having a $SiO_2$ concentration of 24 wt % ($SiO_2/Na_2O$ molar ratio 3.1) was diluted with 1266 g of pure water, thereby preparing 1600 g of an aqueous sodium silicate solution having a $SiO_2$ concentration of 5 wt % (pH 11). To the aqueous sodium silicate solution, 320 g of a cation exchange resin (SK-1BH: manufactured by Mitsubishi Chemical Corporation) was added. The mixture was stirred for 1 hour, and the ion exchange resin was removed. The dealkalization treatment resulted in 1500 g of a silicic acid solution having a pH of 4.0 and a solid concentration of 5%. Next, 3500 g of pure water was added and the solid concentration was diluted to 1.9%. The liquid was placed into a separable flask. After the temperature was increased to 40° C., 100 g of a 10% aqueous ammonium acetate solution was added. The pH was adjusted to 4.1 with acetic acid, and heating was performed for 2 hours. Next, the pH was adjusted to 10.5 with a 5% aqueous ammonia solution. Thereafter, the temperature was increased to 95° C., and the liquid was heated at 90° C. for 2 hours and was cooled to 40° C. In this manner, a silica sol was obtained.

The resultant silica sol was concentrated with an ultrafiltration membrane (SIP-1013: manufactured by Asahi Kasei Corporation) until the $SiO_2$ concentration reached 13 wt % and was further concentrated with a rotary evaporator. The concentrate was filtered through a 44 μm mesh nylon filter. In this manner, an inorganic oxide fine particle (B1-2) dispersion having a $SiO_2$ concentration of 20 wt % was prepared.

The solvent of the dispersion was replaced by methanol with use of an ultrafiltration membrane, and thereby a methanol dispersion having a solid concentration of 8 wt % was obtained.

The chain-shaped silica fine particles (5) thus obtained had an average primary particle diameter ($D_C$) of 12 nm, a number of connected particles of 10 particles, and an average length ($L_C$) of 120 nm.

Next, 1.88 g of tetraethoxysilane (ethyl orthosilicate-A: manufactured by Tama Chemicals Co., Ltd., $SiO_2$ concentration 28.8 wt %) was admixed to 100 g of the chain-shaped silica fine particle (5) methanol dispersion having a solid concentration of 8 wt %. Subsequently, 3.1 g of ultrapure water was added. The mixture was stirred at 50° C. for 6 hours to give a surface-treated chain-shaped silica fine particle (5) methanol dispersion having a solid concentration of 8 wt %.

To 100 g of the surface-treated chain-shaped silica fine particle (5) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated chain-shaped silica fine particle (5) dispersion with a solid concentration of 2 wt % for the formation of an inorganic oxide fine particle layer.

Production of water-repellent transparent coating-substrate assembly (13)

Similarly to Example A2, a glass substrate (FL glass: manufactured by Hamashin Glass Inc., thickness: 3 mm, refractive index: 1.51) was coated with the surface-treated chain-shaped silica fine particle (5) dispersion with a solid concentration of 2 wt % by a bar coater method (#3). The wet film was dried at 80° C. for 120 seconds and at 150° C. for 10 minutes.

Next, an overcoating layer-forming liquid (1) having a solid concentration of 1.0% that had been prepared in the same manner as in Example A1 was applied by a bar coater method (#4). The wet film was dried at 80° C. for 120 seconds and was dried and cured at 150° C. for 10 minutes.

In this manner, a water-repellent transparent coating-substrate assembly (13) was produced.

The water-repellent transparent coating-substrate assembly (13) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A14

Production of Water-repellent transparent coating-substrate assembly (14)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 120 seconds and at 150° C. for 10 minutes.

Next, the overcoating layer-forming liquid (1) having a solid concentration of 1.0 wt % was applied by a bar coater method (#4). The wet film was dried at 80° C. for 120 seconds and was dried and cured at 150° C. for 10 minutes. In this manner, a water-repellent transparent coating-substrate assembly (14) was produced.

The water-repellent transparent coating-substrate assembly (14) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example A15

Production of Water-repellent transparent coating-substrate assembly (15)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds.

Next, a binder coating liquid (4) which had been prepared in the same manner as in Example A1 except that the solid concentration was 0.01 wt % was applied with a spin coater. The wet film was dried at 80° C. for 120 seconds and was cured at 150° C. for 30 minutes. Similarly to Example A1, the overcoating layer-forming liquid (1) having a solid concentration of 1.0 wt % was applied by a bar coater method (#4). The wet film was dried at 80° C. for 120 seconds and was dried and cured at 150° C. for 10 minutes. In this manner, a water-repellent transparent coating-substrate assembly (15) was produced.

The water-repellent transparent coating-substrate assembly (15) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example A1

Production of Water-repellent transparent coating-substrate assembly (R1)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds.

Next, a binder coating liquid (5) which had been prepared in the same manner as in Example A1 except that the solid concentration was 5 wt % was applied with a spin coater so that the content described in the table would be obtained. The wet film was dried at 80° C. for 120 seconds and was cured at 150° C. for 30 minutes.

A fluorine-containing silica-based layer-forming liquid (1) having a solid concentration of 1.0 wt % which had been prepared in the same manner as in Example A1 was applied by a bar coater method (#3). The wet film was dried at 80° C. for 30 seconds and was dried and cured at 150° C. for 10 minutes. In this manner, a water-repellent transparent coating-substrate assembly (R1) was produced.

The water-repellent transparent coating-substrate assembly (R1) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example A2

Preparation of Alumina Hydrate Fine Particle (R2) Dispersion

An alumina hydrate fine particle (R2) dispersion was prepared in the same manner as in Example A1, except that the dispersion was heated at 150° C. The average particle diameter ($D_P$) and the average particle thickness ($T_P$) of the alumina hydrate fine particles (R2) were measured, the results being described in the table.

Next, 1.88 g of tetraethoxysilane (ethyl orthosilicate-A: manufactured by Tama Chemicals Co., Ltd., SiO$_2$ concentration 28.8 wt %) was admixed to 100 g of the alumina hydrate fine particle (R2) methanol dispersion having a solid concentration of 8 wt %. Subsequently, 3.1 g of ultrapure water was added. The mixture was stirred at 50° C. for 6 hours to give a surface-treated alumina hydrate fine particle (R2) methanol dispersion having a solid concentration of 8 wt %.

To 100 g of the surface-treated alumina hydrate fine particle (R2) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated alumina hydrate fine particle (R2) dispersion with a solid concentration of 2 wt % for the formation of an inorganic oxide fine particle layer.

Production of Water-repellent transparent coating-substrate assembly (R2)

A water-repellent transparent coating-substrate assembly (R2) was produced in the same manner as in Example A1, except that the surface-treated alumina hydrate fine particle (R2) dispersion with a solid concentration of 2 wt % was applied so that the thickness described in the table would be obtained.

The water-repellent transparent coating-substrate assembly (R2) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example A3

An alumina hydrate fine particle (R3) dispersion was prepared in the same manner as in Example A2, except that the dispersion was heated at 250° C. in the step (d).

The average particle diameter ($D_P$) and the average particle thickness ($T_P$) of the alumina hydrate fine particles (R3) were measured, the results being described in the table.

The solvent of the dispersion was replaced by methanol with use of an ultrafiltration membrane, and thereby an alumina hydrate fine particle (R3) methanol dispersion having a solid concentration of 8 wt % was obtained. Next, 1.88 g of tetraethoxysilane (ethyl orthosilicate-A: manufactured by Tama Chemicals Co., Ltd., SiO$_2$ concentration 28.8 wt %) was admixed to 100 g of the alumina hydrate fine particle (R3) methanol dispersion having a solid concentration of 8 wt %. Subsequently, 3.1 g of ultrapure water was added. The mixture was stirred at 50° C. for 6 hours to give a surface-treated alumina hydrate fine particle (R3) methanol dispersion having a solid concentration of 8 wt %.

To 100 g of the surface-treated alumina hydrate fine particle (R3) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated alumina hydrate fine particle (R3) dispersion with a solid concentration of 2 wt % for the formation of an inorganic oxide fine particle layer.

Production of water-repellent transparent coating-substrate assembly (R3)

A water-repellent transparent coating-substrate assembly (R3) was produced in the same manner as in Example A1, except that the surface-treated alumina hydrate fine particle (R3) dispersion with a solid concentration of 2 wt % was used.

The water-repellent transparent coating-substrate assembly (R3) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example A4

Production of Water-repellent transparent coating-substrate assembly (R4)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds.

Next, similarly to Example A1, the binder coating liquid (1) having a solid concentration of 0.3 wt % was applied with a spin coater. The wet film was dried at 80° C. for 120 seconds and was cured at 150° C. for 30 minutes.

An overcoating layer-forming liquid (6) which had been prepared in the same manner as in Example A1 except that the solid concentration was 0.05 wt % was applied by a bar coater method (#3) so that the content described in the table would be obtained. The wet film was dried at 80° C. for 120 seconds and was dried and cured at 150° C. for 10 minutes. In this manner, a water-repellent transparent coating-substrate assembly (R4) was produced.

The water-repellent transparent coating-substrate assembly (R4) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example A5

Production of Water-repellent transparent coating-substrate assembly (R5)

Similarly to Example A2, a glass substrate (FL glass: manufactured by Hamashin Glass Inc., thickness: 3 mm, refractive index: 1.51) was coated with the surface-treated alumina hydrate fine particle (2) dispersion with a solid concentration of 2 wt % by a bar coater method (#3). The wet film was dried at 80° C. for 30 seconds. Next, similarly to Example A1, the binder coating liquid (1) having a solid concentration of 0.3 wt % was applied with a spin coater. The wet film was dried at 80° C. for 120 seconds and was cured at 150° C. for 30 minutes.

An overcoating layer-forming liquid (3) which had been prepared in the same manner as in Example A1 except that the solid concentration was 1.5 wt % was applied by a bar coater method (#12) so that the content described in the table would be obtained. The wet film was dried at 80° C. for 30 seconds and was dried and cured at 150° C. for 10 minutes. In this manner, a water-repellent transparent coating-substrate assembly (R5) was produced.

The water-repellent transparent coating-substrate assembly (R5) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

TABLE 1

Processes for producing water-repellent transparent coating-substrate assemblies
Step (b)

| | | Inorganic oxide fine particle dispersion | | | | | | | | | | | Drying | |
|---|---|---|---|---|---|---|---|---|---|---|---|---|---|---|
| | | Inorganic oxide fine particles | | | | | | | Surface treatment agent | | | | | |
| | | Fibers Average particle | | | Plates Average | | | | | | | | | |
| | | Average length ($L_F$) nm | Average particle width ($W_F$) nm | $L_F/W_F$ | Average particle diameter ($D_P$) nm | Plates Average thickness ($T_P$) nm | $D_P/T_P$ | | Materials | Treatment amount | C wt % | Temp. °C. | T sec |
| | Shapes | Materials | | | | | | | | | | | | |
| Ex. A1 | Fibers | $Al_2O_3$ | 300 | 30 | 10 | — | — | — | | Tetraethoxysilane | 10 | 2.0 | 80 | 30 |
| Ex. A2 | Plates | $Al_2O_3$ | — | — | — | 200 | 20 | 10 | | Tetraethoxysilane | 10 | 2.0 | 80 | 30 |
| Ex. A3 | Plates | $Al_2O_3$ | — | — | — | 50 | 5 | 10 | | Tetraethoxysilane | 10 | 2.0 | 80 | 30 |
| Ex. A4 | Plates | $Al_2O_3$ | — | — | — | 300 | 30 | 10 | | Tetraethoxysilane | 10 | 2.0 | 80 | 30 |
| Ex. A5 | Plates | $Al_2O_3$ | — | — | — | 200 | 20 | 10 | | Tetraethoxysilane | 10 | 2.0 | 80 | 30 |
| Ex. A6 | Plates | $Al_2O_3$ | — | — | — | 200 | 20 | 10 | | Tetraethoxysilane | 10 | 2.0 | 80 | 30 |
| Ex. A7 | Plates | $Al_2O_3$ | — | — | — | 200 | 20 | 10 | | Tetraethoxysilane | 10 | 2.0 | 80 | 30 |
| Ex. A8 | Plates | $Al_2O_3$ | — | — | — | 200 | 20 | 10 | | Tetraethoxysilane | 10 | 2.0 | 80 | 30 |
| Ex. A9 | Plates | $Al_2O_3$ | — | — | — | 200 | 20 | 10 | | Tetraethoxysilane | 10 | 2.0 | 80 | 30 |
| Ex. A10 | Plates | $Al_2O_3$ | — | — | — | 200 | 20 | 10 | | Tetraethoxysilane | 10 | 2.0 | 80 | 30 |
| Ex. A11 | Plates | $Al_2O_3$ | — | — | — | 200 | 20 | 10 | | Tetraethoxysilane | 10 | 2.0 | 80 | 30 |
| Ex. A12 | Plates | $Al_2O_3$ | — | — | — | 200 | 20 | 10 | | Tetraethoxysilane | 10 | 2.0 | 80 | 30 |
| Ex. A13 | Chains | $SiO_2$ | 120 (length) | 12 (primary particle diameter) | — | — | — | — | | Tetraethoxysilane | 2 | 2.0 | 80 | 30 |
| Ex. A14 | Plates | $Al_2O_3$ | — | — | — | 200 | 20 | 10 | | Tetraethoxysilane | 10 | 2.0 | 80 | 30 |
| Ex. A15 | Plates | $Al_2O_3$ | — | — | — | 200 | 20 | 10 | | Tetraethoxysilane | 10 | 2.0 | 80 | 30 |
| C. Ex. A1 | Plates | $Al_2O_3$ | — | — | — | 200 | 20 | 10 | | Tetraethoxysilane | 10 | 2.0 | 80 | 30 |
| C. Ex. A2 | Fibers | $Al_2O_3$ | 700 | 70 | 10 | — | — | — | | Tetraethoxysilane | 10 | 2.0 | 80 | 30 |
| C. Ex. A3 | Plates | $Al_2O_3$ | — | — | — | 500 | 50 | 10 | | Tetraethoxysilane | 10 | 2.0 | 80 | 30 |
| C. Ex. A4 | Plates | $Al_2O_3$ | — | — | — | 500 | 20 | — | | Tetraethoxysilane | 10 | 2.0 | 80 | 30 |
| C. Ex. A5 | Plates | $Al_2O_3$ | — | — | — | 200 | 20 | 10 | | Tetraethoxysilane | 10 | 2.0 | 80 | 30 |

TABLE 1-continued

Processes for producing water-repellent transparent coating-substrate assemblies

| | Step (c) | | | | | | | Step (d) | | | | | | |
|---|---|---|---|---|---|---|---|---|---|---|---|---|---|---|
| | Binder coating liquid | | Drying | | Heat treatment | | | Overcoating layer-forming liquid | | Drying | | Heat treatment | | |
| | Materials | C wt % | Temp. °C. | T min | Temp. °C. | T min | | Materials | C wt % | Temp. °C. | T sec | Temp. °C. | T min | |
| Ex. A1 | Tetraethoxysilane oligomer | 0.3 | 80 | 2 | 150 | 30 | | Tridecafluorooctyltrimethoxysilane | 1.0 | 80 | 30 | 150 | 10 | |
| Ex. A2 | Tetraethoxysilane oligomer | 0.3 | 80 | 2 | 150 | 30 | | Tridecafluorooctyltrimethoxysilane | 1.0 | 80 | 30 | 150 | 10 | |
| Ex. A3 | Tetraethoxysilane oligomer | 0.3 | 80 | 2 | 150 | 30 | | Tridecafluorooctyltrimethoxysilane | 1.0 | 80 | 30 | 150 | 10 | |
| Ex. A4 | Tetraethoxysilane oligomer | 0.3 | 80 | 2 | 150 | 30 | | Tridecafluorooctyltrimethoxysilane | 1.0 | 80 | 30 | 150 | 10 | |
| Ex. A5 | Tetraethoxysilane oligomer | 0.1 | 80 | 2 | 150 | 30 | | Tridecafluorooctyltrimethoxysilane | 1.0 | 80 | 30 | 150 | 10 | |
| Ex. A6 | Tetraethoxysilane oligomer | 3.0 | 80 | 2 | 150 | 30 | | Tridecafluorooctyltrimethoxysilane | 1.0 | 80 | 30 | 150 | 10 | |
| Ex. A7 | Tetraethoxysilane oligomer | 0.3 | 80 | 2 | 150 | 30 | | Tridecafluorooctyltrimethoxysilane | 0.5 | 80 | 30 | 150 | 10 | |
| Ex. A8 | Tetraethoxysilane oligomer | 0.3 | 80 | 2 | 150 | 30 | | Tridecafluorooctyltrimethoxysilane | 1.5 | 80 | 30 | 150 | 10 | |
| Ex. A9 | Tetraethoxysilane oligomer | 0.3 | 80 | 2 | 150 | 30 | | Tridecafluorooctyltrimethoxysilane Tetraethoxysilane | 1.0 | 80 | 30 | 150 | 10 | |
| Ex. A10 | Tetraethoxysilane oligomer | 0.3 | 80 | 2 | 150 | 30 | | 3,3,3-Trifluoropropyltrimethoxysilane | 1.0 | 80 | 30 | 150 | 10 | |
| Ex. A11 | Tetraethoxysilane oligomer | 0.3 | 80 | 2 | 150 | 30 | | Tridecafluorooctyltrimethoxysilane | 1.0 | 80 | 30 | 150 | 10 | |
| Ex. A12 | Tetraethoxysilane oligomer | 0.3 | 80 | 2 | 150 | 30 | | Tridecafluorooctyltrimethoxysilane | 1.0 | 80 | 30 | 150 | 10 | |
| Ex. A13 | — | — | — | — | — | — | | Tridecafluorooctyltrimethoxysilane | 1.0 | 80 | 30 | 150 | 10 | |
| Ex. A14 | — | — | — | — | — | — | | Tridecafluorooctyltrimethoxysilane | 1.0 | 80 | 30 | 150 | 10 | |
| Ex. A15 | Tetraethoxysilane oligomer | 0.01 | 80 | 2 | 150 | 30 | | Tridecafluorooctyltrimethoxysilane | 1.0 | 80 | 30 | 150 | 10 | |
| C. Ex. A1 | Tetraethoxysilane oligomer | 5 | 80 | 2 | 150 | 30 | | Tridecafluorooctyltrimethoxysilane | 1.0 | 80 | 30 | 150 | 10 | |
| C. Ex. A2 | Tetraethoxysilane oligomer | 0.3 | 80 | 2 | 150 | 30 | | Tridecafluorooctyltrimethoxysilane | 1.0 | 80 | 30 | 150 | 10 | |
| C. Ex. A3 | Tetraethoxysilane oligomer | 0.3 | 80 | 2 | 150 | 30 | | Tridecafluorooctyltrimethoxysilane | 1.0 | 80 | 30 | 150 | 10 | |
| C. Ex. A4 | Tetraethoxysilane oligomer | 0.3 | 80 | 2 | 150 | 30 | | Tridecafluorooctyltrimethoxysilane | 0.05 | 80 | 30 | 150 | 10 | |
| C. Ex. A5 | Tetraethoxysilane oligomer | 0.3 | 80 | 2 | 150 | 30 | | Tridecafluorooctyltrimethoxysilane | 1.5 | 80 | 30 | 150 | 10 | |

TABLE 1-continued

Water-repellent transparent coating-substrate assemblies

| | Substrate Material | Primer layer Material | Primer layer Thickness nm | Inorganic oxide fine particle layer Average thickness nm | Silica binder Content Parts by weight | Overcoat layer Content Parts by weight | Irregularities Average height ($T_F$) nm | Irregularities Pitch width ($W_F$) nm | Irregularities Aspect ratio $T_F/W_F$ | Finer irregularities Average height ($T_{FF}$) nm | Finer irregularities Pitch width ($W_{FF}$) nm | Haze % | Total transmittance % | Pencil hardness | Adhesion | Water contact angle ° | Scratch resistance |
|---|---|---|---|---|---|---|---|---|---|---|---|---|---|---|---|---|---|
| Ex. A1 | Glass | — | — | 115 | 15 | 20 | 100 | 400 | 4 | 15 | 5 | 2.1 | 91.2 | ○ | ○ | 147 | ○ |
| Ex. A2 | Glass | — | — | 215 | 15 | 20 | 200 | 400 | 2 | 20 | 10 | 3.1 | 90.8 | ○ | ○ | 150 | ○ |
| Ex. A3 | Glass | — | — | 115 | 15 | 20 | 100 | 200 | 2 | 10 | 5 | 1.1 | 91.6 | ○ | ○ | 146 | ○ |
| Ex. A4 | Glass | — | — | 315 | 15 | 20 | 300 | 600 | 2 | 30 | 15 | 6.3 | 90.0 | ○ | ○ | 155 | ○ |
| Ex. A5 | Glass | — | — | 205 | 5 | 20 | 200 | 400 | 2 | 24 | 12 | 2.2 | 91.6 | △ | △ | 155 | △ |
| Ex. A6 | Glass | — | — | 350 | 150 | 20 | 200 | 400 | 2 | 10 | 5 | 4.3 | 90.1 | ◎ | ◎ | 130 | ◎ |
| Ex. A7 | Glass | — | — | 215 | 15 | 10 | 200 | 400 | 2 | 26 | 13 | 2.1 | 91.7 | ○ | ○ | 154 | ○ |
| Ex. A8 | Glass | — | — | 215 | 15 | 40 | 200 | 400 | 2 | 14 | 7 | 4.0 | 90.2 | ○ | ○ | 140 | ○ |
| Ex. A9 | Glass | — | — | 215 | 15 | 20 | 200 | 400 | 2 | 20 | 10 | 3.2 | 91.2 | ○ | ○ | 147 | ○ |
| Ex. A10 | Glass | — | — | 215 | 15 | 20 | 200 | 400 | 2 | 20 | 10 | 3 | 91.5 | ○ | ○ | 145 | ○ |
| Ex. A11 | PET film | SiO$_2$ | 115 | 215 | 15 | 20 | 200 | 400 | 2 | 20 | 10 | 3.6 | 90.4 | ○ | ○ | 150 | ○ |
| Ex. A12 | Glass | — | — | 215 | 15 | 20 | 200 | 400 | 2 | 20 | 10 | 4 | 90.5 | ◎ | ◎ | 145 | ◎ |
| Ex. A13 | Glass | — | — | 200 | — | 20 | 200 | 400 | 2 | 10 | 20 | 0.5 | 95.0 | ◎ | ◎ | 147 | ◎ |
| Ex. A14 | Glass | — | — | 200 | 1 | 20 | 200 | 400 | 2 | 20 | 10 | 1.9 | 91.9 | ◎ | ○ | 150 | ◎ |
| Ex. A15 | Glass | — | — | 201 | 250 | 20 | 200 | 400 | 2 | 20 | 10 | 2.8 | 91.3 | ○ | ○ | 152 | ○ |
| C. Ex. A1 | Glass | — | — | 450 | 15 | 20 | 200 | 400 | 2 | 20 | 10 | 5.3 | 89.2 | X | X | 118 | X |
| C. Ex. A2 | Glass | — | — | 715 | 15 | 20 | 700 | 1400 | 2 | 60 | 20 | 10.1 | 88.7 | △ | X | 158 | △ |
| C. Ex. A3 | Glass | — | — | 515 | 15 | 20 | 500 | 1000 | 2 | 70 | 35 | 10.9 | 88.1 | X | X | 160 | X |
| C. Ex. A4 | Glass | — | — | 215 | 15 | 0.5 | 200 | 400 | 2 | 26 | 13 | 2.3 | 91.6 | X | ○ | 115 | X |
| C. Ex. A5 | Glass | — | — | 215 | 15 | 120 | 200 | 400 | 2 | 3 | — | 4.5 | 89.2 | ○ | ○ | 110 | ○ |

Example B1

Preparation of Warty Metal Oxide Particle (1) Dispersion

Pure water was added to 2500 g of a silica sol (Cataloid SI-80P: manufactured by JGC CATALYSTS AND CHEMICALS LTD., average particle diameter converted from nitrogen adsorption specific surface area: 80 nm) to adjust the silica concentration to 15.4 wt %.

To 6500 g of the silica sol, 482 g of a 0.9 wt % aqueous solution of sodium aluminate [chemical formula: NaAlO$_2$] (the amount corresponded to 0.43 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The concentration of the solid (alumina-coated silica fine particles) of the resultant alumina-coated silica fine particle dispersion was measured to be 14.4 wt %. Pure water was added to 1463 g of the alumina-coated silica fine particle dispersion to adjust the concentration to 2.7 wt %.

To 7163 g of the aqueous alumina-coated silica fine particle solution was added 30 g of sodium silicate solution No. 3 (silica concentration 24 wt %) (the amount corresponded to 3.7 parts by mass of silica with respect to 100 parts by mass of the alumina-coated silica fine particles). The mixture was heated to 98° C. and was aged for 30 minutes. Thereafter, 2166 g of a silicic acid solution having a silica concentration of 3 wt % (the amount corresponded to 32.4 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (1) dispersion was prepared.

The warty metal oxide particles (1) obtained were analyzed to determine the average particle diameter ($D_A$), the average projection height (H), the specific surface area ($SA_1$) and the surface roughness ($SA_1$)/($SA_2$), the results being described in the table.

The average particle diameter ($D_A$), the average projection height (H), the specific surface area ($SA_2$), the surface roughness ($SA_1$)/($SA_2$) and the sphericity were measured or calculated by image analysis as described below.

Average Particle Diameter ($D_A$)

The warty metal oxide particles (1) were micrographed with a transmission electron microscope (H-800: manufactured by Hitachi, Ltd.) at a magnification of 250000 times. A projected image of the micrograph was analyzed to measure the maximum diameters (DL) of randomly selected fifty particles, and the results were averaged to give the average particle diameter ($D_A$).

Average Projection Height (H)

Similarly, a projected image of a ×250000 micrograph of the warty metal oxide particles (1) was analyzed to measure the distance from the tip of a randomly selected wart-like projection to the root thereof in contact with the spherical particle. The analysis was performed with respect to three projections for each of randomly selected fifty particles. The average of the results was calculated as the average projection height (H) of the particles.

Specific Surface Area ($SA_2$)

The value of the average particle diameter ($D_A$) was substituted into Equation (1) below to determine the specific surface area ($SA_2$).

$$(SA_2) = 6000/(D_A) \times d \quad (1)$$

Surface roughness ($SA_1$)/($SA_2$)

The surface roughness was determined by dividing the specific surface area ($SA_1$) measured by a BET method by the specific surface area ($SA_2$) obtained above.

Preparation of Surface-Treated Warty Metal Oxide Particle (1) Dispersion

The solvent of the warty metal oxide particle (1) dispersion was replaced by methanol with use of an ultrafiltration membrane, and a warty metal oxide particle (1) methanol dispersion having a solid concentration of 8 wt % was obtained.

Next, 2.77 g of tetraethoxysilane (ethyl orthosilicate-A: manufactured by Tama Chemicals Co., Ltd., SiO$_2$ concentration 28.8 wt %) was admixed to 100 g of the warty metal oxide particle (1) methanol dispersion having a solid concentration of 8 wt %. Subsequently, 2.3 g of ultrapure water was added. The mixture was stirred at 50° C. for 6 hours to give a surface-treated warty metal oxide particle (1) methanol dispersion having a solid concentration of 8 wt %.

To 100 g of the surface-treated warty metal oxide particle (1) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated warty metal oxide particle (1) dispersion with a solid concentration of 2 wt % for the formation of an inorganic oxide fine particle layer.

Preparation of Binder Layer-Forming Liquid (1)

10.0 g of water and 0.1 g of 61 wt % nitric acid were added to 72.5 g of a modified alcohol (SOLMIX A-11: manufactured by Japan Alcohol Trading Co., Ltd., a mixed alcohol including methanol, ethanol and isopropyl alcohol). The mixture was stirred at 25° C. for 10 minutes. Next, 17.4 g of tetraethoxysilane (ethyl orthosilicate-A: manufactured by Tama Chemicals Co., Ltd., SiO$_2$ concentration 28.8 wt %) was added. The mixture was stirred at 30° C. for 30 minutes to form a tetraethoxysilane hydrolyzate (solid concentration 5.0 wt %, molecular weight: 1000). Next, there were added 333.3 g of diacetone alcohol (DAA), 666.6 g of ethylene glycol monoisopropyl ether (I-PG) and 566.67 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a binder layer-forming silica liquid (1) having a solid concentration of 0.3 wt %.

Preparation of Overcoating Layer-Forming Liquid (1)

159.0 g of water and 3.3 g of 61 wt % nitric acid were added to 2252.5 g of a modified alcohol (SOLMIX A-11:

manufactured by Japan Alcohol Trading Co., Ltd., a mixed alcohol including methanol, ethanol and isopropyl alcohol). The mixture was stirred at 25° C. for 5 minutes. Next, 46.4 g of tridecafluorooctyltrimethoxysilane (TSL8257: manufactured by MOMENTIVE, solid concentration 98%) was added. The mixture was stirred at 25° C. for 5 minutes and was thereafter treated at 60° C. for 3 hours.

Thereafter, 356.39 g of PGME and 213.91 g of DAA were added, and the mixture was treated at 25° C. for 30 minutes to give a fluorine-containing silica-based layer-forming liquid having a solid concentration of 1.50 wt %.

Next, 10 g of PGME and 40 g of a mixed alcohol (SOLMIX A-11: manufactured by Japan Alcohol Trading Co., Ltd., a mixed alcohol including methanol, ethanol and isopropyl alcohol) were added to 100 g of the fluorine-containing silica-based layer-forming liquid having a solid concentration of 1.50 wt %. In this manner, an overcoating layer-forming liquid (1) having a solid concentration of 1.0% was prepared.

Production of Water-repellent transparent coating-substrate assembly (1)

A glass substrate (FL glass: manufactured by Hamashin Glass Inc., thickness: 3 mm, refractive index: 1.51) was coated with the surface-treated warty metal oxide particle (1) dispersion having a solid concentration of 2 wt % by a bar coater method (#3) so that the dry thickness described in the table would be obtained. The wet film was dried at 80° C. for 30 seconds.

Next, the binder layer-forming liquid (1) having a solid concentration of 0.3 wt % was applied onto the surface-treated warty metal oxide particle (1) layer with a spin coater so that the content described in the table would be obtained. The wet film was dried at 80° C. for 120 seconds.

The overcoating layer-forming liquid (1) having a solid concentration of 1.0 wt % was applied by a bar coater method (#4) so that the content described in the table would be obtained. The wet film was dried at 80° C. for 30 seconds and was dried and cured at 150° C. for 30 minutes. In this manner, a water-repellent transparent coating-substrate assembly (1) was produced.

The water-repellent transparent coating-substrate assembly (1) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table. The total transmittance and the haze were measured with a haze meter (manufactured by Suga Test Instruments Co., Ltd.). The uncoated glass had a total transmittance of 99.0% and a haze of 0.1%. The pencil hardness, the scratch resistance, the water repellency and the adhesion were measured by the methods described hereinabove.

Example B2

Preparation of Warty Metal Oxide Particle (2) Dispersion

Pure water was added to 2500 g of a silica sol (Cataloid SI-45P: manufactured by JGC CATALYSTS AND CHEMICALS LTD., average particle diameter converted from nitrogen adsorption specific surface area: 45 nm) to adjust the silica concentration to 15.4 wt %.

To 6500 g of the silica sol, 850 g of a 0.9 wt % aqueous solution of sodium aluminate [chemical formula: $NaAlO_2$] (the amount corresponded to 0.77 parts by mass of sodium aluminate with respect to 100 parts by mass of silica in the silica sol) was added homogeneously over a period of 4 hours at 12° C. while performing stirring. The mixture was heated to 90° C. and was aged for 3 hours.

The concentration of the solid (alumina-coated silica fine particles) of the resultant alumina-coated silica fine particle dispersion was measured to be 13.7 wt %. Pure water was added to 1199 g of the aqueous alumina-coated silica fine particle solution to adjust the concentration to 2.9 wt %.

To 5586 g of the aqueous alumina-coated silica fine particle solution was added 27 g of sodium silicate solution No. 3 (silica concentration 24 wt %) (the amount corresponded to 4.0 parts by mass of silica with respect to 100 parts by mass of the alumina-coated silica fine particles). The mixture was heated to 98° C. and was aged for 30 minutes. Thereafter, 4246 g of a silicic acid solution having a silica concentration of 3 wt % (the amount corresponded to 75.6 parts by mass of silica in the silicic acid solution with respect to 100 parts by mass of silica in the aged aqueous alumina-coated silica fine particle solution) was added gradually over a period of 7 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (2) dispersion was prepared.

The warty metal oxide particles (2) obtained were analyzed to determine the average particle diameter ($D_A$), the average projection height (H), the specific surface area ($SA_1$) and the surface roughness, the results being described in the table.

Preparation of Surface-Treated Warty Metal Oxide Particle (2) Dispersion

A surface-treated warty metal oxide particle (2) dispersion having a solid concentration of 2 wt % was prepared in the same manner as in Example B1, except that the warty metal oxide particle (2) dispersion was used.

Production of Water-repellent transparent coating-substrate assembly (2)

A water-repellent transparent coating-substrate assembly (2) was produced in the same manner as in Example B1, except that the surface-treated warty metal oxide particle (2) dispersion having a solid concentration of 2 wt % was used.

The water-repellent transparent coating-substrate assembly (2) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B3

Preparation of Warty Metal Oxide Particle (3) Dispersion

Pure water was added to 2500 g of a silica sol (Spherica Slurry SS-120: manufactured by JGC CATALYSTS AND CHEMICALS LTD., average particle diameter converted from nitrogen adsorption specific surface area: 120 nm) to adjust the silica concentration to 15.4 wt %.

To 6500 g of the silica sol, 325 g of a 0.9 wt % aqueous solution of sodium aluminate [chemical formula: $NaAlO_2$] (the amount corresponded to 0.29 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 14.7 wt %. Pure water was added to 1316 g of the aqueous alumina-coated silica fine particle solution to adjust the concentration to 2.7 wt %.

To 7163 g of the aqueous alumina-coated silica fine particle solution was added 27 g of sodium silicate solution No. 3 (silica concentration 24 wt %) (the amount corresponded to 3.4 parts by mass of silica with respect to 100 parts by mass of the alumina-coated silica fine particles). The mixture was heated to 98° C. and was aged for 30 minutes. Thereafter, 1067 g of a silicic acid solution having a silica concentration of 3 wt % (the amount corresponded to 16.0 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (3) dispersion was prepared.

The warty metal oxide particles (3) obtained were analyzed to determine the average particle diameter ($D_A$), the average projection height (H), the specific surface area ($SA_1$) and the surface roughness, the results being described in the table.

Preparation of Surface-Treated Warty Metal Oxide Particle (3) Dispersion

A surface-treated warty metal oxide particle (3) dispersion having a solid concentration of 2 wt % was prepared in the same manner as in Example B1, except that the warty metal oxide particle (3) dispersion was used.

Production of Water-repellent transparent coating-substrate assembly (3)

A water-repellent transparent coating-substrate assembly (3) was produced in the same manner as in Example B1, except that the surface-treated warty metal oxide particle (3) dispersion having a solid concentration of 2 wt % was used.

The water-repellent transparent coating-substrate assembly (3) was tested to determine the average height (IF) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B4

Preparation of Warty Metal Oxide Particle (4) Dispersion

Pure water was added to 2500 g of a silica sol (Cataloid SI-80P: manufactured by JGC CATALYSTS AND CHEMICALS LTD., average particle diameter converted from nitrogen adsorption specific surface area: 80 nm) to adjust the silica concentration to 15.4 wt %.

To 6500 g of the silica sol, 78 g of a 0.9 wt % aqueous solution of sodium aluminate [chemical formula: $NaAlO_2$] (the amount corresponded to 0.07 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 15.2 wt %. Pure water was added to 1272 g of the aqueous alumina-coated silica fine particle solution to adjust the concentration to 2.7 wt %.

To 7163 g of the aqueous alumina-coated silica fine particle solution was added 30 g of sodium silicate solution No. 3 (silica concentration 24 wt %) (the amount corresponded to 3.7 parts by mass of silica with respect to 100 parts by mass of the alumina-coated silica fine particles). The mixture was heated to 98° C. and was aged for 30 minutes. Thereafter, 2166 g of a silicic acid solution having a silica concentration of 3 wt % (the amount corresponded to 32.4 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (4) dispersion was prepared.

The warty metal oxide particles (4) obtained were analyzed to determine the average particle diameter ($D_A$), the average projection height (H), the specific surface area ($SA_1$) and the surface roughness, the results being described in the table.

Preparation of Surface-Treated Warty Metal Oxide Particle (4) Dispersion

A surface-treated warty metal oxide particle (4) dispersion having a solid concentration of 2 wt % was prepared in the same manner as in Example B1, except that the warty metal oxide particle (4) dispersion was used.

Production of Water-repellent transparent coating-substrate assembly (4)

A water-repellent transparent coating-substrate assembly (4) was produced in the same manner as in Example B1, except that the surface-treated warty metal oxide particle (4) dispersion having a solid concentration of 2 wt % was used.

The water-repellent transparent coating-substrate assembly (4) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B5

Preparation of Warty Metal Oxide Particle (5) Dispersion

Pure water was added to 2500 g of a silica sol (Cataloid SI-80P: manufactured by JGC CATALYSTS AND CHEMICALS LTD., average particle diameter converted from nitrogen adsorption specific surface area: 80 nm) to adjust the silica concentration to 15.4 wt %.

To 6500 g of the silica sol, 1344 g of a 0.9 wt % aqueous solution of sodium aluminate [chemical formula: $NaAlO_2$] (the amount corresponded to 1.20 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 12.9 wt %. Pure water was added to 1499 g of the aqueous alumina-coated silica fine particle solution to adjust the concentration to 2.7 wt %.

To 7163 g of the aqueous alumina-coated silica fine particle solution was added 30 g of sodium silicate solution No. 3 (silica concentration 24 wt %) (the amount corresponded to 3.7 parts by mass of silica with respect to 100 parts by mass of the alumina-coated silica fine particles). The mixture was heated to 98° C. and was aged for 30 minutes. Thereafter, 2166 g of a silicic acid solution having a silica concentration of 3 wt % (the amount corresponded to 32.4 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (5) dispersion was prepared.

The warty metal oxide particles (5) obtained were analyzed to determine the average particle diameter ($D_A$), the average projection height (H), the specific surface area ($SA_1$) and the surface roughness, the results being described in the table.

Preparation of Surface-Treated Warty Metal Oxide Particle (5) Dispersion

A surface-treated warty metal oxide particle (5) dispersion having a solid concentration of 2 wt % was prepared in the same manner as in Example B1, except that the warty metal oxide particle (5) dispersion was used.

Production of Water-repellent transparent coating-substrate assembly (5)

A water-repellent transparent coating-substrate assembly (5) was produced in the same manner as in Example B1, except that the surface-treated warty metal oxide particle (5) dispersion having a solid concentration of 2 wt % was used.

The water-repellent transparent coating-substrate assembly (5) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B6

Preparation of Warty Metal Oxide Particle (6) Dispersion

A warty metal oxide particle (2) dispersion having a solid concentration of 30 wt % was prepared in the same manner as in Example B2. Next, the solvent of the dispersion was replaced by methanol with use of an ultrafiltration membrane, and a warty metal oxide particle (6) methanol dispersion having a solid concentration of 30 wt % was obtained.

Next, 10.39 g of tetraethoxysilane (ethyl orthosilicate-A: manufactured by Tama Chemicals Co., Ltd., $SiO_2$ concentration 28.8 wt %) was admixed to 100 g of the warty metal oxide particle (6) methanol dispersion having a solid concentration of 30 wt %. Subsequently, 2.3 g of ultrapure water was added. The mixture was stirred at 50° C. for 6 hours to give a surface-treated warty metal oxide particle (6) methanol dispersion having a solid concentration of 30 wt %.

The resultant surface-treated warty metal oxide particle (6) methanol dispersion having a solid concentration of 30 wt % was concentrated to about 50% with a rotary evaporator and was stored at −10° C. for 24 hours. Thereafter, the solvent was replaced by a PGME solvent with use of a rotary evaporator. Thus, a surface-treated warty metal oxide particle (6) PGME dispersion having a solid concentration of 8 wt % was prepared.

The warty metal oxide particles (6) obtained were analyzed to determine the average particle diameter ($D_A$), the average projection height (H), the specific surface area ($SA_1$) and the surface roughness, the results being described in the table.

SEM observation showed the warty metal oxide particles (6) as cluster particles generally composed of three warty metal oxide particles (2).

Preparation of Surface-Treated Warty Metal Oxide Particle (6) Dispersion

A surface-treated warty metal oxide particle (6) dispersion having a solid concentration of 2 wt % was prepared in the same manner as in Example B1, except that the warty metal oxide particle (6) dispersion was used.

Production of Water-repellent transparent coating-substrate assembly (6)

A water-repellent transparent coating-substrate assembly (6) was produced in the same manner as in Example B1, except that the surface-treated warty metal oxide particle (6) dispersion having a solid concentration of 2 wt % was used.

The water-repellent transparent coating-substrate assembly (6) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B7

Preparation of Warty Metal Oxide Particle (7) Dispersion

A warty metal oxide particle (2) dispersion having a solid concentration of 30 wt % was prepared in the same manner as in Example B2. Next, the solvent of the dispersion was replaced by methanol with use of an ultrafiltration membrane, and a warty metal oxide particle (7) methanol dispersion having a solid concentration of 30 wt % was obtained.

Next, 10.39 g of tetraethoxysilane (ethyl orthosilicate-A: manufactured by Tama Chemicals Co., Ltd., $SiO_2$ concentration 28.8 wt %) was admixed to 100 g of the warty metal oxide particle (7) methanol dispersion having a solid concentration of 30 wt %. Subsequently, 2.3 g of ultrapure water was added. The mixture was stirred at 50° C. for 6 hours to give a surface-treated warty metal oxide particle (7) methanol dispersion having a solid concentration of 30 wt %.

The resultant surface-treated warty metal oxide particle (7) methanol dispersion having a solid concentration of 30 wt % was concentrated to about 53% with a rotary evaporator and was stored at −10° C. for 24 hours. Thereafter, the solvent was replaced by a PGME solvent with use of a rotary evaporator. Thus, a surface-treated warty metal oxide particle (7) PGME dispersion having a solid concentration of 8 wt % was prepared.

The warty metal oxide particles (7) obtained were analyzed to determine the average particle diameter ($D_A$), the average projection height (H), the specific surface area ($SA_1$) and the surface roughness, the results being described in the table.

SEM observation showed the warty metal oxide particles (7) as cluster particles generally composed of six warty metal oxide particles (2).

Preparation of Surface-Treated Warty Metal Oxide Particle (7) Dispersion

A surface-treated warty metal oxide particle (7) dispersion having a solid concentration of 2 wt % was prepared in the same manner as in Example B1, except that the warty metal oxide particle (7) dispersion was used.
Production of Water-repellent transparent coating-substrate assembly (7)

A water-repellent transparent coating-substrate assembly (7) was produced in the same manner as in Example B1, except that the surface-treated warty metal oxide particle (7) dispersion having a solid concentration of 2 wt % was used.

The water-repellent transparent coating-substrate assembly (7) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B8

Preparation of Warty Metal Oxide Particle (8) Dispersion

A warty metal oxide particle (2) dispersion having a solid concentration of 30 wt % was prepared in the same manner as in Example B2. Next, the solvent of the dispersion was replaced by methanol with use of an ultrafiltration membrane, and a warty metal oxide particle (8) methanol dispersion having a solid concentration of 30 wt % was obtained.

Next, 10.39 g of tetraethoxysilane (ethyl orthosilicate-A: manufactured by Tama Chemicals Co., Ltd., $SiO_2$ concentration 28.8 wt %) was admixed to 100 g of the warty metal oxide particle (8) methanol dispersion having a solid concentration of 30 wt %. Subsequently, 2.3 g of ultrapure water was added. The mixture was stirred at 50° C. for 6 hours to give a surface-treated warty metal oxide particle (8) methanol dispersion having a solid concentration of 30 wt %.

The resultant surface-treated warty metal oxide particle (8) methanol dispersion having a solid concentration of 30 wt % was concentrated to about 55% with a rotary evaporator and was stored at −10° C. for 24 hours. Thereafter, the solvent was replaced by a PGME solvent with use of a rotary evaporator. Thus, a surface-treated warty metal oxide particle (8) PGME dispersion having a solid concentration of 8 wt % was prepared.

The warty metal oxide particles (8) obtained were analyzed to determine the average particle diameter ($D_A$), the average projection height (H), the specific surface area ($SA_1$) and the surface roughness, the results being described in the table.

SEM observation showed the warty metal oxide particles (8) as cluster particles generally composed of eight warty metal oxide particles (2).

Preparation of Surface-Treated Warty Metal Oxide Particle (8) Dispersion

A surface-treated warty metal oxide particle (8) dispersion having a solid concentration of 2 wt % was prepared in the same manner as in Example B1, except that the warty metal oxide particle (8) dispersion was used.
Production of Water-repellent transparent coating-substrate assembly (8)

A water-repellent transparent coating-substrate assembly (8) was produced in the same manner as in Example B1, except that the surface-treated warty metal oxide particle (8) dispersion having a solid concentration of 2 wt % was used.

The water-repellent transparent coating-substrate assembly (8) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B9

Preparation of Sphere-Shaped Metal Oxide Particle (9) Dispersion

The solvent of a silica sol (Cataloid SI-45P: manufactured by JGC CATALYSTS AND CHEMICALS LTD., average particle diameter converted from nitrogen adsorption specific surface area: 45 nm) was replaced by methanol with use of an ultrafiltration membrane, thereby obtaining a sphere-shaped metal oxide particle (9) methanol dispersion having a solid concentration of 30 wt %. Next, 10.39 g of tetraethoxysilane (ethyl orthosilicate-A: manufactured by Tama Chemicals Co., Ltd., $SiO_2$ concentration 28.8 wt %) was admixed to 100 g of the sphere-shaped metal oxide particle (9) methanol dispersion having a solid concentration of 30 wt %. Subsequently, 2.3 g of ultrapure water was added. The mixture was stirred at 50° C. for 6 hours to give a surface-treated sphere-shaped metal oxide particle (9) methanol dispersion having a solid concentration of 30 wt %.

The resultant surface-treated sphere-shaped metal oxide particle (9) methanol dispersion having a solid concentration of 30 wt % was concentrated to about 53% with a rotary evaporator and was stored at −10° C. for 24 hours. Thereafter, the solvent was replaced by a PGME solvent with use of a rotary evaporator. Thus, a surface-treated sphere-shaped metal oxide particle (9) PGME dispersion having a solid concentration of 8 wt % was prepared.

The sphere-shaped metal oxide particles (9) obtained were analyzed to determine the average particle diameter ($D_A$), the average projection height (H), the specific surface area ($SA_1$) and the surface roughness, the results being described in the table.

SEM observation showed the sphere-shaped metal oxide particles (9) as cluster particles generally composed of six sphere-shaped metal oxide particles (2).

Preparation of Surface-Treated Sphere-Shaped Metal Oxide Particle (9) Dispersion A surface-treated sphere-shaped metal oxide particle (9) dispersion having a solid concentration of 2 wt % was prepared in the same manner as in Example B1, except that the sphere-shaped metal oxide particle (9) dispersion was used.

Production of Water-repellent transparent coating-substrate assembly (9)

A water-repellent transparent coating-substrate assembly (9) was produced in the same manner as in Example B1, except that the surface-treated sphere-shaped metal oxide particle (9) dispersion having a solid concentration of 2 wt % was used.

The water-repellent transparent coating-substrate assembly (9) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B10

Preparation of Overcoating Layer-Forming Liquid (2)

159.0 g of water and 3.3 g of 61 wt % nitric acid were added to 2252.5 g of a modified alcohol (SOLMIX A-11: manufactured by Japan Alcohol Trading Co., Ltd., a mixed alcohol including methanol, ethanol and isopropyl alcohol). The mixture was stirred at 25° C. for 5 minutes. Next, 46.4 g of methyltrimethoxysilane (KBM-13: manufactured by Shin-Etsu Chemical Co., Ltd., solid concentration 98%) was added. The mixture was stirred at 25° C. for 5 minutes and was thereafter treated at 60° C. for 3 hours.

Thereafter, 356.39 g of PGME and 213.91 g of DAA were added, and the mixture was treated at 25° C. for 30 minutes to give a methyl group-containing silica-based layer-forming liquid having a solid concentration of 1.50 wt %.

Next, 10 g of PGME and 40 g of a mixed alcohol (SOLMIX A-11: manufactured by Japan Alcohol Trading Co., Ltd., a mixed alcohol including methanol, ethanol and isopropyl alcohol) were added to 100 g of the methyl group-containing silica-based layer-forming liquid having a solid concentration of 1.50 wt %. In this manner, an overcoating layer-forming liquid (2) having a solid concentration of 1.0% was prepared.

Production of Water-repellent transparent coating-substrate assembly (10)

A water-repellent transparent coating-substrate assembly (10) was produced in the same manner as in Example B1, except that the overcoating layer-forming liquid (2) was used.

The water-repellent transparent coating-substrate assembly (10) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B11

Preparation of Overcoating Layer-Forming Liquid (3)

An overcoating layer-forming liquid (3) having a solid concentration of 1.0% was prepared by adding 46 g of PGME and 184 g of a mixed alcohol (SOLMIX A-11: manufactured by Japan Alcohol Trading Co., Ltd., a mixed alcohol including methanol, ethanol and isopropyl alcohol) to 100 g of dimethylsilicone (TSW8251: manufactured by MOMENTIVE, solid concentration 3.3%).

Production of Water-repellent transparent coating-substrate assembly (11)

A water-repellent transparent coating-substrate assembly (11) was produced in the same manner as in Example B1, except that the overcoating layer-forming liquid (3) was used.

The water-repellent transparent coating-substrate assembly (11) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example B12

Production of Water-repellent transparent coating-substrate assembly (12)

A glass substrate (FL glass: manufactured by Hamashin Glass Inc., thickness: 3 mm, refractive index: 1.51) was coated with a binder layer-forming liquid (1) with a solid concentration of 0.3 wt % which had been prepared in the same manner as in Example B1, by a spin coater method to form a binder layer. Thereafter, the surface-treated warty metal oxide particle (1) dispersion having a solid concentration of 2 wt % was applied similarly to Example B1. The wet film was dried at 80° C. for 30 seconds.

The binder layer-forming liquid (1) having a solid concentration of 0.3 wt % was applied onto the surface-treated warty metal oxide particle (1) layer with a spin coater so that the content described in the table would be obtained. The wet film was dried at 80° C. for 120 seconds.

Next, an overcoating layer-forming liquid (1) with a solid concentration of 1.0 wt % which had been prepared in the same manner as in Example B1 was applied by a bar coater method (#4) so that the content described in the table would be obtained. The wet film was dried at 80° C. for 30 seconds and was dried and cured at 150° C. for 30 minutes. In this manner, a water-repellent transparent coating-substrate assembly (12) was produced.

The water-repellent transparent coating-substrate assembly (12) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example B1

Preparation of Surface-Treated Sphere-Shaped Metal Oxide Particle (R1) Dispersion The solvent of a silica sol (Cataloid SI-80P: manufactured by JGC CATALYSTS AND CHEMICALS LTD., average particle diameter converted from nitrogen adsorption specific surface area: 80 nm) was replaced by methanol with use of an ultrafiltration membrane, thereby obtaining a sphere-shaped metal oxide particle (R1) methanol dispersion having a solid concentration of 8 wt %.

Next, 2.77 g of tetraethoxysilane (ethyl orthosilicate-A: manufactured by Tama Chemicals Co., Ltd., $SiO_2$ concentration 28.8 wt %) was admixed to 100 g of the sphere-shaped metal oxide particle (R1) methanol dispersion having a solid concentration of 8 wt %. Subsequently, 2.3 g of ultrapure water was added. The mixture was stirred at 50° C. for 6 hours to give a surface-treated sphere-shaped metal oxide particle (R1) methanol dispersion having a solid concentration of 8 wt %.

To 100 g of the surface-treated sphere-shaped metal oxide particle (1) methanol dispersion having a solid concentration of 8 wt % were added 8 g of N-methylpyrrolidone (NMP), 192 g of propylene glycol monopropyl ether (PGME) and 100 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a surface-treated sphere-shaped metal oxide particle (R1) dispersion with a solid concentration of 2 wt % for the formation of an inorganic oxide fine particle layer.

Production of Water-repellent transparent coating-substrate assembly (R1)

A water-repellent transparent coating-substrate assembly (R1) was produced in the same manner as in Example B1, except that the surface-treated sphere-shaped metal oxide particle (R1) dispersion with a solid concentration of 2 wt % was used.

The water-repellent transparent coating-substrate assembly (R1) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example B2

Preparation of Warty Metal Oxide Particle (R2) Dispersion

Pure water was added to 2500 g of a silica sol (Cataloid SI-550: manufactured by JGC CATALYSTS AND CHEMICALS LTD., average particle diameter converted from nitrogen adsorption specific surface area: 5 nm) to adjust the silica concentration to 15.4 wt %.

To 6500 g of the silica sol, 111428 g of a 0.9 wt % aqueous solution of sodium aluminate [chemical formula: $NaAlO_2$] (the amount corresponded to 100 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 1.7 wt %. 11377 of the aqueous alumina-coated silica fine particle solution was concentrated with a rotary evaporator to adjust the concentration to 2.7 wt %.

To 7163 g of the aqueous alumina-coated silica fine particle solution was added 201 g of sodium silicate solution No. 3 (silica concentration 24 wt %) (the amount corresponded to 25 parts by mass of silica with respect to 100 parts by mass of the alumina-coated silica fine particles). The mixture was heated to 98° C. and was aged for 30 minutes. Thereafter, 40292 g of a silicic acid solution having a silica concentration of 3 wt % (the amount corresponded to 500 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (R2) dispersion was prepared.

The warty metal oxide particles (R2) obtained were analyzed to determine the average particle diameter ($D_A$), the average projection height (H), the specific surface area ($SA_1$) and the surface roughness ($SA_1$)/($SA_2$), the results being described in the table.

Preparation of Surface-Treated Warty Metal Oxide Particle (R2) Dispersion

A surface-treated warty metal oxide particle (R2) dispersion having a solid concentration of 2 wt % was prepared in the same manner as in Example B1, except that the warty metal oxide particle (R2) dispersion was used.

Production of Water-repellent transparent coating-substrate assembly (R2)

A water-repellent transparent coating-substrate assembly (R2) was produced in the same manner as in Example B1, except that the surface-treated warty metal oxide particle (R2) dispersion having a solid concentration of 2 wt % was used.

The water-repellent transparent coating-substrate assembly (R2) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example B3

Preparation of Warty Metal Oxide Particle (R3) Dispersion

Pure water was added to 2500 g of a silica sol (Spherica Slurry SS-300: manufactured by JGC CATALYSTS AND CHEMICALS LTD., average particle diameter converted from nitrogen adsorption specific surface area: 300 nm) to adjust the silica concentration to 15.4 wt %.

To 6500 g of the silica sol, 123 g of a 0.9 wt % aqueous solution of sodium aluminate [chemical formula: $NaAlO_2$] (the amount corresponded to 0.11 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 15.1 wt %. Pure water was added to 1281 g of the aqueous alumina-coated silica fine particle solution to adjust the concentration to 2.7 wt %.

To 7163 g of the aqueous alumina-coated silica fine particle solution was added 23 g of sodium silicate solution No. 3 (silica concentration 24 wt %) (the amount corresponded to 2.8 parts by mass of silica with respect to 100 parts by mass of the alumina-coated silica fine particles). The mixture was heated to 98° C. and was aged for 30 minutes. Thereafter, 331 g of a silicic acid solution having a silica concentration of 3 wt % (the amount corresponded to 5 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (R3) dispersion was prepared.

The warty metal oxide particles (R3) obtained were analyzed to determine the average particle diameter ($D_A$), the average projection height (H), the specific surface area ($SA_1$) and the surface roughness ($SA_1$)/($SA_2$), the results being described in the table.

Preparation of Surface-Treated Warty Metal Oxide Particle (R3) Dispersion

A surface-treated warty metal oxide particle (R3) dispersion having a solid concentration of 2 wt % was prepared in the same manner as in Example B1, except that the warty metal oxide particle (R3) dispersion was used.

Production of Water-repellent transparent coating-substrate assembly (R3)

A water-repellent transparent coating-substrate assembly (R3) was produced in the same manner as in Example B1, except that the surface-treated warty metal oxide particle (R3) dispersion having a solid concentration of 2 wt % was used.

The water-repellent transparent coating-substrate assembly (R3) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example B4

Preparation of Warty Metal Oxide Particle (R4) Dispersion

Pure water was added to 2500 g of a silica sol (Cataloid SI-80P: manufactured by JGC CATALYSTS AND CHEMICALS LTD., average particle diameter converted from nitrogen adsorption specific surface area: 80 nm) to adjust the silica concentration to 15.4 wt %.

To 6500 g of the silica sol, 11 g of a 0.9 wt % aqueous solution of sodium aluminate [chemical formula: $NaAlO_2$] (the amount corresponded to 0.01 part by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 15.3 wt %. Pure water was added to 1264 g of the aqueous alumina-coated silica fine particle solution to adjust the concentration to 2.7 wt %.

To 7163 g of the aqueous alumina-coated silica fine particle solution was added 30 g of sodium silicate solution No. 3 (silica concentration 24 wt %) (the amount corresponded to 3.7 parts by mass of silica with respect to 100 parts by mass of the alumina-coated silica fine particles). The mixture was heated to 98° C. and was aged for 30 minutes. Thereafter, 2166 g of a silicic acid solution having a silica concentration of 3 wt % (the amount corresponded to 32.4 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (R4) dispersion was prepared.

The warty metal oxide particles (R4) obtained were analyzed to determine the average particle diameter ($D_A$), the average projection height (H), the specific surface area ($SA_1$) and the surface roughness ($SA_1$)/($SA_2$), the results being described in the table.

Preparation of Surface-Treated Warty Metal Oxide Particle (R4) Dispersion

A surface-treated warty metal oxide particle (R4) dispersion having a solid concentration of 2 wt % was prepared in the same manner as in Example B1, except that the warty metal oxide particle (R4) dispersion was used.

Production of Water-Repellent Transparent Coating-Substrate Assembly (R4)

A water-repellent transparent coating-substrate assembly (R4) was produced in the same manner as in Example B1, except that the surface-treated warty metal oxide particle (R4) dispersion having a solid concentration of 2 wt % was used.

The water-repellent transparent coating-substrate assembly (R4) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example B5

Preparation of Warty Metal Oxide Particle (R5) Dispersion

Pure water was added to 2500 g of a silica sol (Cataloid SI-80P: manufactured by JGC CATALYSTS AND CHEMICALS LTD., average particle diameter converted from nitrogen adsorption specific surface area: 80 nm) to adjust the silica concentration to 15.4 wt %.

To 6500 g of the silica sol, 6238 g of a 0.9 wt % aqueous solution of sodium aluminate [chemical formula: $NaAlO_2$] (the amount corresponded to 5.57 parts by mass of sodium aluminate with respect to 100 parts by mass of silica in the silica sol) was added homogeneously over a period of 2 hours at 14° C. while performing stirring. The mixture was heated to 90° C. and was aged for 3 hours.

The content of the solid (alumina-coated silica fine particles) of the resultant alumina-coated silica fine particle dispersion was measured to be 8.3 wt %. Pure water was added to 2330 g of the aqueous alumina-coated silica fine particle solution to adjust the concentration to 2.7 wt %.

To 7163 g of the aqueous alumina-coated silica fine particle solution was added 30 g of sodium silicate solution No. 3 (silica concentration 24 wt %) (the amount corresponded to 3.7 parts by mass of silica with respect to 100 parts by mass of the alumina-coated silica fine particles). The mixture was heated to 98° C. and was aged for 30 minutes. Thereafter, 2166 g of a silicic acid solution having a silica concentration of 3 wt % (the amount corresponded to 32.4 parts by mass of silica in the silicic acid solution with respect to 100 parts by mass of silica in the aged aqueous alumina-coated silica fine particle solution) was added gradually over a period of 10 hours while performing stirring. After the completion of the addition, the mixture was aged at 98° C. for 1 hour.

Thereafter, pure water was supplied to the aqueous solution while the liquid level was kept constant with use of an ultrafiltration membrane (SIP-1013), and thereby the solution was washed until the electrical conductivity became constant. Subsequently, the liquid was concentrated until the silica concentration reached 12 wt % and was further concentrated with a rotary evaporator until the solid concentration reached 30 wt %. In this manner, a warty metal oxide particle (R5) dispersion was prepared.

The warty metal oxide particles (R5) obtained were analyzed to determine the average particle diameter ($D_A$), the average projection height (H), the specific surface area ($SA_1$) and the surface roughness ($SA_1$)/($SA_2$), the results being described in the table.

Preparation of Surface-Treated Warty Metal Oxide Particle (R5) Dispersion

A surface-treated warty metal oxide particle (R5) dispersion having a solid concentration of 2 wt % was prepared in the same manner as in Example B1, except that the warty metal oxide particle (R5) dispersion was used.

Production of Water-repellent transparent coating-substrate assembly (R5)

A water-repellent transparent coating-substrate assembly (R5) was produced in the same manner as in Example B1, except that the surface-treated warty metal oxide particle (R5) dispersion having a solid concentration of 2 wt % was used.

The water-repellent transparent coating-substrate assembly (R5) was tested to determine the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

TABLE 2

Coating liquids

Odd-form metal oxide particle dispersions

Odd-form metal oxide particles

| | Type | Material | Wart-like projection height H nm | Average particle diameter ($D_A$) nm | $H/(D_A)$ | ($S_{A1}$) BET m²/g | ($S_{A2}$) calculated value m²/g | Surface roughness $S_{A1}/S_{A2}$ | Sphericity | Average primary particle diameter ($D_{B1}$) nm | Average secondary particle diameter ($D_{B2}$) nm | Concentration wt % |
|---|---|---|---|---|---|---|---|---|---|---|---|---|
| Ex. B1 | Warty | SiO₂ | 9 | 107 | 0.08 | 50 | 22 | 2.30 | 0.93 | — | — | 2 |
| Ex. B2 | Warty | SiO₂ | 9 | 59 | 0.15 | 74 | 36 | 2.08 | 0.90 | — | — | 2 |
| Ex. B3 | Warty | SiO₂ | 9 | 140 | 0.06 | 42 | 16 | 2.63 | 0.91 | — | — | 2 |
| Ex. B4 | Warty | SiO₂ | 5 | 105 | 0.05 | 43 | 22 | 1.95 | 0.95 | — | — | 2 |
| Ex. B5 | Warty | SiO₂ | 15 | 113 | 0.13 | 110 | 22 | 5.00 | 0.90 | — | — | 2 |
| Ex. B6 | Cluster | SiO₂ | 9 | 59 | 0.15 | 74 | 36 | 2.08 | 0.90 | 59 | 177 | 2 |
| Ex. B7 | Cluster | SiO₂ | 9 | 59 | 0.15 | 74 | 36 | 2.08 | 0.90 | 59 | 354 | 2 |
| Ex. B8 | Cluster | SiO₂ | 9 | 59 | 0.15 | 74 | 36 | 2.08 | 0.90 | 59 | 472 | 2 |
| Ex. B9 | Cluster | SiO₂ | — | 45 | — | — | — | — | — | 45 | 270 | 2 |
| Ex. B10 | Warty | SiO₂ | 9 | 107 | 0.08 | 50 | 22 | 2.30 | 0.93 | — | — | 2 |
| Ex. B11 | Warty | SiO₂ | 9 | 107 | 0.08 | 50 | 22 | 2.30 | 0.93 | — | — | 2 |
| Ex. B12 | Warty | SiO₂ | 9 | 107 | 0.08 | 50 | 22 | 2.30 | 0.93 | — | — | 2 |
| C. Ex. B1 | Sphere | SiO₂ | — | 80 | — | — | — | — | 1.0 | — | — | 2 |
| C. Ex. B2 | Warty | SiO₂ | 1 | 9 | 0.11 | 450 | 303 | 1.49 | 0.95 | — | — | 2 |
| C. Ex. B3 | Warty | SiO₂ | 9 | 330 | 0.03 | 30 | 8 | 1.88 | 0.94 | — | — | 2 |
| C. Ex. B4 | Warty | SiO₂ | 1 | 100 | 0.01 | 32 | 27 | 1.19 | 0.96 | — | — | 2 |
| C. Ex. B5 | Warty | SiO₂ | 35 | 100 | 0.35 | 100 | 27 | 3.70 | 0.85 | — | — | 2 |

Production processes

Production of water-repellent transparent coating-substrate assemblies

| | Step (a1) | | | | | Step (b) | | | Step (a2) | | | | Step (c) | | Step (d) | | |
|---|---|---|---|---|---|---|---|---|---|---|---|---|---|---|---|---|---|
| | Binder layer-forming liquid | | Drying | | Odd-form metal oxide particle dispersion | Drying | | Binder layer-forming liquid | | Drying | | Overcoating layer-forming liquid | | Heat treatment | | |
| | Material | C wt % | T °C | T min | | T °C | T sec | Material | C wt % | T °C | T min | Material | C wt % | T °C | T sec | T °C | T min |
| Ex. B1 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |

TABLE 2-continued

| Ex. | Additive | Amt | Amt | Amt | Shape | | | Tetraethoxysilane oligomer | | | | Surface treatment agent | | | | | |
|---|---|---|---|---|---|---|---|---|---|---|---|---|---|---|---|---|---|
| Ex. B2 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| Ex. B3 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| Ex. B4 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| Ex. B5 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| Ex. B6 | — | — | — | — | Cluster | 80 | 30 | Tetraethoxysilane oligomer | 0.3 | 80 | 10 | Tridecafluorooctyl trimethoxysilane | 1.0 | 80 | 30 | 150 | 30 |
| Ex. B7 | — | — | — | — | Cluster | 80 | 30 | Tetraethoxysilane oligomer | 0.3 | 80 | 10 | Tridecafluorooctyl trimethoxysilane | 1.0 | 80 | 30 | 150 | 30 |
| Ex. B9 | — | — | — | — | Cluster | 80 | 30 | Tetraethoxysilane oligomer | 0.3 | 80 | 10 | Tridecafluorooctyl trimethoxysilane | 1.0 | 80 | 30 | 150 | 30 |
| Ex. B9 | — | — | — | — | Cluster | 80 | 30 | Tetraethoxysilane oligomer | 0.3 | 80 | 10 | Tridecafluorooctyl trimethoxysilane | 1.0 | 80 | 30 | 150 | 30 |
| Ex. B10 | — | — | — | — | Warty | 80 | 30 | Tetraethoxysilane oligomer | 0.3 | 80 | 10 | Methyl-trimethoxysilane TSW8251 (silicone-based) | 1.0 | 80 | 30 | 150 | 30 |
| Ex. B11 | — | — | 60 | 10 | Warty | 80 | 30 | Tetraethoxysilane oligomer | 0.3 | 80 | 10 | Tridecafluorooctyl trimethoxysilane | 1.0 | 80 | 30 | 150 | 30 |
| Ex. B12 | Tetra-ethoxysilane oligomer | 0.3 | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| C. Ex. B1 | — | — | — | — | Sphere | 80 | 30 | Tetraethoxysilane oligomer | 0.3 | 80 | 10 | Tridecafluorooctyl trimethoxysilane | 1.0 | 80 | 30 | 150 | 30 |
| C. Ex. B2 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| C. Ex. B3 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| C. Ex. B4 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |
| C. Ex. B5 | — | — | — | — | Warty | 80 | 30 | Tetraethoxysilane oligomer | 0.3 | 80 | 10 | Tridecafluorooctyl trimethoxysilane | 1.0 | 80 | 30 | 150 | 30 |

TABLE 2-continued

Characteristics of assemblies
Water-repellent transparent coating-substrate assemblies

| | Substrate | Thickness of binder layer (a1) nm | Average thickness of metal oxide particle layer nm | Amount of binder layer (a2) Parts by weight | Overcoating layer Parts by weight | Irregularities Average height ($T_F$) nm | Irregularities Pitch width ($W_F$) nm | Finer irregularities Average height ($T_{FF}$) nm | Finer irregularities Pitch width ($W_{FF}$) nm | Haze % | Total transmittance % | Contact angle ° | Pencil Hardness | Scratch resistance | Adhesion |
|---|---|---|---|---|---|---|---|---|---|---|---|---|---|---|---|
| Ex. B1 | Glass | — | 107 | 15 | 20 | 142 | 107 | 9 | 5 | 0.2 | 92.0 | 157 | ○ | ○ | ○ |
| Ex. B2 | Glass | — | 59 | 15 | 20 | 94 | 59 | 9 | 3 | 0.1 | 93.5 | 155 | ⊚ | ⊚ | ⊚ |
| Ex. B3 | Glass | — | 140 | 15 | 20 | 175 | 140 | 9 | 4 | 1.0 | 91.1 | 157 | ○ | ○ | ○ |
| Ex. B4 | Glass | — | 105 | 15 | 20 | 140 | 105 | 5 | 6 | 0.2 | 93.6 | 155 | ○ | ○ | ○ |
| Ex. B5 | Glass | — | 113 | 15 | 20 | 148 | 113 | 15 | 4 | 0.1 | 93.1 | 158 | ○ | ○ | ○ |
| Ex. B6 | Glass | — | 177 | 15 | 20 | 212 | 177 | 9 | 3 | 0.1 | 93.2 | 155 | ⊚ | ⊚ | ⊚ |
| Ex. B7 | Glass | — | 354 | 15 | 20 | 389 | 354 | 9 | 3 | 0.1 | 93.3 | 156 | ⊚ | ⊚ | ⊚ |
| Ex. B8 | Glass | — | 472 | 15 | 20 | 507 | 472 | 9 | 3 | 0.1 | 93.1 | 157 | ⊚ | ⊚ | ⊚ |
| Ex. B9 | Glass | — | 270 | 15 | 20 | 305 | 270 | 9 | 3 | 0.1 | 93.2 | 135 | ○ | ○ | ○ |
| Ex. B10 | Glass | — | 107 | 15 | 20 | 142 | 107 | — | — | 0.1 | 93.1 | 150 | ○ | ○ | ○ |
| Ex. B11 | Glass | — | 107 | 15 | 20 | 142 | 107 | 9 | 5 | 0.1 | 93.0 | 150 | ⊚ | ⊚ | ⊚ |
| Ex. B12 | Glass | 15 | 107 | 15 | 20 | 142 | 107 | 9 | 5 | 0.1 | 93.2 | 155 | ○ | ○ | ○ |
| C. Ex. B1 | Glass | — | 80 | 15 | 20 | 115 | 80 | — | — | 0.1 | 93.3 | 108 | ⊚ | ⊚ | ⊚ |
| C. Ex. B2 | Glass | — | 300 | 15 | 20 | 335 | 300 | 1 | 1 | 0.1 | 93.6 | 111 | ○ | ○ | ○ |
| C. Ex. B3 | Glass | — | 330 | 15 | 20 | 365 | 330 | 9 | 10 | 4.0 | 89.1 | 138 | × | × | × |
| C. Ex. B4 | Glass | — | 100 | 15 | 20 | 135 | 100 | 1 | 10 | 0.1 | 92.4 | 110 | ○ | ○ | ○ |
| C. Ex. B5 | Glass | — | 100 | 15 | 20 | 135 | 100 | 35 | 10 | 0.1 | 92.2 | 130 | △ | △ | × |

Example C1

Preparation of Metal Oxide Particle (1) Dispersion
Preparation of Positively Charged Metal Oxide Base Particles (A-1)

150 g of a cation exchange resin (DUOLITE: manufactured by ROHM & HAAS) was admixed to 750 g of a silica sol (Cataloid SI-80P: manufactured by JGC CATALYSTS AND CHEMICALS LTD., average particle diameter: 80 nm, surface potential −60 mV, $SiO_2$ concentration 20 wt %, pH 10.2). The mixture was stirred for 0.5 hours.

After the cation exchange resin was separated, 135 g of an anion exchange resin (SUNNUP-C: manufactured by Mitsubishi Chemical Corporation) was added, and the mixture was stirred at 30° C. for 0.5 hours. The anion exchange resin was separated. Thus, 750 g of a purified silica sol having a $SiO_2$ concentration of 20 wt % was prepared.

Next, 5.1 g of polyaluminum chloride (Takibine #1000: manufactured by TAKI CHEMICAL CO., LTD., $Al_2O_3$ concentration 23.55 wt %) was added to 750 g of the purified silica sol. The mixture was stirred at normal temperature for 0.5 hours. Next, the mixture was diluted by the addition of 2903 g of pure water. In this manner, 3658 g of a metal oxide (silica) base particle (A-1) dispersion having a $SiO_2$ concentration of 4.1 wt % was prepared. The pH of the metal oxide base particle (A-1) dispersion was 3.7.

The surface potential of the metal oxide base particles (A-1) was measured, the result being described in the table.

To 3659 g of the metal oxide (silica) base particle (A-1) dispersion having a $SiO_2$ concentration of 4.1 wt %, was added 294 g of a silica sol (Cataloid SN-350: manufactured by JGC CATALYSTS AND CHEMICALS LTD., average particle diameter: 7 nm, surface potential −23 mV, $SiO_2$ concentration 16.6 wt %, pH 3.7) as metal oxide top particles (B-1). The mixture was stirred at 30° C. for 0.5 hours. The mixed dispersion had a $SiO_2$ concentration of 5.0 wt % and a pH of 3.5. Step (m)

Next, 135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (1) dispersion having a $SiO_2$ concentration of 10 wt %. Next, the dispersion was diluted with pure water, and a leveling agent (EXP-4026: manufactured by Nissin Kogyo) was added in an amount of 0.1 part by weight with respect to 100 parts by weight of the metal oxide particle (1) dispersion. In this manner, a metal oxide particle (1) dispersion having a solid concentration of 2.0 wt % was prepared. The pH of the dispersion was 9.0. Step (n)

The metal oxide particles (1) obtained were studied to determine the average particle diameter and the coverage ratio. The results are described in the table.

The coverage ratio in Example C1 was calculated as follows.

$(D_A)$=80 nm, $(D_B)$=7 nm, $(S_A)$=39.1 m$^2$/g

Surface area per one metal oxide particle=$4\pi \cdot [(80/2) \times 10^{-9} + (7/2)) \times 10^{-9}]^2 = 2.4 \times 10^{-14}$ m$^2$/particle Number of metal oxide base particles ($A$-1) per unit weight in $g = 1/[4/3 \times \pi \times (80/2 \times 10^{-7})^3 \times 2.2] = 1.7 \times 10^{15}$ particles (silica density: 2.2)

$(S_C) = 2.38 \times 10^{-14}$ m$^2$/particle $\times 1.7 \times 10^{15}$ particles/g $= 40.3$ m$^2$/g Coverage ratio=(39.1 m$^2$/g−34 m$^2$/g)/(40.3 m$^2$/g−34 m$^2$/g)=80.7%

Preparation of Binder Layer-Forming Liquid (1)

10.0 g of water and 0.1 g of 61 wt % nitric acid were added to 72.5 g of a modified alcohol (SOLMIX A-11: manufactured by Japan Alcohol Trading Co., Ltd., a mixed alcohol including methanol, ethanol and isopropyl alcohol). The mixture was stirred at 25° C. for 10 minutes. Next, 17.4 g of tetraethoxysilane (ethyl orthosilicate-A: manufactured by Tama Chemicals Co., Ltd., $SiO_2$ concentration 28.8 wt %) was added. The mixture was stirred at 30° C. for 30 minutes to form a tetraethoxysilane hydrolyzate (solid concentration 5.0 wt %, molecular weight: 1000). Next, there were added 333.3 g of diacetone alcohol (DAA), 666.6 g of ethylene glycol monoisopropyl ether (I-PG) and 566.67 g of a mixed alcohol (SOLMIX A-11: manufactured by Japan Alcohol Trading Co., Ltd., a mixed alcohol including methanol, ethanol and isopropyl alcohol). The mixture was stirred at 25° C. for 30 minutes to give a binder layer-forming silica liquid (1) having a solid concentration of 0.3 wt %.

Preparation of Overcoating Layer-Forming Liquid (1)

159.0 g of water and 3.3 g of 61 wt % nitric acid were added to 2252.5 g of a modified alcohol (SOLMIX A-11: manufactured by Japan Alcohol Trading Co., Ltd., a mixed alcohol including methanol, ethanol and isopropyl alcohol). The mixture was stirred at 25° C. for 5 minutes. Next, 46.4 g of tridecafluorooctyltrimethoxysilane (TSL8257: manufactured by MOMENTIVE, solid concentration 98%) was added. The mixture was stirred at 25° C. for 5 minutes and was thereafter treated at 60° C. for 3 hours.

Thereafter, 356.39 g of PGME and 213.91 g of DAA were added, and the mixture was treated at 25° C. for 30 minutes to give a fluorine-containing silica-based layer-forming liquid having a solid concentration of 1.50 wt %.

Next, 10 g of PGME and 40 g of a mixed alcohol (SOLMIX A-11: manufactured by Japan Alcohol Trading Co., Ltd., a mixed alcohol including methanol, ethanol and isopropyl alcohol) were added to 100 g of the fluorine-containing silica-based layer-forming liquid having a solid concentration of 1.50 wt %. In this manner, an overcoating layer-forming liquid (1) having a solid concentration of 1.0% was prepared.

Production of Water-repellent coating-substrate assembly (1)

First, a glass substrate (FL glass: manufactured by Hamashin Glass Inc., thickness: 3 mm, refractive index: 1.51) was coated with the metal oxide particle (1) dispersion having a solid concentration of 2.0 wt % by a bar coater method (#3) so that the dry thickness described in the table would be obtained. The wet film was dried at 80° C. for 30 seconds. Next, the binder coating liquid (1) having a solid concentration of 0.3 wt % was applied onto the metal oxide particle (1) layer with a spin coater so that the content described in the table would be obtained. The wet film was dried at 80° C. for 120 seconds and was cured at 150° C. for 30 minutes.

Next, the overcoating layer-forming liquid (1) having a solid concentration of 1.0 wt % was applied by a bar coater method (#4) so that the content described in the table would be obtained. The wet film was dried at 80° C. for 120 seconds and was dried and cured at 150° C. for 10 minutes. In this manner, a water-repellent coating-substrate assembly (1) was produced.

The water-repellent coating-substrate assembly (1) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table. The total transmittance and the haze were measured with a haze meter (manufactured by Suga Test Instruments Co., Ltd.). The uncoated glass had a total transmittance of 99.0% and a haze of 0.1%.

The pencil hardness, the scratch resistance, the water repellency and the adhesion were measured by the methods described hereinabove.

Example C2

Preparation of Metal Oxide Particle (2) Dispersion

A metal oxide particle (1) dispersion with a solid concentration of 10 wt % was prepared in the same manner as in Example C1. To the dispersion, 1.8 g of a 3 wt % aqueous acetic acid solution was added to adjust the pH of the dispersion to 5.5, and the mixture was stirred at 30° C. for 1 hour.

Next, the dispersion was centrifuged to separate the particles, which were dried at 120° C. for 15 hours. Thus, metal oxide particles (2) were prepared.

The metal oxide particles (2) obtained were studied to determine the average particle diameter and the coverage ratio. The results are described in the table.

Next, the particles were dispersed in water, and a leveling agent (EXP-4026: manufactured by Nissin Kogyo) was added in an amount of 0.1 part by weight with respect to 100 parts by weight of the metal oxide particle (2) dispersion. In this manner, a metal oxide particle (2) dispersion having a solid concentration of 2 wt % was prepared.

Production of Water-repellent coating-substrate assembly (2)

A water-repellent coating-substrate assembly (2) was produced in the same manner as in Example C1, except that the metal oxide particle (2) dispersion having a solid concentration of 2.0 wt % was used.

The water-repellent coating-substrate assembly (2) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C3

Preparation of Metal Oxide Particle (3) Dispersion

Metal oxide particles (2) prepared in the same manner as in Example C2 were calcined at 1000° C. for 2 hours and were dispersed to give a metal oxide particle (3) dispersion having a solid concentration of 10 wt %. The particles were crushed for 3 hours with a sand mill disperser (manufactured by Shinmaru Enterprises Corporation) containing 1015 g of glass media 0.5 mm in diameter, and were subsequently separated with a high-speed centrifuge (manufactured by Hitachi, Ltd.) at 2000 rpm for 3 minutes. Pure water was added for dilution. A leveling agent (EXP-4026: manufactured by Nissin Kogyo) was added in an amount of 0.1 part by weight with respect to 100 parts by weight of the metal oxide particle (3) dispersion. In this manner, a metal oxide particle (3) dispersion having a solid concentration of 2 wt % was prepared.

The metal oxide particles (3) obtained were studied to determine the average particle diameter and the coverage ratio. The results are described in the table.

Production of Water-repellent coating-substrate assembly (3)

A water-repellent coating-substrate assembly (3) was produced in the same manner as in Example C1, except that the metal oxide particle (3) dispersion having a solid concentration of 2.0 wt % was used.

The water-repellent coating-substrate assembly (3) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C4

Preparation of Metal Oxide Particle (4) Dispersion

To 3659 g of a metal oxide (silica) base particle (A-1) dispersion with a $SiO_2$ concentration of 4.1 wt % which had been prepared in the same manner as in Example C1, were added the metal oxide top particles (B-1) used in Example C1, namely, 184 g of the silica sol (Cataloid SN-350: manufactured by JGC CATALYSTS AND CHEMICALS LTD., average particle diameter: 7 nm, surface potential -23 mV, $SiO_2$ concentration 16.6 wt %, pH 3.7). The mixture was stirred at 30° C. for 0.5 hours. The mixed dispersion had a $SiO_2$ concentration of 4.7 wt % and a pH of 3.5.

Step (m)

Next, 135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (4) dispersion having a $SiO_2$ concentration of 10 wt %. Next, the dispersion was diluted with pure water, and a leveling agent (EXP-4026: manufactured by Nissin Kogyo) was added in an amount of 0.1 part by weight with respect to 100 parts by weight of the metal oxide particle (4) dispersion. In this manner, a metal oxide particle (4) dispersion having a solid concentration of 2 wt % was prepared. The pH of the dispersion was 9.0. Step (n)

The metal oxide particles (4) obtained were studied to determine the average particle diameter and the coverage ratio. The results are described in the table.

Production of Water-repellent coating-substrate assembly (4)

A water-repellent coating-substrate assembly (4) was produced in the same manner as in Example C1, except that the metal oxide particle (4) dispersion having a solid concentration of 2.0 wt % was used.

The water-repellent coating-substrate assembly (4) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C5

Preparation of Metal Oxide Particle (5) Dispersion

To 3659 g of a metal oxide (silica) base particle (A-1) dispersion with a $SiO_2$ concentration of 4.1 wt % which had been prepared in the same manner as in Example C1, were added the metal oxide top particles (B-1) used in Example C1, namely, 367 g of the silica sol (Cataloid SN-350: manufactured by JGC CATALYSTS AND CHEMICALS LTD., average particle diameter: 7 nm, surface potential −23 mV, $SiO_2$ concentration 16.6 wt %, pH 3.7). The mixture was stirred at 30° C. for 0.5 hours. The mixed dispersion had a $SiO_2$ concentration of 5.2 wt % and a pH of 3.5.
Step (m)

Next, 135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (5) dispersion having a $SiO_2$ concentration of 10 wt %. Next, the dispersion was diluted with pure water, and a leveling agent (EXP-4026: manufactured by Nissin Kogyo) was added in an amount of 0.1 part by weight with respect to 100 parts by weight of the metal oxide particle (5) dispersion. In this manner, a metal oxide particle (5) dispersion having a solid concentration of 2 wt % was prepared. The pH of the dispersion was 9.0. Step (n)

The metal oxide particles (5) obtained were studied to determine the average particle diameter and the coverage ratio. The results are described in the table.
Production of Water-repellent coating-substrate assembly (5)

A water-repellent coating-substrate assembly (5) was produced in the same manner as in Example C1, except that the metal oxide particle (5) dispersion having a solid concentration of 2.0 wt % was used.

The water-repellent coating-substrate assembly (5) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C6

Preparation of Metal Oxide Particle (6) Dispersion

Preparation of Positively Charged Metal Oxide Base Particles (A-2)

150 g of a cation exchange resin (DUOLITE: manufactured by ROHM & HAAS) was admixed to 750 g of a silica sol (Cataloid SI-45P: manufactured by JGC CATALYSTS AND CHEMICALS LTD., average particle diameter: 45 nm, surface potential −60 mV, $SiO_2$ concentration 20 wt %, pH 10.2). The mixture was stirred at 30° C. for 0.5 hours. After the cation exchange resin was separated, 135 g of an anion exchange resin (SUNNUP-C: manufactured by Mitsubishi Chemical Corporation) was added, and the mixture was stirred for 0.5 hours. The anion exchange resin was separated. Thus, 750 g of a purified silica sol having a $SiO_2$ concentration of 20 wt % was prepared.

Next, 9.2 g of polyaluminum chloride (Takibine #1000: manufactured by TAKI CHEMICAL CO., LTD., $Al_2O_3$ concentration 23.55 wt %) was added to 750 g of the purified silica sol. The mixture was stirred at normal temperature for 0.5 hours. Next, the mixture was diluted by the addition of 2903 g of pure water. In this manner, 3662 g of a metal oxide (silica) base particle (A-2) dispersion having a $SiO_2$ concentration of 4.1 wt % was prepared. The surface potential of the metal oxide base particles (A-2) was measured, the result being described in the table.

To 3662 g of the metal oxide (silica) base particle (A-2) dispersion having a $SiO_2$ concentration of 4.1 wt %, was added 595 g of a silica sol (Cataloid SN-350: manufactured by JGC CATALYSTS AND CHEMICALS LTD., average particle diameter: 7 nm, surface potential −23 mV, $SiO_2$ concentration 16.6 wt %, pH 3.7). The mixed dispersion had a pH of 3.5. Step (m)

Next, 135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (6) dispersion having a $SiO_2$ concentration of 10 wt %. Next, the dispersion was diluted with pure water, and a leveling agent (EXP-4026: manufactured by Nissin Kogyo) was added in an amount of 0.1 part by weight with respect to 100 parts by weight of the metal oxide particle (6) dispersion. In this manner, a metal oxide particle (6) dispersion having a solid concentration of 2 wt % was prepared. The pH of the dispersion was 9.0. Step (n)

The metal oxide particles (6) obtained were studied to determine the average particle diameter and the coverage ratio. The results are described in the table.
Production of Water-repellent coating-substrate assembly (6)

A water-repellent coating-substrate assembly (6) was produced in the same manner as in Example C1, except that the metal oxide particle (6) dispersion diluted to a solid concentration of 2.0 wt % with pure water was used.

The water-repellent coating-substrate assembly (6) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C7

Preparation of Metal Oxide Particle (7) Dispersion

Preparation of Positively Charged Metal Oxide Base Particles (A-3)

150 g of a cation exchange resin (DUOLITE: manufactured by ROHM & HAAS) was admixed to 833 g of a silica sol (Spherica Slurry 120: manufactured by JGC CATALYSTS AND CHEMICALS LTD., average particle diameter: 120 nm, surface potential −65 mV, $SiO_2$ concentration 18 wt %, pH 10.2). The mixture was stirred at 30° C. for 0.5 hours. After the cation exchange resin was separated, 135 g of an anion exchange resin (SUNNUP-C: manufactured by Mitsubishi Chemical Corporation) was added, and the mixture was stirred for 0.5 hours. The anion exchange resin was separated. Thus, 833 g of a purified silica sol having a $SiO_2$ concentration of 20 wt % was prepared.

Next, 3.5 g of polyaluminum chloride (Takibine #1000: manufactured by TAKI CHEMICAL CO., LTD., $Al_2O_3$ concentration 23.55 wt %) was added to 833 g of the purified silica sol. The mixture was stirred at normal temperature for 0.5 hours. Next, the mixture was diluted by the addition of 2826 g of pure water. In this manner, 3659 g of a metal oxide (silica) base particle (A-3) dispersion having a $SiO_2$ concentration of 4.1 wt % was prepared. The surface potential of the metal oxide base particles (A-3) was measured, the result being described in the table.

To 3659 g of the metal oxide (silica) base particle (A-3) dispersion having a $SiO_2$ concentration of 4.1 wt %, was added 185 g of a silica sol (Cataloid SN-350: manufactured by JGC CATALYSTS AND CHEMICALS LTD., average particle diameter: 7 nm, surface potential −23 mV, $SiO_2$ concentration 16.6 wt %, pH 3.7). The mixed dispersion had a pH of 3.5. Step (m)

Next, 135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (7) dispersion having a $SiO_2$ concentration of 10 wt %. Next, the dispersion was diluted with pure water, and a leveling agent (EXP-4026: manufactured by Nissin Kogyo) was added in an amount of 0.1 part by weight with respect to 100 parts by weight of the metal oxide particle (1) dispersion. In this manner, a metal oxide particle (7) dispersion having a solid concentration of 2 wt % was prepared. The pH of the dispersion was 9.0. Step (n)

The metal oxide particles (7) obtained were studied to determine the average particle diameter and the coverage ratio. The results are described in the table.

Production of Water-repellent coating-substrate assembly (7)

A water-repellent coating-substrate assembly (7) was produced in the same manner as in Example C1, except that the metal oxide particle (7) dispersion having a solid concentration of 2.0 wt % was used.

The water-repellent coating-substrate assembly (7) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C8

Preparation of Metal Oxide Particles (8)

Preparation of Positively Charged Metal Oxide Top Particles (B-2)

A 5 L container was loaded with 17.5 g of cerium (III) sulfate octahydrate and 1765.8 g of distilled water, and stirring was performed to obtain a solution. While continuously performing stirring, the temperature was raised to 93° C. and the whole of 1255 g of a 1.0% aqueous sodium hydroxide solution was added at once. While performing stirring, the mixture was held at a temperature of 93° C. for 6 hours. Subsequently, the liquid was cooled to 30° C. or below and a white precipitate was formed. The pH of the solution was 10.0. The solution was treated with a centrifuge at 14000 rpm for 10 minutes, and thereafter the supernatant was removed. 2884.5 g of distilled water was added to the white precipitate, and the mixture was treated with the centrifuge at 14000 rpm for another 10 minutes. These operations were performed three times. The precipitate was washed and a ceria fine particle dispersion ($CeO_2$ concentration 2.1 wt %, pH 10.0) was prepared. The ceria fine particles were monodispersed and had an average particle diameter of 5 nm.

Next, 75.0 g of a cation exchange resin (DUOLITE: manufactured by ROHM & HAAS) was admixed to 3571.4 g of the ceria fine particle dispersion. The mixture was stirred at 30° C. for 0.5 hours. In this manner, a metal oxide top particle (B-2) dispersion was prepared.

The pH of the metal oxide top particle (B-2) dispersion was 3.0. Further, the surface potential and the average particle diameter of the metal oxide top particles (B-2) were measured, the results being described in the table.

Preparation of Negatively Charged Metal Oxide Base Particle (A-4) Dispersion 150 g of a cation exchange resin (DUOLITE: manufactured by ROHM & HAAS) was admixed to 750 g of a silica sol (Cataloid SI-80P: manufactured by JGC CATALYSTS AND CHEMICALS LTD., average particle diameter: 80 nm, surface potential −60 mV, $SiO_2$ concentration 20 wt %, pH 10.2). The mixture was stirred at 30° C. for 0.5 hours. After the cation exchange resin was separated, 135 g of an anion exchange resin (SUNNUP-C: manufactured by Mitsubishi Chemical Corporation) was added, and the mixture was stirred at 30° C. for 0.5 hours. The anion exchange resin was separated. Thus, 750 g of a purified silica sol having a $SiO_2$ concentration of 20 wt % was prepared. The sol was diluted to 4.1 wt %, and a metal oxide base particle (A-4) dispersion was thus obtained. The pH was 3.5. The surface potential of the metal oxide base particles (A-4) was measured, the result being described in the table.

To 3659 g of the metal oxide base particle (A-4) dispersion, 3571.4 g of the metal oxide top particle (B-2) dispersion was admixed. The mixture was stirred at 30° C. for 0.5 hours. The pH of the mixed dispersion was 3.2. Step (m)

The step (n) was performed in the same manner as in Example C1 to afford a metal oxide particle (8) dispersion having a $SiO_2$ concentration of 2.0 wt %. Step (n)

The metal oxide particles (8) obtained were studied to determine the average particle diameter and the coverage ratio. The results are described in the table.

Production of Water-repellent coating-substrate assembly (8)

A water-repellent coating-substrate assembly (8) was produced in the same manner as in Example C1, except that the metal oxide particle (8) dispersion having a $SiO_2$ concentration of 2.0 wt % was used.

The water-repellent coating-substrate assembly (8) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C9

Preparation of Metal Oxide Particle (9) Dispersion

Preparation of Positively Charged Metal Oxide Top Particles (B-3)

A sand mill (manufactured by Shinmaru Enterprises Corporation, containing 1100 g of glass beads 0.5 mm in diameter) was loaded with 82.7 g of an alumina sol (Cataloid AP-5: manufactured by JGC CATALYSTS AND CHEMICALS LTD., average particle diameter 60 nm, surface potential 55 mV, $Al_2O_3$ concentration 78 wt %, pH 4.5) and 580.5 g of pure water. The particles were crushed at 2160 rpm for 180 minutes, and thereby a metal oxide (alumina) top particle (B-3) dispersion was prepared.

The pH of the metal oxide top particle (B-3) dispersion was 4.0. The metal oxide top particles (B-3) were studied to determine the surface potential and the average particle diameter. The results are described in the table.

Next, 672.6 g of the metal oxide top particle (B-3) dispersion was admixed to 3659 g of a metal oxide (silica) base particle (A-4) dispersion with a $SiO_2$ concentration of 4.1 wt % which had been prepared in the same manner as in Example C8. The mixture was stirred at 30° C. for 0.5 hours. The pH of the mixed dispersion was 3.6. Step (m)

The step (n) was performed in the same manner as in Example C1 to afford a metal oxide particle (9) dispersion having a $SiO_2 \cdot Al_2O_3$ concentration of 10 wt %. Next, the dispersion was diluted with pure water and the leveling agent was added in an amount of 0.1 part by weight with respect to 100 parts by weight of the metal oxide particle (9) dispersion. In this manner, a metal oxide particle (9) dispersion having a solid concentration of 2.0 wt % was prepared. Step (n)

The metal oxide particles (9) obtained were studied to determine the average particle diameter and the coverage ratio. The results are described in the table.

Production of Water-repellent coating-substrate assembly (9)

First, a glass substrate (FL glass: manufactured by Hamashin Glass Inc., thickness: 3 mm, refractive index: 1.51) was coated with the binder coating liquid (1) having a solid concentration of 0.3 wt % with a spin coater so that the content described in the table would be obtained. The wet film was dried at 80° C. for 30 seconds. Next, the metal oxide particle (9) dispersion having a solid concentration of 2.0 wt % was applied by a bar coater method (#3) so that the dry thickness described in the table would be obtained. The wet film was dried at 80° C. for 30 seconds. Next, the binder coating liquid (1) having a solid concentration of 0.3 wt % was applied onto the metal oxide particle (9) layer with a spin coater so that the content described in the table would be obtained. The wet film was dried at 80° C. for 120 seconds and was cured at 150° C. for 30 minutes.

Next, the overcoating layer-forming liquid (1) having a solid concentration of 1.0 wt % was applied by a bar coater method (#4) so that the content described in the table would be obtained. The wet film was dried at 80° C. for 120 seconds and was dried and cured at 150° C. for 10 minutes. In this manner, a water-repellent coating-substrate assembly (9) was produced.

The water-repellent transparent coating-substrate assembly (9) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C10

Preparation of Metal Oxide Particle (10) Dispersion

As metal oxide top particles (B-4), 122 g of a silica sol (Cataloid SN: manufactured by JGC CATALYSTS AND CHEMICALS LTD., average particle diameter 5 nm, surface potential −20 mV, $SiO_2$ concentration 20.0 wt %, pH 3.8) was admixed to 3659 g of a metal oxide (silica) base particle (A-1) dispersion with a $SiO_2$ concentration of 4.1 wt % which had been prepared in the same manner as in Example C1. The mixture was stirred at 30° C. for 0.5 hours. The mixed dispersion had a $SiO_2$ concentration of 5.0 wt % and a pH of 3.5. Step (m)

Next, 135 g of an anion exchange resin (SUNNUP-C: manufactured by Mitsubishi Chemical Corporation) was added to the mixed dispersion, and the mixture was stirred at 30° C. for 0.5 hours. The anion exchange resin was separated, and the dispersion was concentrated with a rotary evaporator to give a metal oxide (silica) particle (10) dispersion having a $SiO_2$ concentration of 10 wt %. Next, the dispersion was diluted with pure water, and the leveling agent was added in an amount of 0.1 part by weight with respect to 100 parts by weight of the metal oxide particle (10) dispersion. In this manner, a metal oxide particle (10) dispersion having a solid concentration of 2.0 wt % was prepared. The pH of the metal oxide particle (10) dispersion was 9.0. Step (n)

The metal oxide particles (10) obtained were studied to determine the average particle diameter and the coverage ratio. The results are described in the table.

Production of Water-repellent coating-substrate assembly (10)

A water-repellent coating-substrate assembly (10) was produced in the same manner as in Example C1, except that the metal oxide particle (10) dispersion having a solid concentration of 2.0 wt % was used.

The water-repellent coating-substrate assembly (10) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C11

Preparation of Metal Oxide Particle (11) Dispersion

Preparation of Metal Oxide Top Particles (B-5)

By the addition of pure water, 833 g of a silica sol (Cataloid SI-50: manufactured by JGC CATALYSTS AND CHEMICALS LTD., average particle diameter 25 nm, surface potential −51 mV, $SiO_2$ concentration 48.0 wt %, pH 10.2) was diluted to 20%. To the solution, 150 g of a cation exchange resin (DUOLITE: manufactured by ROHM & HAAS) was admixed. The mixture was stirred at 30° C. for 0.5 hours. After the cation exchange resin was separated, 135 g of an anion exchange resin (SUNNUP-C: manufactured by Mitsubishi Chemical Corporation) was added, and the mixture was stirred at 30° C. for 0.5 hours. The anion exchange resin was separated. Thus, a metal oxide top particle (B-5) dispersion having a $SiO_2$ concentration of 20 wt % was prepared. The pH was 3.8, and the surface potential was −20 mV.

Next, 520 g of the metal oxide top particle (B-5) dispersion was admixed to 3659 g of a metal oxide (silica) base particle (A-1) dispersion with a $SiO_2$ concentration of 4.1 wt % which had been prepared in the same manner as in Example C1. The mixture was stirred at 30° C. for 0.5 hours. The mixed dispersion had a $SiO_2$ concentration of 6.0 wt % and a pH of 3.5.

Step (m)

135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (11) dispersion having a $SiO_2$ concentration of 10 wt %. Next, the dispersion was diluted with pure water, and the leveling agent was added in an amount of 0.1 part by weight with respect to 100 parts by weight of the metal oxide particle (11) dispersion. In this manner, a metal oxide particle (11) dispersion having a solid concentration of 2.0 wt % was prepared. The pH of the dispersion was 9.0. Step (n)

The metal oxide particles (11) obtained were studied to determine the average diameter and the coverage ratio. The results are described in the table.

Production of Water-repellent coating-substrate assembly (11)

A water-repellent coating-substrate assembly (11) was produced in the same manner as in Example C1, except that the metal oxide particle (11) dispersion having a solid concentration of 2.0 wt % was used.

The water-repellent coating-substrate assembly (11) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C12

Preparation of Metal Oxide Particle (12) Dispersion

Preparation of Positively Charged Metal Oxide Base Particle (A-5) Dispersion

The procedures in the preparation of the positively charged metal oxide base particles (A-1) in Example C1 were repeated, except that 5.1 g of polyaluminum chloride (Takibine #1000: manufactured by TAKI CHEMICAL CO., LTD., $Al_2O_3$ concentration 23.55 wt %) was added to 750 g of the purified silica sol, the mixture was stirred at normal temperature for 0.5 hours, and hydrothermal treatment was performed at 80° C. for 3 hours. In this manner, 3659 g of a metal oxide (silica) base particle (A-5) dispersion having a $SiO_2$ concentration of 4.1 wt % was prepared. The pH of the metal oxide base particle (A-5) dispersion was 3.7. The surface potential of the metal oxide base particles (A-5) was measured, the result being described in the table.

To 3659 g of the metal oxide (silica) base particle (A-5) dispersion having a $SiO_2$ concentration of 4.1 wt %, were added the metal oxide top particles (B-1) used in Example C1, namely, 367 g of the silica sol (Cataloid SN-350: manufactured by JGC CATALYSTS AND CHEMICALS LTD., average particle diameter: 7 nm, surface potential −23 mV, $SiO_2$ concentration 16.6 wt %, pH 3.7). The mixed dispersion was subjected to hydrothermal treatment at 150° C. for 3 hours and was cooled to 30° C. The resultant mixed dispersion had a $SiO_2$ concentration of 5.2 wt % and a pH of 3.5.
Step (m)

Next, 135 g of an anion exchange resin (SUNNUP-C: manufactured by Mitsubishi Chemical Corporation) was added to the mixed dispersion, and the mixture was stirred at 30° C. for 0.5 hours. The anion exchange resin was separated, and the dispersion was concentrated with a rotary evaporator to give a metal oxide (silica) particle (12) dispersion having a $SiO_2$ concentration of 10 wt %. Next, the dispersion was diluted with pure water, and the leveling agent was added in an amount of 0.1 part by weight with respect to 100 parts by weight of the metal oxide particle (12) dispersion. In this manner, a metal oxide particle (12) dispersion having a solid concentration of 2.0 wt % was prepared. The pH of the dispersion was 9.0. Step (n)
Production of Water-repellent coating-substrate assembly (12)

A water-repellent coating-substrate assembly (12) was produced in the same manner as in Example C1, except that the metal oxide particle (12) dispersion having a solid concentration of 2.0 wt % was used.

The water-repellent coating-substrate assembly (12) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C13

Production of Water-repellent coating-substrate assembly (13)

A water-repellent coating-substrate assembly (13) was produced in the same manner as in Example C1, except that the overcoating layer-forming liquid (1) having a solid concentration of 1.0 wt % was applied so that the content described in the table would be obtained.

The water-repellent transparent coating-substrate assembly (13) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C14

Production of Water-repellent coating-substrate assembly (14)

A water-repellent coating-substrate assembly (14) was produced in the same manner as in Example C1, except that the overcoating layer-forming liquid (1) having a solid concentration of 1.0 wt % was applied so that the content described in the table would be obtained.

The water-repellent transparent coating-substrate assembly (14) was tested to determine the composition, the average height (IF) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C15

Production of Water-repellent coating-substrate assembly (15)

A water-repellent coating-substrate assembly (15) was produced in the same manner as in Example C1, except that the application and drying of the binder layer-forming liquid (1) was not performed.

The water-repellent transparent coating-substrate assembly (15) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C16

Production of Water-repellent coating-substrate assembly (16)

First, a polyester resin substrate (PC0.5: manufactured by UNITIKA LTD., thickness: 0.5 mm, refractive index: 1.60) was coated with a metal oxide particle (1) dispersion with a solid concentration of 2.0 wt % which had been prepared in the same manner as in Example C1, by a bar coater method (#3) so that the dry thickness described in the table would be obtained. The wet film was dried at 80° C. for 30 seconds. Next, the binder coating liquid (1) having a solid concentration of 0.3 wt % was applied onto the metal oxide particle (1) layer with a spin coater so that the content described in the table would be obtained. The wet film was dried at 80° C. for 120 seconds and was cured at 150° C. for 30 minutes.

Next, a silicone-based water-repellent agent (TSW8251: manufactured by MOMENTIVE, solid concentration 3.3 wt %) as an overcoating layer-forming liquid (2) was applied by a bar coater method (#4) so that the content described in the table would be obtained. The wet film was dried at 80° C. for 120 seconds and was dried and cured at 150° C. for 10 minutes. In this manner, a water-repellent coating-substrate assembly (16) was produced.

The water-repellent coating-substrate assembly (16) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Example C17

Production of Water-repellent coating-substrate assembly (17)

A water-repellent coating-substrate assembly (17) was produced in the same manner as in Example C1, except that the glass substrate (FL glass: manufactured by Hamashin Glass Inc., thickness: 3 mm, refractive index: 1.51) was replaced by a stainless steel substrate (SUS304: manufactured by Iwasaki Corporation, thickness 1 mm).

The water-repellent coating-substrate assembly (17) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example C1

Preparation of Metal Oxide Particle (R1) Dispersion

Pure water was added to a metal oxide base particle (A-1) dispersion prepared in the same manner as in Example C1, and the leveling agent was added in an amount of 0.1 part by weight with respect to 100 parts by weight of the metal oxide base particle (A-1) dispersion. In this manner, a metal oxide particle (R1) dispersion having a solid concentration of 2 wt % was prepared.

Production of Water-repellent coating-substrate assembly (R1)

A water-repellent coating-substrate assembly (R1) was produced in the same manner as in Example C1, except that the metal oxide particle (R1) dispersion having a solid concentration of 2.0 wt % was used.

The water-repellent coating-substrate assembly (R1) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example C2

Preparation of Metal Oxide Particle (R2) Dispersion

Water was added to a silica sol (SN-350: manufactured by JGC CATALYSTS AND CHEMICALS LTD., average particle diameter: 7 nm, $SiO_2$ concentration 16.6 wt %, surface potential −23 mV, pH 3.7) to form a silica sol having a solid concentration of 2 wt %.

The sol was mixed together with an equal amount of a metal oxide particle (R1) dispersion having a solid concentration of 2 wt % which had been prepared in the same manner as in Comparative Example C1. Thus, a metal oxide particle (R2) dispersion having a solid concentration of 2 wt % was prepared.

Production of Water-repellent coating-substrate assembly (R2)

A water-repellent coating-substrate assembly (R2) was produced in the same manner as in Example C1, except that the metal oxide particle (R2) dispersion having a solid concentration of 2.0 wt % was used.

The water-repellent coating-substrate assembly (R2) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example C3

Preparation of Metal Oxide Particle (R3) Dispersion

Preparation of Positively Charged Metal Oxide Base Particles (RA-3)

By the addition of pure water, 833 g of a silica sol (Cataloid SI-50: manufactured by JGC CATALYSTS AND CHEMICALS LTD., average particle diameter 25 nm, surface potential −51 mV, $SiO_2$ concentration 48.0 wt %, pH 10.2) was diluted to 20%. To the solution, 150 g of a cation exchange resin (DUOLITE: manufactured by ROHM & HAAS) was admixed. The mixture was stirred for 0.5 hours. After the cation exchange resin was separated, 135 g of an anion exchange resin (SUNNUP-C: manufactured by Mitsubishi Chemical Corporation) was added, and the mixture was stirred for 0.5 hours. The anion exchange resin was separated. Thus, metal oxide base particles (RA-3) dispersion having a $SiO_2$ concentration of 20 wt % were prepared. The pH was 3.8, and the surface potential was −20 mV.

Next, 5.1 g of polyaluminum chloride (Takibine #1000: manufactured by TAKI CHEMICAL CO., LTD., $Al_2O_3$ concentration 23.55 wt %) was added. A metal oxide base particle (RA-3) dispersion having a solid concentration of 20 wt % was thus prepared. The pH of the dispersion was 3.7.

The metal oxide base particles (RA-3) obtained were studied to determine the average particle diameter and the surface potential. The results are described in the table.

Next, 2908 g of pure water was added to 750 g of the metal oxide base particle (RA-3) dispersion having a solid concentration of 20 wt % to dilute the dispersion to a solid concentration of 4.1 wt %. Next, there was added 241.0 g of a silica sol (SN-350: manufactured by JGC CATALYSTS AND CHEMICALS LTD., average particle diameter: 7 nm, $SiO_2$ concentration 16.6 wt %, surface potential −23 mV, pH 3.7) as metal oxide top fine particles. The mixture was stirred at 30° C. for 0.5 hours.

The resultant mixed dispersion had a solid concentration of 4.8 wt % and a pH of 3.5. Step (m)

Next, 135 g of an anion exchange resin (SUNNUP-C: manufactured by Mitsubishi Chemical Corporation) was added to the mixed dispersion, and the mixture was stirred at 30° C. for 0.5 hours. The anion exchange resin was separated, and the dispersion was concentrated with a rotary evaporator to give a metal oxide (silica) particle (R3) dispersion having a $SiO_2$ concentration of 10 wt %. Next, the dispersion was diluted with pure water, and the leveling agent was added in an amount of 0.1 part by weight with respect to 100 parts by weight of the metal oxide particle (R3) dispersion. In this manner, a metal oxide particle (R3) dispersion having a solid concentration of 2.0 wt % was prepared. The pH of the dispersion was 9.0. Step (n)

The metal oxide particles (R3) obtained were studied to determine the average particle diameter and the coverage ratio. The results are described in the table.

Production of Water-repellent coating-substrate assembly (R3)

A water-repellent coating-substrate assembly (R3) was produced in the same manner as in Example C1, except that the metal oxide particle (R3) dispersion having a solid concentration of 2.0 wt % was used.

The water-repellent coating-substrate assembly (R3) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example C4

Preparation of Metal Oxide Particle (R4) Dispersion

Preparation of Positively Charged Metal Oxide Base Particles (RA-4)

Pure water was added to silica particles (SHINSHIKYU SW-1.0: manufactured by JGC CATALYSTS AND CHEMICALS LTD., average particle diameter 1000 nm, $SiO_2$ concentration 100 wt %) to give 3657 g of a silica particle dispersion having a $SiO_2$ concentration of 4.1 wt %. The surface potential of the silica particles was −70 mV, and the pH of the dispersion was 6.0.

Next, 2.1 g of polyaluminum chloride (Takibine #1000: manufactured by TAKI CHEMICAL CO., LTD., $Al_2O_3$ concentration 23.55 wt %) was added. A metal oxide base particle (RA-4) dispersion having a solid concentration of 20 wt % was thus prepared. The pH of the dispersion was 3.7. The metal oxide base particles (RA-4) obtained were studied to determine the average particle diameter and the surface potential. The results are described in the table.

Next, there was added 1.88 g of a silica sol (SN-350: manufactured by JGC CATALYSTS AND CHEMICALS LTD., average particle diameter: 7 nm, $SiO_2$ concentration 16.6 wt %, surface potential −23 mV, pH 3.7) as metal oxide top fine particles. The mixture was stirred at 30° C. for 0.5 hours. The resultant mixed dispersion had a solid concentration of 4.1 wt % and a pH of 3.7.

135 g of an anion exchange resin (SUNNUP-C: manufactured by Mitsubishi Chemical Corporation) was added to the mixed dispersion, and the mixture was stirred for 0.5 hours. The anion exchange resin was separated, and the dispersion was concentrated with a rotary evaporator to give a metal oxide (silica) particle (R4) dispersion having a $SiO_2$ concentration of 10 wt %. Next, the dispersion was diluted with pure water, and the leveling agent was added in an amount of 0.1 part by weight with respect to 100 parts by weight of the metal oxide particle (R4) dispersion. In this manner, a metal oxide particle (R4) dispersion having a solid concentration of 2.0 wt % was prepared. The pH of the dispersion was 9.0. Step (n)

The metal oxide particles (R4) obtained were studied to determine the average particle diameter and the coverage ratio. The results are described in the table.

Production of Water-repellent coating-substrate assembly (R4)

A water-repellent coating-substrate assembly (R4) was produced in the same manner as in Example C1, except that the metal oxide particle (R4) dispersion having a solid concentration of 2.0 wt % was used.

The water-repellent transparent coating-substrate assembly (R4) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example C5

Production of Water-repellent coating-substrate assembly (R5)

A water-repellent coating-substrate assembly (R5) was produced in the same manner as in Example C1, except that the formation of the metal oxide particle layer and the binder layer was omitted and an overcoating layer-forming liquid (1) with a solid concentration of 0.3% which had been prepared in the same manner as in Example C1 was directly applied onto the substrate (1) by a bar coater method (#4) so that the content described in the table would be obtained, and the wet film was dried at 80° C. for 120 seconds and was dried and cured at 150° C. for 10 minutes.

The water-repellent coating-substrate assembly (R5) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

Comparative Example C6

Production of Water-repellent coating-substrate assembly (R6)

A water-repellent coating-substrate assembly (R6) was produced in the same manner as in Example C1, except that the formation of the metal oxide particle layer and the binder layer was omitted and an overcoating layer-forming liquid (2) with a solid concentration of 3.3 wt % which had been prepared in the same manner as in Example C16 was directly applied onto the glass substrate by a bar coater method (#4) so that the content described in the table would be obtained, and the wet film was dried at 80° C. for 120 seconds and was dried and cured at 150° C. for 10 minutes.

The water-repellent coating-substrate assembly (R6) was tested to determine the composition, the average height ($T_F$) and the average protrusion interval ($W_F$) of the irregularities, the average height ($T_{FF}$) and the average protrusion interval ($W_{FF}$) of the finer irregularities, pencil hardness, adhesion, scratch resistance, water repellency, total transmittance and haze, the results being described in the table.

TABLE 3

| | Production conditions | | | | | | | | | | | | | | | | |
|---|---|---|---|---|---|---|---|---|---|---|---|---|---|---|---|---|---|
| | Step (a1) Binder layer-forming liquid | | Step (a) Sunflower-shaped inorganic oxide particle dispersion | | | | | | | | | | | | | Step (a2) Binder layer-forming liquid | |
| | | | Inorganic oxide base particles | | | | Inorganic oxide top fine particles | | | | Sunflower-shaped inorganic oxide particles | | | | | | |
| | Material | Concentration wt % | Material | Surface potential ($V_A$) mV | Average particle diameter ($D_A$) nm | Surface Area ($S_M$) | Material | Surface potential ($V_B$) mV | Average particle diameter ($D_B$) nm | Average particle diameter ($D_B$) nm | Actually measured surface area ($S_A$) m²/g | Coverage ratio % | Particle diameter ratio ($D_B/D_A$) | Concentration wt % | Material | Concentration wt % |
| Ex. C1 | — | — | SiO₂ | −60 | 80 | 34.0 | SiO₂ | −23 | 7 | 94 | 39.1 | 80.7 | 0.09 | 2.0 | TESO* | 0.3 |
| Ex. C2 | — | — | SiO₂ | −60 | 80 | 34.0 | SiO₂ | −23 | 7 | 94 | 39.1 | 80.7 | 0.09 | 2.0 | TESO | 0.3 |
| Ex. C3 | — | — | SiO₂ | −60 | 80 | 34.0 | SiO₂ | −23 | 7 | 94 | 39.1 | 80.7 | 0.09 | 2.0 | TESO | 0.3 |
| Ex. C4 | — | — | SiO₂ | −60 | 80 | 34.0 | SiO₂ | −23 | 7 | 88 | 37.0 | 47.5 | 0.09 | 2.0 | TESO | 0.3 |
| Ex. C5 | — | — | SiO₂ | −60 | 80 | 34.0 | SiO₂ | −23 | 7 | 94 | 40.0 | 95.0 | 0.09 | 2.0 | TESO | 0.3 |
| Ex. C6 | — | — | SiO₂ | −60 | 80 | 34.0 | SiO₂ | −23 | 7 | 58 | 80.1 | 95.9 | 0.16 | 2.0 | TESO | 0.3 |
| Ex. C7 | — | — | SiO₂ | −65 | 45 | 60.6 | SiO₂ | −23 | 7 | 140 | 25.1 | 86.9 | 0.06 | 2.0 | TESO | 0.3 |
| Ex. C8 | — | — | SiO₂ | −60 | 120 | 22.7 | CeO₂ | 50 | 5 | 90 | 38.0 | 89.2 | 0.06 | 2.0 | TESO | 0.3 |
| Ex. C9 | TESO | 0.3 | SiO₂ | −60 | 80 | 34.0 | Al₂O₃ | 55 | 20 | 150 | 53.0 | 98.6 | 0.25 | 2.0 | TESO | 0.3 |
| Ex. C10 | — | — | SiO₂ | −60 | 80 | 34.0 | SiO₂ | −20 | 5 | 88 | 38.0 | 89.2 | 0.06 | 2.0 | TESO | 0.3 |
| Ex. C11 | — | — | SiO₂ | −60 | 80 | 34.0 | SiO₂ | −20 | 25 | 110 | 49.5 | 62.7 | 0.31 | 2.0 | TESO | 0.3 |
| Ex. C12 | — | — | SiO₂ | −60 | 80 | 34.0 | SiO₂ | −23 | 7 | 94 | 39.4 | 85.5 | 0.09 | 2.0 | TESO | 0.3 |
| Ex. C13 | — | — | SiO₂ | −60 | 80 | 34.0 | SiO₂ | −23 | 7 | 94 | 39.1 | 80.7 | 0.09 | 2.0 | TESO | 0.3 |
| Ex. C14 | — | — | SiO₂ | −60 | 80 | 34.0 | SiO₂ | −23 | 7 | 94 | 39.1 | 80.7 | 0.09 | 2.0 | TESO | 0.3 |
| Ex. C15 | — | — | SiO₂ | −60 | 80 | 34.0 | SiO₂ | −23 | 7 | 94 | 39.1 | 80.7 | 0.09 | 2.0 | — | — |
| Ex. C16 | — | — | SiO₂ | −60 | 80 | 34.0 | SiO₂ | −23 | 7 | 94 | 39.1 | 80.7 | 0.09 | 2.0 | TESO | 0.3 |
| Ex. C17 | — | — | SiO₂ | −60 | 80 | 34.0 | SiO₂ | −23 | 7 | 94 | 39.1 | 80.7 | 0.09 | 2.0 | TESO | 0.3 |
| C. Ex. C1 | — | — | SiO₂ | −60 | 80 | 34.0 | — | — | — | — | — | — | — | — | TESO | 0.3 |
| C. Ex. C2 | — | — | SiO₂ | −60 | 80 | 34.0 | SiO₂ | −23 | 7 | 807 | 5.0 | — | — | — | TESO | 0.3 |
| C. Ex. C3 | — | — | SiO₂ | −20 | 25 | 109.1 | SiO₂ | −23 | 7 | 30 | 140.0 | 0.28 | 0.28 | 2.0 | TESO | 0.3 |
| C. Ex. C4 | — | — | SiO₂ | 40 | 1000 | 2.7 | SiO₂ | −23 | 7 | 1100 | 2.76 | 0.01 | 0.01 | 2.0 | TESO | 0.3 |
| C. Ex. C5 | | | | | | | Overcoating layer alone was formed. | | | | | | | | | | |
| C. Ex. C6 | | | | | | | Overcoating layer alone was formed. | | | | | | | | | | |

TABLE 3-continued

| | Production conditions | | | | | |
|---|---|---|---|---|---|---|
| | Step (c) | | | | Step (d) | |
| | Overcoating layer-forming liquid | | Drying | | Heat treatment | |
| | Material | Concentration wt % | Temperature °C. | Time min | Temperature °C. | Time min |
| Ex. C1 | Tridecafluorooctyltrimethoxysilane | 1.0 | 80 | 10 | 150 | 30 |
| Ex. C2 | Tridecafluorooctyltrimethoxysilane | 1.0 | 80 | 10 | 150 | 30 |
| Ex. C3 | Tridecafluorooctyltrimethoxysilane | 1.0 | 80 | 10 | 150 | 30 |
| Ex. C4 | Tridecafluorooctyltrimethoxysilane | 1.0 | 80 | 10 | 150 | 30 |
| Ex. C5 | Tridecafluorooctyltrimethoxysilane | 1.0 | 80 | 10 | 150 | 30 |
| Ex. C6 | Tridecafluorooctyltrimethoxysilane | 1.0 | 80 | 10 | 150 | 30 |
| Ex. C7 | Tridecafluorooctyltrimethoxysilane | 1.0 | 80 | 10 | 150 | 30 |
| Ex. C8 | Tridecafluorooctyltrimethoxysilane | 1.0 | 80 | 10 | 150 | 30 |
| Ex. C9 | Tridecafluorooctyltrimethoxysilane | 1.0 | 80 | 10 | 150 | 30 |
| Ex. C10 | Tridecafluorooctyltrimethoxysilane | 1.0 | 80 | 10 | 150 | 30 |
| Ex. C11 | Tridecafluorooctyltrimethoxysilane | 1.0 | 80 | 10 | 150 | 30 |
| Ex. C12 | Tridecafluorooctyltrimethoxysilane | 1.0 | 80 | 10 | 150 | 30 |
| Ex. C13 | Tridecafluorooctyltrimethoxysilane | 1.0 | 80 | 10 | 150 | 30 |
| Ex. C14 | Tridecafluorooctyltrimethoxysilane | 1.0 | 80 | 10 | 150 | 30 |
| Ex. C15 | Tridecafluorooctyltrimethoxysilane | 1.0 | 80 | 10 | 150 | 30 |
| Ex. C16 | TSW8251 (silicone-based) | 3.3 | 80 | 10 | 150 | 30 |
| Ex. C17 | Tridecafluorooctyltrimethoxysilane | 1.0 | 80 | 10 | 150 | 30 |
| C. Ex. C1 | Tridecafluorooctyltrimethoxysilane | 1.0 | 80 | 10 | 150 | 30 |
| C. Ex. C2 | Tridecafluorooctyltrimethoxysilane | 1.0 | 80 | 10 | 150 | 30 |
| C. Ex. C3 | Tridecafluorooctyltrimethoxysilane | 1.0 | 80 | 10 | 150 | 30 |
| C. Ex. C4 | Tridecafluorooctyltrimethoxysilane | 1.0 | 80 | 10 | 150 | 30 |
| C. Ex. C5 | Tridecafluorooctyltrimethoxysilane | 1.0 | 80 | 10 | 150 | 30 |
| C. Ex. C6 | TSW8251 (silicone-based) | 3.3 | 80 | 10 | 150 | 30 |

TABLE 3-continued

| | | Binder layer (a1) | Metal oxide particle layer | Binder layer (a2) | Overcoating layer | Water-repellent coating-substrate assemblies | | | | | | | | | |
|---|---|---|---|---|---|---|---|---|---|---|---|---|---|---|---|
| | | | | | | Irregularities | | Finer irregularities | | Total transmittance % | Haze % | Pencil hardness | Scratch resistance | Adhesion | Water contact angle ° |
| | Substrate | Content Parts by weight | Average thickness nm | Content Parts by weight | Content Parts by weight | Average height nm | Pitch width nm | Average height nm | Pitch width nm | | | | | | |
| Ex. C1 | Glass | — | 95 | 10 | 30 | 90 | 150 | 1 | 0.5 | 88.5 | 1.5 | ○ | ○ | ○ | 155 |
| Ex. C2 | Glass | — | 105 | 10 | 30 | 100 | 150 | 0.8 | 0.4 | 87.3 | 1.8 | ◎ | ◎ | ○ | 157 |
| Ex. C3 | Glass | — | 115 | 10 | 30 | 110 | 155 | 0.6 | 0.3 | 87.5 | 2 | ◎ | ◎ | ○ | 159 |
| Ex. C4 | Glass | — | 95 | 10 | 30 | 85 | 150 | 2 | 1 | 88.6 | 1.4 | ◎ | ○ | ○ | 153 |
| Ex. C5 | Glass | — | 95 | 10 | 30 | 100 | 150 | 0.7 | 0.4 | 88.4 | 1.6 | ◎ | ◎ | ○ | 159 |
| Ex. C6 | Glass | — | 60 | 10 | 30 | 50 | 100 | 1 | 0.5 | 89.1 | 0.9 | ○ | ◎ | ○ | 145 |
| Ex. C7 | Glass | — | 150 | 10 | 30 | 130 | 180 | 1 | 0.5 | 86.4 | 2.5 | ○ | ○ | ○ | 159 |
| Ex. C8 | Glass | — | 95 | 10 | 30 | 90 | 150 | 0.4 | 0.2 | 88.6 | 1.5 | ○ | ○ | ○ | 163 |
| Ex. C9 | Glass | 10 | 160 | 10 | 30 | 110 | 150 | 0.5 | 0.4 | 88.2 | 1.6 | ○ | ○ | ◎ | 163 |
| Ex. C10 | Glass | — | 90 | 10 | 30 | 90 | 150 | 0.9 | 0.2 | 90.1 | 1.2 | ○ | ○ | ○ | 161 |
| Ex. C11 | Glass | — | 120 | 10 | 30 | 140 | 200 | 4 | 2 | 85.5 | 2.9 | ○ | ○ | ○ | 147 |
| Ex. C12 | Glass | — | 95 | 10 | 30 | 90 | 150 | 0.4 | 0.2 | 88.9 | 1.2 | ◎ | ◎ | ◎ | 165 |
| Ex. C13 | Glass | — | 95 | 10 | 50 | 90 | 150 | 1 | 0.5 | 88.2 | 1.8 | ○ | ○ | ○ | 156 |
| Ex. C14 | Glass | — | 95 | 10 | 10 | 90 | 150 | 1 | 0.5 | 88.7 | 1.3 | ○ | ○ | ◎ | 154 |
| Ex. C15 | Glass | — | 95 | 0 | 33.33 | 90 | 150 | 1 | 0.5 | 88.3 | 1.6 | ○ | △ | △ | 153 |
| Ex. C16 | Polyester fibers | — | — | — | — | Overcoating layer alone was formed. | | | | — | — | — | — | ○ | 133 |
| Ex. C17 | SUS304 | — | — | — | — | Overcoating layer alone was formed. | | | | — | — | ◎ | ◎ | ○ | 155 |
| C. Ex. C1 | Glass | — | 82 | 10 | 30 | 80 | 150 | — | — | 88.2 | 1.8 | × | × | ○ | 125 |
| C. Ex. C2 | Glass | — | 82 | 10 | 30 | 85 | 10 | 1 | — | 87.3 | 1.7 | × | × | ○ | 120 |
| C. Ex. C3 | Glass | — | 30 | 10 | 30 | 30 | 5 | 1 | 0.5 | 90.2 | 0.4 | ○ | ○ | ○ | 125 |
| C. Ex. C4 | Glass | — | 1200 | 10 | 30 | 1100 | 600 | 1 | 0.5 | 65.4 | 15.3 | × | × | × | 95 |
| C. Ex. C5 | Glass | — | — | — | — | | | | | — | — | × | × | — | 120 |
| C. Ex. C6 | Glass | — | — | — | — | | | | | — | — | × | × | — | 95 |

*TESO: tetraethoxysilane oligomer

The invention claimed is:

1. A water-repellent transparent coating-substrate assembly comprising:
   a substrate; and
   the water-repellent transparent coating disposed on a surface of the substrate and having depressions and protrusions on a surface thereof,
   wherein an average height of the protrusions ($T_F$) is 30 to 500 nm and an average interval (pitch width) of the protrusions ($W_F$) is 50 to 1000 nm,
   wherein the protrusions have finer depressions and finer protrusions on a surface thereof,
   wherein an average interval of the finer protrusions ($W_{FF}$) is smaller than the average interval of the protrusions ($W_F$),
   wherein an average height of the finer protrusions ($T_{FF}$) is 3 to 50 nm and an average interval of the finer protrusions ($W_{FF}$) is 3 to 50 nm,
   wherein the water-repellent transparent coating includes an inorganic oxide fine particle layer and an overcoating layer disposed on the inorganic oxide fine particle layer, and
   wherein the water-repellent transparent coating has a water contact angle of 130 to 180°.

2. The water-repellent transparent coating-substrate assembly according to claim 1, wherein a ratio of ($T_F$)/($W_F$) is 0.1 to 10.

3. The water-repellent transparent coating-substrate assembly according to claim 1, wherein the inorganic oxide fine particle layer contains inorganic oxide fine particles and a binder.

4. The water-repellent transparent coating-substrate assembly according to claim 3, wherein the content of the binder in terms of oxide is 1 to 200 parts by weight when the content of said inorganic oxide fine particles in terms of oxide is 100 parts by weight.

5. The water-repellent transparent coating-substrate assembly according to claim 1, further comprising a primer layer between the substrate and the inorganic oxide fine particle layer.

6. The water-repellent transparent coating-substrate assembly according to claim 1, wherein the inorganic oxide fine particles have one or more kinds of shapes selected from plate shapes, fiber shapes, chain shapes, warty shapes, cluster shapes and sunflower shapes.

7. The water-repellent transparent coating-substrate assembly according to claim 6, wherein
   the plate-shaped inorganic oxide fine particles have an average particle diameter ($D_P$) of 10 to 300 nm, an average thickness ($T_P$) of 1 to 60 nm, and a ratio of the average particle diameter ($D_P$) to the average thickness ($T_P$), ($D_P$)/($T_P$), of 1.5 to 50,
   the fiber-shaped inorganic oxide fine particles have an average length ($L_F$) of 10 to 500 nm, an average particle width ($W_{FS}$) of 1 to 100 nm, and a ratio of the average length ($L_F$) to the average particle width ($W_{FS}$), ($L_F$)/($W_{FS}$), of 1.5 to 50,
   the chain-shaped inorganic oxide fine particles are chains each composed of 2 to 100 primary fine particles having an average particle diameter ($D_C$) of 3 to 50 nm, and have an average length ($L_C$) of 6 to 500 nm, and a ratio of the average length ($L_C$) to the average particle diameter ($D_C$), ($L_C$)/($D_C$), of 2 to 50,
   the warty particles are inorganic oxide particles having wart-like projections on the surface of the inorganic oxide particles, and have an average particle diameter ($D_A$) measured by an image analysis method of 10 to 150 nm,
   the cluster-shaped particles are aggregated particles (secondary particles) composed of inorganic oxide primary particles having an average particle diameter ($D_{B1}$) of 10 to 150 nm, the secondary particles having an average particle diameter ($D_{B2}$) of 20 to 500 nm, and
   the sunflower-shaped particles are inorganic oxide particles that include inorganic oxide base particles (A) and inorganic oxide top fine particles (B) covering the surface of the base particles, the inorganic oxide base particles (A) being spherical particles with an average particle diameter ($D_A$) of 40 to 600 nm, the inorganic oxide top fine particles (B) having an average particle diameter ($D_B$) of 4 to 60 nm.

8. The water-repellent transparent coating-substrate assembly according to claim 6, wherein the plate-shaped inorganic oxide fine particles are plate-shaped alumina fine particles or plate-shaped alumina-silica fine particles.

9. The water-repellent transparent coating-substrate assembly according to claim 6, wherein the fiber-shaped inorganic oxide fine particles are fiber-shaped alumina fine particles or fiber-shaped alumina-silica fine particles.

10. The water-repellent transparent coating-substrate assembly according to claim 6, wherein the chain-shaped inorganic oxide fine particles are chain-shaped silica fine particles.

11. The water-repellent transparent coating-substrate assembly according to claim 7, wherein
    the warty particles and the cluster-shaped particles are each at least one selected from $SiO_2$, $ZrO_2$, $CeO_2$, $WO_3$, $TiO_2$, and composite oxides and mixtures of these oxides, and
    the sunflower-shaped particles are at least one selected from $SiO_2$, $Al_2O_3$, $Sb_2O_5$, $ZrO_2$, $TiO_2$, $Fe_2O_3$, $CeO_2$, and composite oxides or mixtures of these oxides (wherein the inorganic oxide base particles (A) and the inorganic oxide top fine particles (B) of the sunflower-shaped particles may be the same as each other).

12. The water-repellent transparent coating-substrate assembly according to claim 11, wherein the warty particles, the cluster-shaped particles and the sunflower-shaped particles are each silica.

13. The water-repellent transparent coating-substrate assembly according to claim 5, wherein the primer layer includes a silica.

14. The water-repellent transparent coating-substrate assembly according to claim 1, wherein the inorganic oxide fine particles are surface-treated with a hydrolyzable organosilicon compound represented by Formula (1) below:

$$SiX_4 \quad (1)$$

(in the formula, X is an alkoxy group having 1 to 4 carbon atoms, a hydroxyl group, a halogen or hydrogen).

15. The water-repellent transparent coating-substrate assembly according to claim 3, wherein the binder is a silica and is a hydrolyzate polycondensate of a hydrolyzable organo silicon compound represented by Formula (2) below:

$$R_n\text{—}SiX_{4-n} \quad (2)$$

(in the formula, R is a non-substituted or substituted hydrocarbon group having 1 to 10 carbon atoms; X is an alkoxy group having 1 to 4 carbon atoms, a hydroxyl group, a halogen or hydrogen; and n is an integer of 0 to 1).

16. The water-repellent transparent coating-substrate assembly according to claim 1, wherein the content of the overcoating layer in terms of oxide (solid) is 1 to 100 parts by weight when the content of said inorganic oxide fine particles in terms of oxide is 100 parts by weight.

17. The water-repellent transparent coating-substrate assembly according to claim 1, wherein the overcoating layer is a fluorine-containing silica layer and the fluorine-containing silica layer includes a hydrolyzate polycondensate of a hydrolyzable organosilicon compound represented by Formula (3) below:

$$R_n\text{—}SiX_{4-n} \tag{3}$$

(in the formula, R is a fluorine-substituted hydrocarbon group having 1 to 10 carbon atoms, and may be the same or different; X is an alkoxy group having 1 to 4 carbon atoms, a hydroxyl group, a halogen or hydrogen; and n is an integer of 1 to 3).

18. The water-repellent transparent coating-substrate assembly according to claim 17, wherein the fluorine-containing silica layer further includes a hydrolyzate polycondensate of a hydrolyzable organosilicon compound represented by Formula (4) below:

$$SiX_4 \tag{4}$$

(in the formula, X is an alkoxy group having 1 to 4 carbon atoms, a hydroxyl group, a halogen or hydrogen).

19. A process for producing a water-repellent transparent coating-substrate assembly, a surface of the water-repellent transparent coating having irregularities including depressions and protrusions in which the protrusions have an average height ($T_F$) in a range of 30 to 500 nm and an average protrusion interval (pitch width) ($W_F$) of 50 to 1000 nm, the water-repellent transparent coating having a water contact angle of 130 to 180°, the process comprising the following steps (b) and (d):

(b) the step of applying an inorganic oxide fine particle dispersion onto a substrate to form an inorganic oxide fine particle layer, and (d) the step of applying an overcoating layer-forming liquid onto the inorganic oxide fine particle layer to form an overcoating layer.

20. The process for producing a water-repellent transparent coating-substrate assembly according to claim 19, further comprising the following step (c) before the step (d):

(c) the step of applying a binder coating liquid to form an inorganic oxide fine particle layer containing a binder.

21. The process for producing a water-repellent transparent coating-substrate assembly according to claim 19, further comprising the following step (a) before the step (b):

(a) the step of applying a primer layer-forming liquid onto a surface of the substrate to form a primer layer.

22. The process for producing a water-repellent transparent coating-substrate assembly according to claim 19, wherein the concentration of the inorganic oxide fine particles in terms of an inorganic oxide in the inorganic oxide fine particle dispersion is 0.1 to 10 wt %.

23. The process for producing a water-repellent transparent coating-substrate assembly according to claim 20, wherein the binder coating liquid is used so that the amount of the binder in terms of oxide is 1 to 200 parts by weight with respect to 100 parts by weight of the inorganic oxide fine particles in the inorganic oxide fine particle layer formed in step (b).

24. The process for producing a water-repellent transparent coating-substrate assembly according to claim 19, wherein the overcoating layer forming coating solution is applied so that an amount of the overcoating layer is 1 to 100 parts by weight in terms of oxide (solid) with respect to 100 parts by weight of the inorganic oxide fine particles in the inorganic oxide fine particle layer formed in step (b).

* * * * *

UNITED STATES PATENT AND TRADEMARK OFFICE
CERTIFICATE OF CORRECTION

| | | |
|---|---|---|
| PATENT NO. | : 9,856,407 B2 | Page 1 of 1 |
| APPLICATION NO. | : 14/758354 | |
| DATED | : January 2, 2018 | |
| INVENTOR(S) | : Yuhko Hakoshima et al. | |

It is certified that error appears in the above-identified patent and that said Letters Patent is hereby corrected as shown below:

In the Specification

Column 1, Line 9, delete "PCT/JP2/013/084469" and insert -- PCT/JP2013/084469 --

In the Claims

Column 101, Line 54, Claim 7, delete "1.5to" and insert -- 1.5 to --

Column 102, Line 60, Claim 15, delete "organo silicon" and insert -- organosilicon --

Signed and Sealed this
Twelfth Day of June, 2018

Andrei Iancu
*Director of the United States Patent and Trademark Office*